US009488757B2

(12) United States Patent
Mukawa

(10) Patent No.: US 9,488,757 B2
(45) Date of Patent: Nov. 8, 2016

(54) DISPLAY APPARATUS ASSEMBLY

(75) Inventor: Hiroshi Mukawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 492 days.

(21) Appl. No.: 13/196,076

(22) Filed: Aug. 2, 2011

(65) Prior Publication Data

US 2012/0032874 A1    Feb. 9, 2012

(30) Foreign Application Priority Data

Aug. 9, 2010  (JP) .................................. 2010-178627

(51) Int. Cl.
G09G 5/00      (2006.01)
G02B 3/12      (2006.01)
G02B 27/01     (2006.01)
G02B 5/06      (2006.01)

(52) U.S. Cl.
CPC ............. *G02B 3/12* (2013.01); *G02B 27/0172* (2013.01); *G02B 5/06* (2013.01); *G02B 2027/0132* (2013.01); *G02B 2027/0178* (2013.01); *G02B 2027/0183* (2013.01)

(58) Field of Classification Search
CPC .................. G02B 2027/0178; G02B 27/017; G02B 2027/0187; G02B 27/0093; G02B 27/0101; G02B 27/0179; G02B 27/01; G02B 2027/0154; G02B 23/26
USPC ........................................................... 345/8
See application file for complete search history.

(56) References Cited

U.S. PATENT DOCUMENTS

| 5,162,828 A | 11/1992 | Furness |
| 6,411,326 B1 | 6/2002 | Tabata |
| 6,449,309 B1 | 9/2002 | Tabata |
| 7,502,168 B2 | 3/2009 | Akutsu et al. |
| 8,576,286 B1* | 11/2013 | Childs .................... G01C 21/00 348/113 |
| 2001/0038360 A1* | 11/2001 | Fukushima et al. ............... 345/8 |
| 2005/0231599 A1 | 10/2005 | Yamasaki |
| 2006/0028400 A1* | 2/2006 | Lapstun ................. G02B 26/06 345/8 |
| 2006/0250322 A1* | 11/2006 | Hall et al. ......................... 345/8 |

(Continued)

FOREIGN PATENT DOCUMENTS

| EP | 0 709 816 A2 | 5/1996 |
| EP | 1 898 634 A2 | 3/2008 |

(Continued)

OTHER PUBLICATIONS

Partial European Search Report dated Nov. 24, 2011 in connection with counterpart EP Application No. EP 11 17 3308.

(Continued)

*Primary Examiner* — Lixi C Simpson
(74) *Attorney, Agent, or Firm* — Dentons US LLP

(57) ABSTRACT

A display apparatus assembly includes: a display apparatus; and a speed measuring device that measures a movement speed of the display apparatus, wherein the display apparatus includes a glass-type frame that is mounted on a head of an observer and two image displaying devices for left and right eyes that are mounted in the frame, each of the image displaying devices includes an image forming device, an optical system that forms light output from the image forming device to be parallel light, and an optical device to which light output from the optical system is incident and in which the light is guided so as to be output, and a convergence angle is changed based on the movement speed of the display apparatus that is measured by the speed measuring device.

20 Claims, 26 Drawing Sheets

(56) References Cited

U.S. PATENT DOCUMENTS

| 2007/0070859 | A1 | 3/2007 | Hirayama | |
|---|---|---|---|---|
| 2008/0062297 | A1* | 3/2008 | Sako | G02B 27/017 348/333.02 |
| 2010/0149073 | A1* | 6/2010 | Chaum | G02B 27/0093 345/8 |

FOREIGN PATENT DOCUMENTS

| JP | 09-218376 | 8/1997 |
|---|---|---|
| JP | 2000-088613 | 3/2000 |
| JP | 2005-107038 | 4/2005 |
| JP | 2006-50165 | 2/2006 |
| JP | 3771964 | 2/2006 |
| JP | 2006162767 | 6/2006 |
| JP | 2006-270175 | 10/2006 |
| JP | 2007-094175 | 4/2007 |
| JP | 2007-129550 | 5/2007 |
| JP | 2008-083539 | 4/2008 |
| JP | 2008-176103 | 7/2008 |
| JP | 2010-006127 | 1/2010 |
| JP | 2010-102077 | 5/2010 |
| JP | 2010-139589 | 6/2010 |
| JP | 2010-139688 | 6/2010 |
| JP | 2011-107382 | 6/2011 |
| WO | WO/03/046732 A1 | 6/2003 |
| WO | WO/2006/057227 A1 | 6/2006 |

OTHER PUBLICATIONS

Japanese Office Action issued in connection with Japanese Patent Application No. 2010-178627 dated Nov. 12, 2013.
Japanese Office Examination Report issued in connection with related Japanese patent application No. 2013-246865 dated Jul. 15, 2014.
European Examination Report corresponding to European Serial No. 11173308.5 dated Nov. 16, 2015.
Patterson, R.; Perceptual Issues in the Use of Head-Mounted Visual Display:, Human Factors, Jan. 1, 2006; Pages 555-573, retrieved from Internet—URL:http://www.wsu.edu/psychology/facultystaff/experimental/facultypages/pdf/HMDreviewPaper_Pattersonetal_2006.pdf.—retrieved Oct. 18, 2011.
Hoffman, D. M. et al.; "Vergence-Accommodation Conflicts Hinder Visual Performance and Cause Visual Fatigue", Journal of Vision, vol. 8, No. 3., Mar. 1, 2008, pp. 33-33. XP055226974, DOI: 10.1167/8.3.33.

* cited by examiner

| SYNC | MSG_ID | LENG | POS_X | POS_Y | DATA ⋯ | FSC |

(EMBODIMENT 2)
FIG. 8A
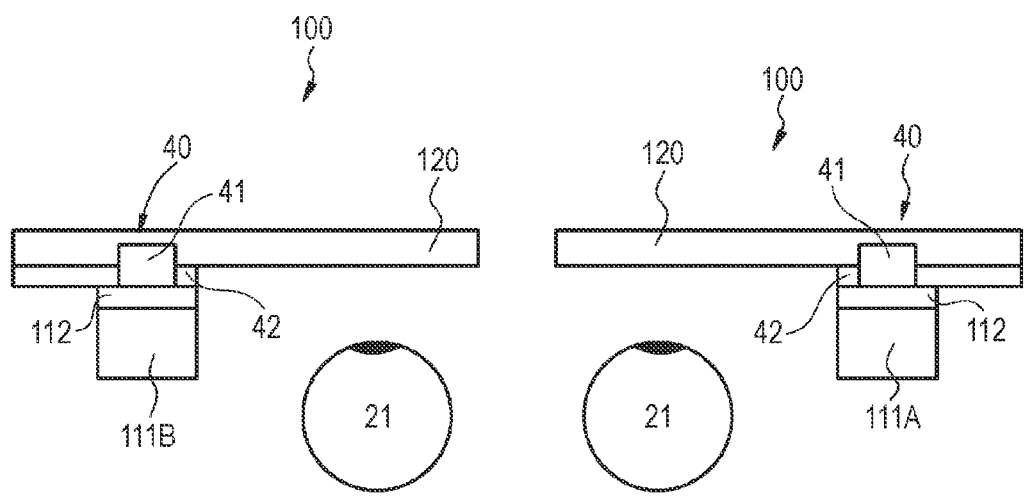
FIG. 8B
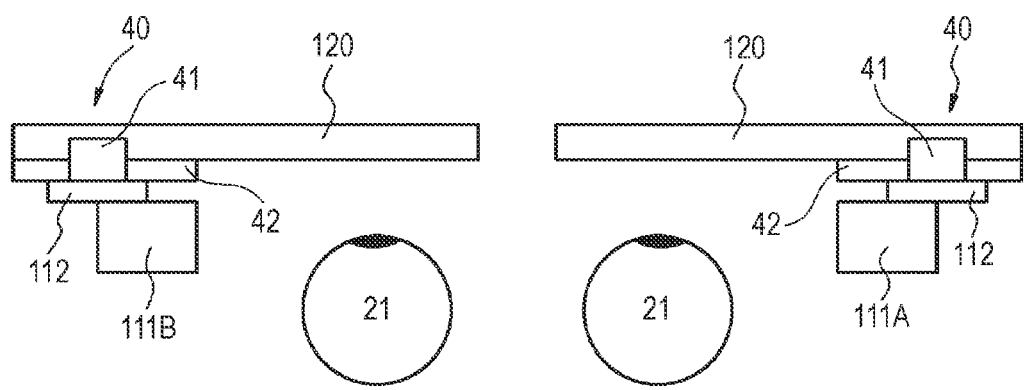
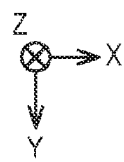 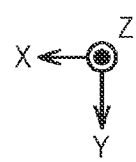

(EMBODIMENT 3)

[PRINCIPLED DIAGRAM]

PRINCIPLED LIQUID LENS

[EMBODIMENT 4]

x DIRECTION
y DIRECTION
z DIRECTION (EMBODIMENT 5)

FIG.16A
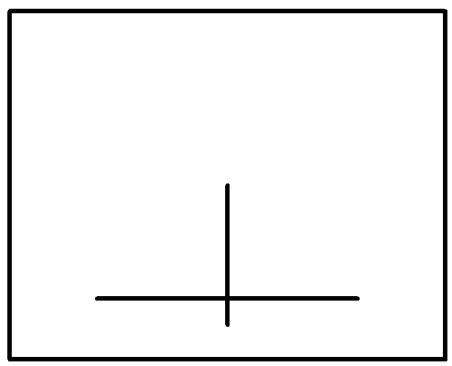
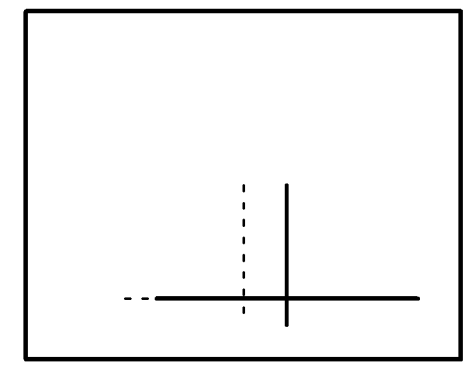
FIG.16B
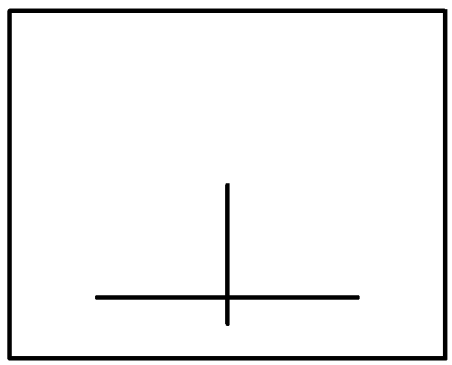
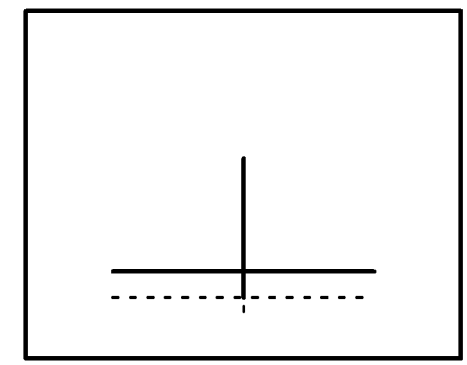
FIG.16C
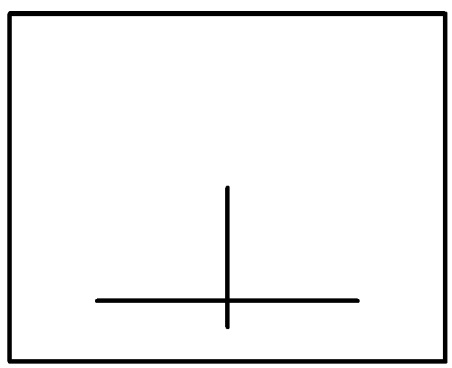
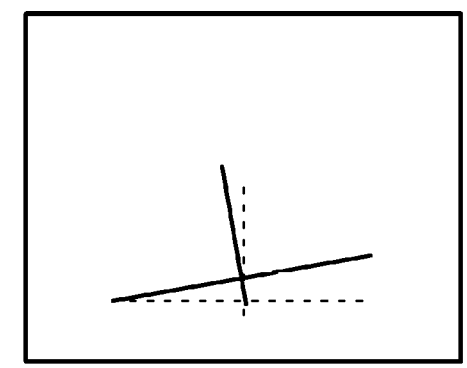

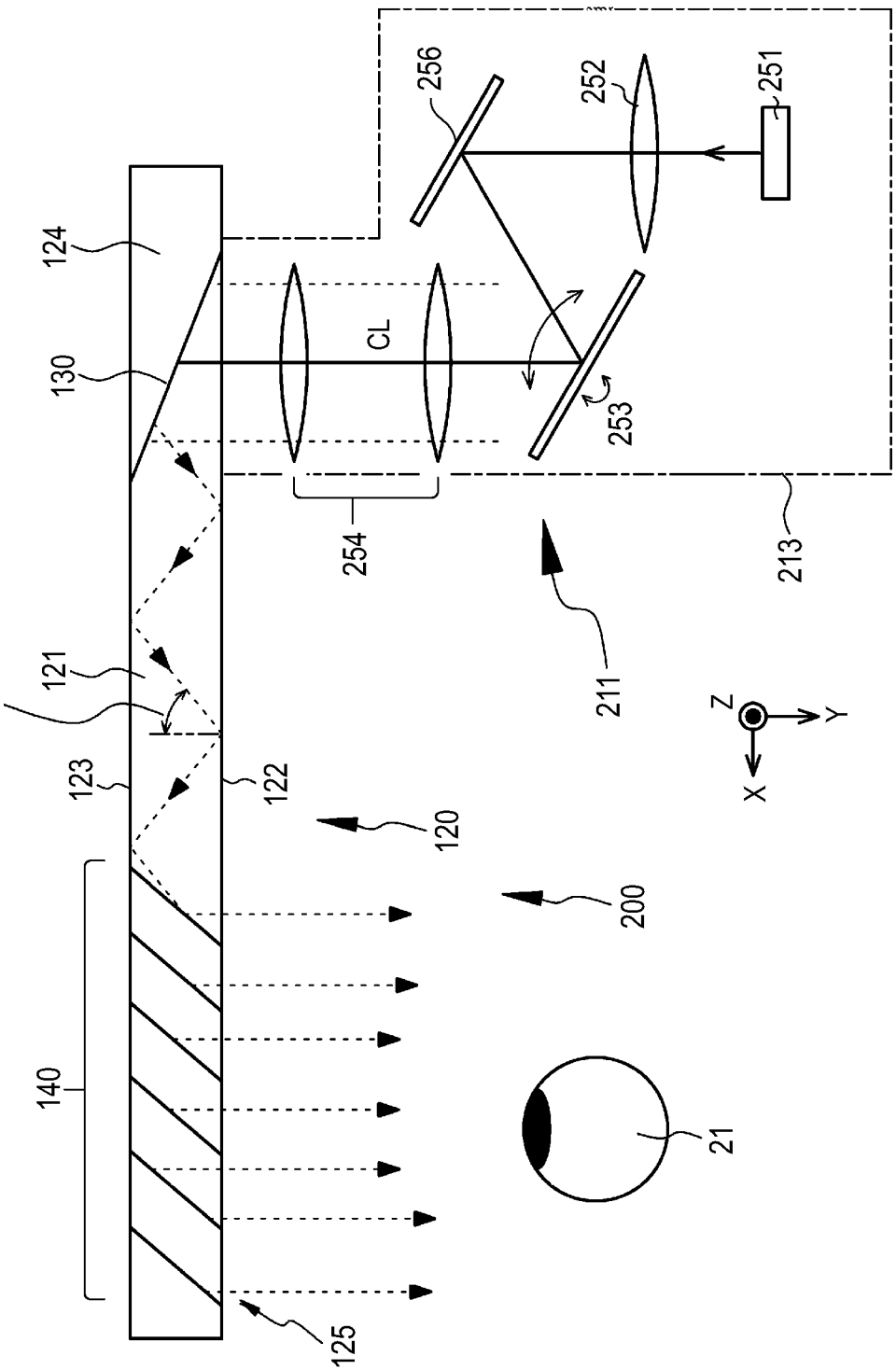

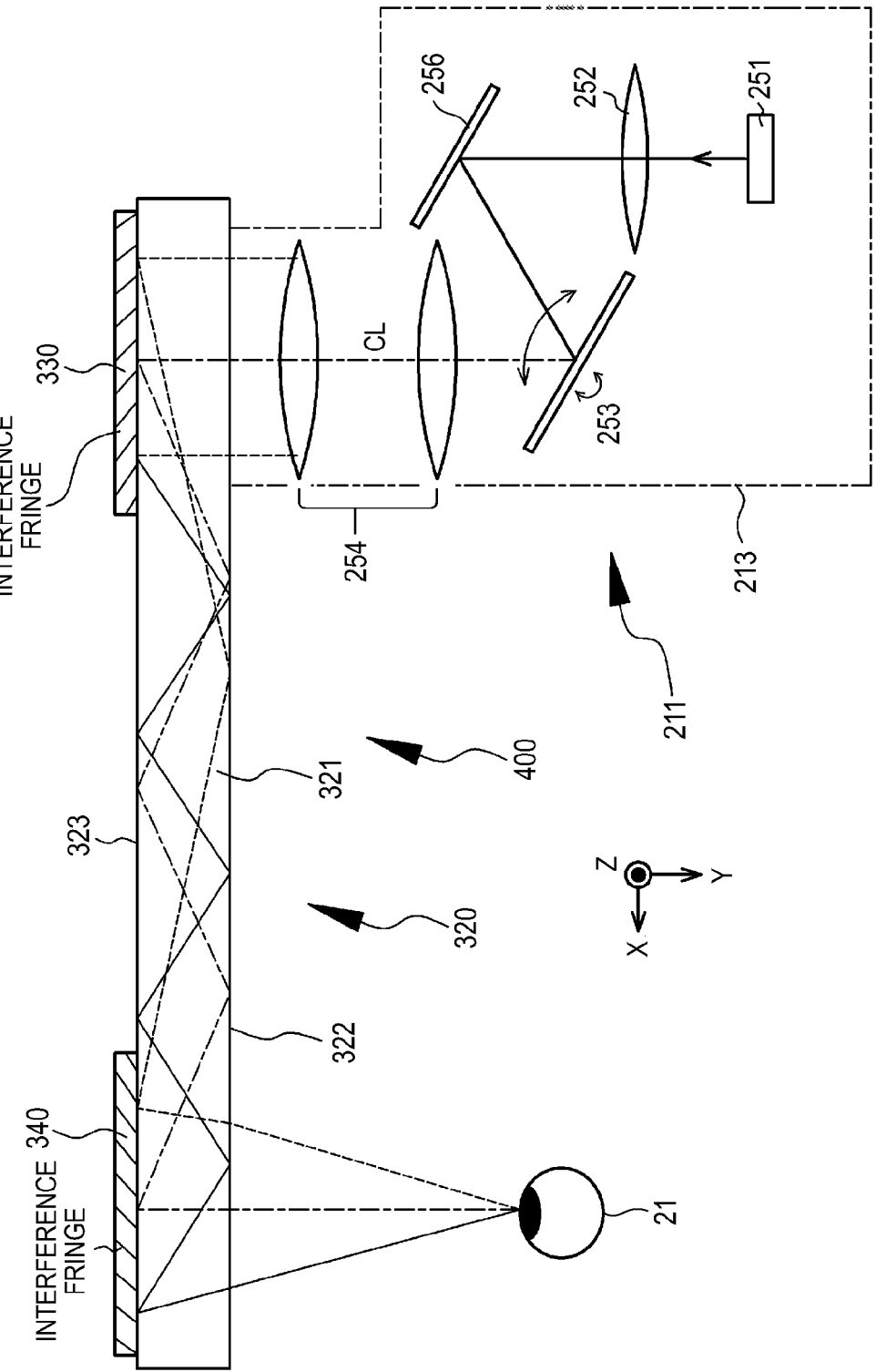

(EMBODIMENT 14)

(EMBODIMENT 14)

(EMBODIMENT 15)

(EMBODIMENT 16)

(EMBODIMENT 16)

DISPLAY APPARATUS ASSEMBLY

FIELD

The present disclosure relates to a display apparatus assembly, and more particularly, to a display apparatus assembly using a head-mounted display (HMD).

BACKGROUND

A virtual image displaying device (image displaying device) used for allowing an observer to observe a two-dimensional image formed by an image forming device as a magnified virtual image by using a virtual image optical system is known, for example, as in JP-A-2006-162767.

The image displaying device 100, as illustrated in FIG. 1 as a conceptual diagram thereof, includes: an image forming device 111 that includes a plurality of pixels arranged in a two-dimensional matrix pattern; a collimator optical system 112 that makes light emitted from the pixels of the image forming device 111 to be parallel light; and an optical device (light guiding unit) 120 to which the light formed as the parallel light by the collimator optical system 112 is incident, through which the incident light is guided, and from which the guided light is output. The optical device 120 is configured by: a light guiding plate 121 allowing the incident light to propagate the inside thereof through total reflection and output therefrom; a first deflection unit 130 (for example, configured by a single-layer light reflecting film) reflecting the light incident to the light guiding plate 121 such that the light incident to the light guiding plate 121 is totally reflected inside the light guiding plate 121; and a second defection unit 140 (for example, configured by a multi-layer light reflecting film having a multilayered stacked structure) allowing the light that has propagated the inside of the light guiding plate 121 through total reflection to output from the light guiding plate 121. For example, by configuring an HMD by using the above-described image displaying device 100, a miniaturized, lightweight device can be realized.

In addition, in order to allow an observer to observe a two-dimensional image formed by an image forming device as a magnified virtual image through a virtual image optical system, a virtual image displaying device (image displaying device) using a hologram diffraction grating is known, for example, as in JP-A-2007-94175.

The image displaying device 300, as illustrated in FIGS. 20A and 20B as a conceptual diagram thereof, basically includes: an image forming device 111 that displays an image; a collimator optical system 112, and an optical device (light guiding unit) 320 to which light displayed in the image forming device 111 is incident and which guides the light to the pupils 21 of the observer. Here, the optical device 320 includes a light guiding plate 321 and a first diffraction grating member 330 and a second diffraction grating member 340 each configured by a reflection-type volume hologram diffraction grating arranged on the light guiding plate 321. To the collimator optical system 112, light emitted from each pixel of the image forming device 111 is incident, and parallel light is generated by the collimator optical system 112 and is incident to the light guiding plate 321. The parallel light is incident from the first face 322 of the light guiding plate 321 and is output. Meanwhile, the first diffraction grating member 330 and the second diffraction grating member 340 are attached to the second face 323 of the light guiding plate 321 that is parallel to the first face 322 of the light guiding plate 321.

Through a head-mounted display having a see-through function, a virtual image of an image displayed by an image displaying device can be observed while viewing a real image in a real space disposed in front of the eyes. Accordingly, such a type of display is expected to be used for an application as navigation for an airplane including a helicopter and the like and in part this has been put into practice. Generally, in a transportation unit such as an airplane that is expected to move at a relatively high speed, an operator frequently looks at a position located at an infinite distance in a real space. Thus, when the virtual image distance of an image displayed by a head-mounted display having a see-through function that is used for an application of the navigation of an airplane or the like is set to infinite, in other words, when the convergence angle is set to zero, or when the main light beams transmitted from two image displaying devices for the left and right eyes are set to be parallel to each other, a reduction in visibility due to a distance difference between a real image and a virtual image can be substantially resolved.

SUMMARY

However, in a transportation unit such as an automobile, a motorcycle, a bicycle, or a ship for which it is necessary to consider a movement at a lower speed, an operator (driver) changes his or her viewpoint from a location at a distance of several meters to a location at a distance of several tens of meters. In other words, the viewpoint distance changes. Accordingly, in such a case, when the convergence angle is fixed to 0° by setting the virtual image distance of an image displayed by the head-mounted display to infinite, it is necessary to frequently adjust the positions of the eyes point between a real image and a virtual image, thereby visibility decreases. Therefore, in such a case, there is a problem in that fatigue increases.

In order to solve such a problem, for example, in JP-A-9-218376, a system is proposed in which the convergence angle of both eyes is acquired by detecting the directions of lines of sights of the left and right eyes, a distance from a user to the viewpoint is calculated based on the convergence angle, and the virtual image distance is adjusted to the distance. Alternatively, in U.S. Pat. No. 3,771,964, a system is proposed in which a distance up to a main viewpoint is calculated from a focus-matching state of the eyes of a user, and the convergence angle is controlled based on the distance.

However, in these systems, in order to precisely detect the lines of sights of the left and right eyes, an infrared light source used for illuminating the eyes, a camera used for photographing the eyes, and a photo detector are necessary in many cases, and there is a problem in that the weight or the volume of the head-mounted display increases.

In addition, in the above-described transportation units for which it is necessary to consider a movement at a low speed, since an obstacle is frequently present in the direction of the movement, it is necessary for an operator (driver) to check an obstacle with the naked eyes and perform an appropriate operation. Accordingly, it is important to control a virtual image displayed in a head-mounted display not to interfere with a real image of a landscape in front of the eyes or the like. Furthermore, generally, in a case where the absolute value of the acceleration of a transportation unit is great, it is understood to be highly necessary to check the actual situation with the naked eyes.

Thus, it is desirable to provide a display apparatus assembly, which uses a head-mounted display, capable of automatically changing the convergence angle or the virtual-image distance of an image displayed by the head-mounted display even in a case where the speed of a transportation unit changes when an observer (an operator, a driver, a passenger, or anyone else) wearing the head-mounted display is boarded on the transportation unit (transportation engine). In addition, it is desirable to provide a display apparatus assembly, which uses a head-mounted display, capable of automatically changing various parameters of an image displayed by the head-mounted display in a case where the speed or the acceleration of the transportation unit changes when an observer (an operator, a driver, a passenger, or anyone else) wearing the head-mounted display is boarded on the transportation unit (transportation engine).

A display apparatus assembly according to a first embodiment of the present disclosure includes: a display apparatus; and a speed measuring device that measures a movement speed of the display apparatus. The display apparatus includes a glass-type frame that is mounted on a head of an observer and two image displaying devices for left and right eyes that are mounted in the frame. In addition, each of the image displaying devices includes an image forming device, an optical system that forms light output from the image forming device to be parallel light, and an optical device to which light output from the optical system is incident and in which the light is guided so as to be output. A convergence angle is changed based on the movement speed of the display apparatus that is measured by the speed measuring device.

A display apparatus assembly according to a second or third embodiment of the present disclosure includes: a display apparatus; and a speed measuring device that measures a movement speed of the display apparatus. The display apparatus includes a glass-type frame that is mounted on a head of an observer and an image displaying device that is mounted in the frame, and the image displaying device includes an image forming device, an optical system that forms light output from the image forming device to be parallel light, and an optical device to which light output from the optical system is incident and in which the light is guided so as to be output.

In the display apparatus assembly according to the second embodiment of the present disclosure, a virtual-image distance of an image displayed by the image displaying device is changed by changing a focal distance of the optical system based on the movement speed of the display apparatus that is measured by the speed measuring device.

In the display apparatus assembly according to the third embodiment of the present disclosure, at least one (15 combinations) of the size of an image displayed in the optical device, the luminance of the image, the resolution of the image, and the content of the image is changed based on the movement speed of the display apparatus that is measured by the speed measuring device.

A display apparatus assembly according to a fourth embodiment of the present disclosure includes: a display apparatus; and an acceleration measuring device that measures acceleration during a movement of the display apparatus. The display apparatus includes a glass-type frame that is mounted on a head of an observer and an image displaying device that is mounted in the frame. The image displaying device includes an image forming device, an optical system that forms light output from the image forming device to be parallel light, and an optical device to which light output from the optical system is incident and in which the light is guided so as to be output. The operation of the image displaying device is stopped when the absolute value of the acceleration during the movement of the display apparatus that is measured by the acceleration measuring device is equal to or greater than a predetermined value.

According to the display apparatus assembly of the first or second embodiment of the present disclosure, by automatically changing the convergence angle or the virtual-image distance in accordance with the movement speed of the display apparatus, a distance up to a main viewpoint (viewpoint distance) and the virtual-image distance of an image displayed by the image displaying device can be configured to coincide with each other as possibly as can, whereby a display apparatus assembly, of which visual recognition is improved, particularly appropriate for the use for navigation can be provided. In addition, according to the display apparatus assembly of the third embodiment of the present disclosure, since at least one of the size of an image displayed in the optical device, the luminance of the image, the resolution of the image, and the content of the image is changed based on the movement speed of the display apparatus, the size of the image, the luminance of the image, the resolution of the image, or the content of the image that is appropriate for the movement speed of the display apparatus can be appropriately selected, whereby a display apparatus assembly that is particularly appropriate for the use for navigation can be provided. Furthermore, according to the display apparatus assembly of the fourth embodiment, since the operation of the image displaying device is stopped when the absolute value of the acceleration during the movement of the display apparatus is equal to or greater than a predetermined value, an image is not displayed in the optical device, and the actual situation can be instantly checked with the naked eyes, whereby a display apparatus assembly that is particularly appropriate for the use for navigation can be provided. Furthermore, improvement of the visual recognition of an observer and a reduction of the fatigue can be realized with hardly increasing the weight, the volume, the power consumption, and the manufacturing cost of the display apparatus assembly.

BRIEF DESCRIPTION OF THE DRAWINGS

FIGS. 8A and 8B are conceptual diagrams of a display apparatus of a display apparatus assembly according to Embodiment 2.

FIGS. 16A, 16B, and 16C are schematic diagrams illustrating a state in which there is a deviation between an image displayed by the image displaying device for the left eye and an image displayed by the image displaying device for the right eye.

FIG. 19 is a conceptual diagram of an image displaying device of a display apparatus assembly according to Embodiment 11.

FIG. 21 is a conceptual diagram of an image displaying device of a display apparatus assembly according to Embodiment 13.

FIGS. 22A and 22B are a diagram schematically illustrating the propagation of light in a light guiding plate that configures an image displaying device of a display apparatus assembly according to Embodiment 14 and a conceptual diagram illustrating the arrangement state of the light guiding plate and the like.

FIGS. 24A and 24B are a diagram schematically illustrating the propagation of light in a light guiding plate that configures an image displaying device of a display apparatus assembly according to Embodiment 15 and a conceptual diagram illustrating the arrangement state of the light guiding plate and the like.

DETAILED DESCRIPTION

Figure 1:
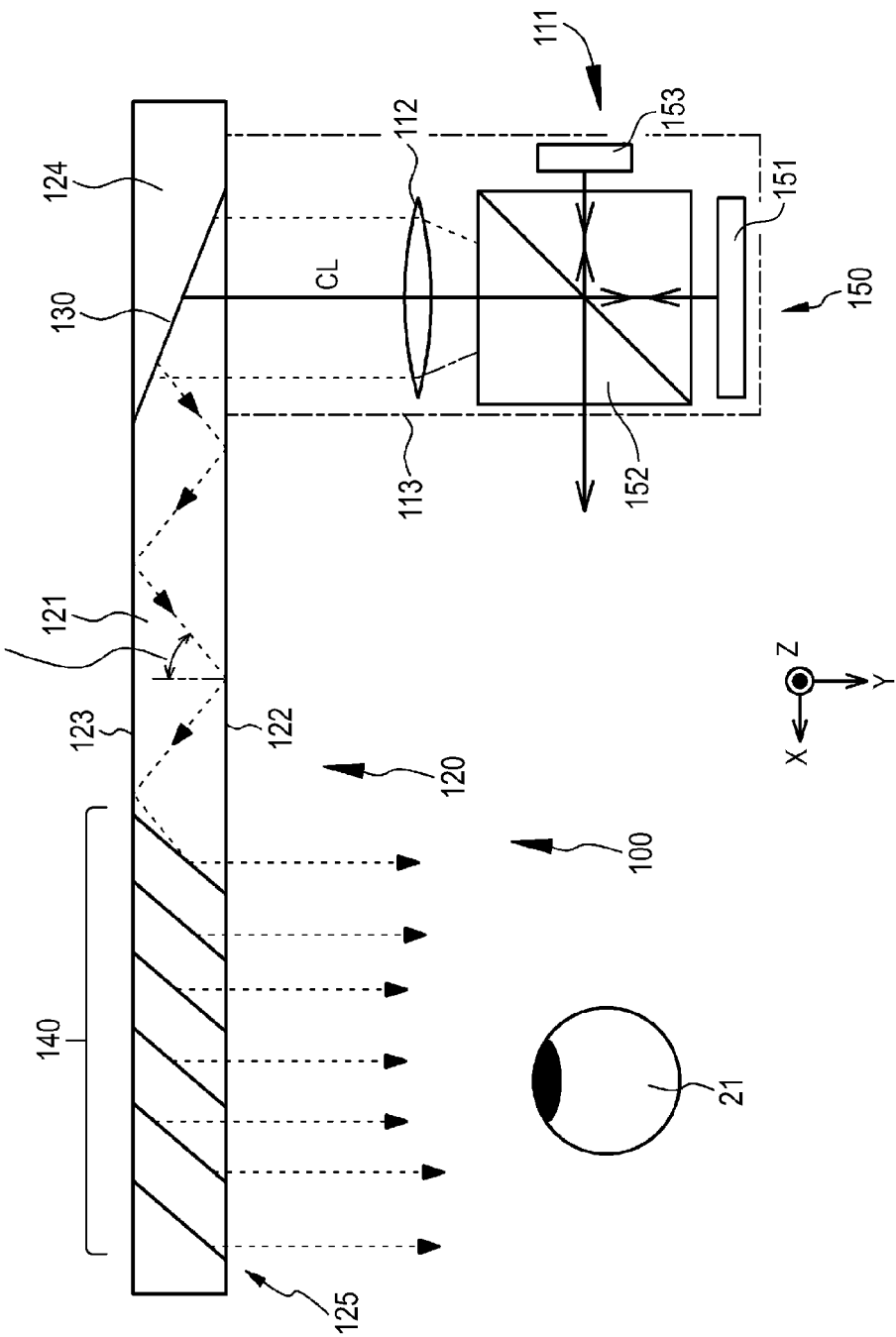
FIG. 1 is a conceptual diagram of an image displaying device of a display apparatus assembly according to Embodiment 1.

Hereinafter, embodiments of the present disclosure will be described with reference to the accompanying drawings. However, the present disclosure is not limited to the embodiments, and various numbers and materials in the embodiments are examples. The description will be presented in the following order.

1. Description of Overview of Display Apparatus Assemblies According to First to Fourth Embodiments of Present Disclosure
2. Embodiment 1 (Display Apparatus Assembly According to Embodiment 1A of Present Disclosure)
3. Embodiment 2 (Display Apparatus Assembly According to Embodiment 1B of Present Disclosure)
4. Embodiment 3 (Display Apparatus Assembly According to Embodiment 1C of Present Disclosure)
5. Embodiment 4 (Display Apparatus Assembly According to Embodiment 1D of Present Disclosure)
6. Embodiment 5 (Display Apparatus Assembly According to Embodiment 1E of Present Disclosure)
7. Embodiment 6 (Modification of Embodiments 1 to 5)
8. Embodiment 7 (Another Modification of Embodiments 1 to 5)
9. Embodiment 8 (Display Apparatus Assembly According to Embodiment 2A of Present Disclosure)
10. Embodiment 9 (Display Apparatus According to Third Embodiment of Present Disclosure)
11. Embodiment 10 (Display Apparatus According to Fourth Embodiment of Present Disclosure)
12. Embodiment 11 (Modification of Embodiments 1 to 10)
13. Embodiment 12 (Another Modification of Embodiments 1 to 10)
14. Embodiment 13 (Modification of Embodiment 12)
15. Embodiment 14 (Modification of Embodiments 1 to 13)
16. Embodiment 15 (Modification of Embodiment 14)
17. Embodiment 16 (Yet Another Modification of Embodiments 1 to 10)
18. Embodiment 17 (Modification of Display Apparatus Assemblies According to Embodiments 1 to 9 and Embodiments 11 to 16)
19. Embodiment 18 (Modification of Display Apparatus Assemblies According to Embodiments 1 to 9 and Embodiments 11 to 16) and Others

Description of Overview of Display Apparatus Assemblies According to First to Fourth Embodiments of Present Disclosure In a display apparatus assembly according to the first embodiment of the present disclosure, a form may be employed in which the convergence angle is changed by controlling an image signal input to an image forming device configuring at least one image displaying device. In addition, the related form is referred to as a "display apparatus assembly according to an embodiment 1A of the present disclosure for convenience of the description.

In addition, a form may be employed in which an arbitrary combination of a horizontal movement, a vertical movement, and a rotary movement of an image displayed in an optical device configuring at least one image displaying device can be achieved by controlling the image signal input to the image forming device that configures at least one image displaying device. In such movements of the image, for example, a non-display area may be secured in the optical device so as to be assigned for the movement of the image. As above, in a case where the mutual optical positions of two image displaying devices are adjusted while controlling the position of an image displayed in the optical device configuring at least one image displaying device, to be more specific, the position of the image displayed in the optical device configuring at least one image displaying device may be controlled such that images displayed by an image displaying device for the left eye and an image displaying device for the right eye coincide with each other at a desired virtual image distance or a desired virtual image position. To be more specific, a display position correcting signal may be added to the original image signal such that images displayed by the image displaying device for the left eye and the image displaying device for the right eye coincide with each other at a desired virtual image distance or a desired virtual image position when the observer is equipped with the display apparatus. In addition, the related display position correcting signal may be stored in the display apparatus (particularly, a control device included in the display apparatus). By employing such a configuration, the position of the image displayed in the optical device can be adjusted. Accordingly, when the observer views the image overlapping an external image, the display position of the external real image to be closely observed and display position of the image are not separated away from each other, whereby the image can be visually recognized further easily.

Alternatively, in the display apparatus assembly according to the first embodiment of the present disclosure, at least one of the image displaying devices (in other words, the image displaying device for the right eye, the image displaying for the left eye, or two image displaying devices for the left and right eyes; hereinafter the same) further includes a movement device that relatively moves an optical axis of the image forming device and an optical axis of the optical system in a horizontal direction, and a convergence angle (a main light beam intersecting angle in the horizontal surface; hereinafter the same) is changed by relatively moving the optical axis of the image forming device and the optical axis of the optical system in the horizontal direction by using the movement device. The related form is referred to as a "display apparatus assembly according to an embodiment 1B of the present disclosure" for convenience of the description.

In addition, in the display apparatus assembly according to the first embodiment of the present disclosure, a form may be employed in which at least one of the image displaying devices further includes a rotary movement device that rotates the image forming device and the optical system, and a convergence angle is changed by rotating the image forming device and the optical system by using the rotary movement device so as to change an incidence angle of the parallel light that is output from the optical system and is incident to the optical device with respect to the optical device. The related formed is referred to as a "display apparatus assembly according to an embodiment 1C of the present disclosure" for convenience of the description.

Alternatively, in the display apparatus assembly according to the first embodiment of the present disclosure, a form may be employed in which the optical system that configures at least one of the image displaying devices includes a liquid lens, and a convergence angle is adjusted by operating the liquid lens. The related form is referred to as a "display apparatus assembly according to an embodiment 1D of the present disclosure for convenience of the description.

Alternatively, in the display apparatus assembly according to the first embodiment of the present disclosure, a form may be employed in which the optical system that configures at least one of the image displaying devices includes a liquid prism, and a convergence angle is changed by operating the liquid prism. The related form is referred to as a "display apparatus assembly according to an embodiment 1E of the present disclosure" for convenience of the description.

Alternatively, in the display apparatus assembly according to the second embodiment of the present disclosure, a form may be employed in which the optical system that configures the image displaying devices includes a liquid lens, and a focal distance of the optical system is changed by operating the liquid lens. The related form is referred to as a "display apparatus assembly according to an embodiment 2A of the present disclosure for convenience of the description.

In the display apparatus assemblies according to the first to third embodiments of the present disclosure that include the above-described various preferred embodiments, a speed measuring device may be configured by a global positioning system (including a car navigation system) and a calculation device that acquires a movement speed based on data supplied from the global positioning system. In such a case, the global positioning system and the calculation device may be a known global positioning system and a known calculation device. Alternatively, in the display apparatus assemblies according to the first to third embodiments of the present disclosure that include the above-described various preferred embodiments, the speed measuring device may be configured by a speed/acceleration sensor and a calculation device that acquires a movement speed based on data supplied from the speed/acceleration sensor. In such a case, the speed/acceleration sensor and the calculation device may be a known speed/acceleration sensor and a known calculation device. Alternatively, in the display apparatus assemblies according to the first to third embodiments of the present disclosure that include the above-described various preferred embodiments, the speed measuring device may be configured by a wheel rotation number detecting device and a calculation device that acquires a movement speed based on data supplied form the rotation number detecting device. In such a case, the wheel rotation number detecting device and the calculation device may be a known rotation number detecting device and a known calculation device.

In the display apparatus assembly according to the fourth embodiment of the present disclosure that includes the above-described preferred embodiments, an acceleration measuring device may be configured by a global positioning system (including a car navigation system) and a calculation device that acquires acceleration based on data supplied from the global positioning system. In such a case, the global positioning system and the calculation device may be a known global positioning system and a known calculation device. Alternatively, the acceleration measuring device may be configured by an acceleration sensor and a calculation device that acquires acceleration based on data supplied form the acceleration sensor. In such a case, the acceleration sensor and the calculation device may be a known speed/acceleration sensor and a known calculation device. Alternatively, the acceleration measuring device may be configured by a wheel rotation number detecting device and a calculation device that acquires acceleration based on data supplied form the rotation number detecting device. In such a case, the wheel rotation number detecting device and the calculation device may be a known rotation number detecting device and a known calculation device.

In the display apparatus assemblies according to the first to fourth embodiments of the present disclosure that include the above-described various preferred embodiments, the optical device may be configured as a semi-transmissive type (see-through type). To be more specific, it is preferable that at least portions of the optical device that face both eyes of an observer are formed to be semi-transmissive (see-through), and the outside landscape can be seen through such portions of the optical device.

The display apparatus assembly according to the first embodiment of the present disclosure that includes the above-described preferred embodiments, the display apparatus assembly according to the second embodiment of the present disclosure that includes the above-described preferred embodiments, the display apparatus assembly according to the third embodiment of the present disclosure that includes the above-described preferred embodiments, and the display apparatus assembly according to the fourth embodiment of the present disclosure that includes the above-described preferred embodiments may be appropriately combined. Here, there are 15 kinds of combinations.

In the display apparatus assemblies (hereinafter, these will be collectively referred to simply as a "display apparatus assembly according to an embodiment of the present disclosure") according to the first to fourth embodiments including the above-described various preferred embodiments and combinations, the speed measuring device and the acceleration measuring device may be a known speed measuring device and a known acceleration measuring device or a known speed/acceleration measuring device. In addition, in the display apparatus assemblies according to the second to fourth embodiments of the present disclosure that include the above-described various preferred embodiments, the image displaying device may be an image displaying device for the right eye, an image displaying device for the left eye, or two image displaying devices for the left and right eyes. The speed measuring device or the acceleration measuring device may be disposed separately from the display apparatus, or may be disposed integrally with the display apparatus.

In the display apparatus assemblies according to the first embodiment of the present disclosure, the convergence angle is changed based on the movement speed of the display apparatus that is measured by the speed measuring device. To be more specific, it may be configured such that the convergence angle is decreased as the movement speed of the display apparatus increases, and the convergence angle is increased as the movement speed of the display apparatus decreases.

In addition, in the display apparatus assembly according to the second embodiment of the present disclosure, the focal distance of the optical system is changed based on the movement speed of the display apparatus that is measured by the speed measuring device, whereby the virtual-image distance of an image displayed by the image displaying device is changed. To be more specific, it may be configured such that the virtual-image distance is increased as the movement speed of the display apparatus increases, and the virtual-image distance is decreased as the movement speed of the display apparatus decreases.

In addition, in the display apparatus assembly according to the fourth embodiment of the present disclosure, the operation of the image displaying device is stopped when the absolute value of the acceleration of the display apparatus during the movement thereof that is measured by the acceleration measuring device is equal to or greater than a predetermined value. To be more specific, for example, the predetermined value may be in the range of 2 m/s$^2$ to 10 m/s$^2$.

In the display apparatus assembly according to the embodiment of the present disclosure, as the content of an image, there is a text, a symbol, a code, a stamp, a mark, a design, a graphic, a map, a hydrographic chart, information of the movement speed or the acceleration of the display apparatus (transportation unit), or various types of information on the transportation unit, and particularly, there is an image content that is appropriate for the use for navigation.

The display apparatus assembly according to the embodiment of the present disclosure is used in a state in which an observer (an operator, a driver, a passenger, or anyone else) is boarded on various types of transportation units or transportation engines including airplanes as a helicopter, an airplane, a light airplane, or a glider, various vehicles such as a car, an electric train, a train, a motor cycle, a two-wheeled vehicle, or a bicycle, and a ship.

A form may be employed in which an image signal used for generating an image in the image forming device is stored in the control device included in the display apparatus assembly. Depending on the situations, the image may be configured to be transmitted from the transportation unit to the display apparatus assembly by an appropriate unit in a wireless manner including Bluetooth and Wi-Fi or a wired manner. Then, a process for displaying an image is performed for the image signal by the control device. Various types of information data including the movement speed or the acceleration output from the calculation device is transmitted to the control device in a wired manner or a wireless manner, and the control device performs a process for various types of information including the movement speed or the acceleration. The control device (a control unit or a control circuit) may be configured by a known circuit. In addition, various types of data represented below as examples may be stored in a storage unit that is included in the control device. In addition, various types of data represented below as examples may be changed depending on the type or the model of the movement device, and each of the various types of data that depend on the type, the model, and the like of the movement unit may be stored in the storage unit. The storage unit may be a known storage unit, for example, a memory card. The display position of the image may be a position that does not interfere with the viewing of a real image in a real space.

Relationship between movement speed of display apparatus and convergence angle

Control of image signal input to image forming device for changing convergence angle Relationship between movement speed of display apparatus and movement amount of movement device Relationship between movement speed of display apparatus and rotary movement amount of rotary movement device Relationship between movement speed of display apparatus and operation state of liquid lens Relationship between movement speed of display apparatus and operation state of liquid prism Relationship between movement speed of display apparatus and virtual-image distance Relationship between movement speed of display apparatus and size of image Relationship between movement speed of display apparatus and luminance of image Relationship between movement speed of display apparatus and resolution of image Relationship between movement speed of display apparatus and content of image Predetermined value of acceleration Alternatively, in the display apparatus assembly according to the embodiment of the present disclosure, which includes the preferred various forms and configurations described above, a configuration may be employed in which the control device included in the display apparatus includes a storage unit, a data group configured by a plurality of image signals used for displaying an image is stored in the storage unit, each image signal is configured by a plurality of sets of different-size display data having different display sizes, one set of the different-size display data is read out from the storage unit among a plurality of sets of different-size display data by the control device out based on the relationship between the movement speed of the display apparatus and the size of the image, and an image on the basis of the one set of the different-size display data is displayed in the display apparatus. In the display apparatus assembly having such a configuration, since one set of different-size display data is read out from the storage unit among a plurality of different-size display data, and an image on the basis of the one set of different-size display data is displayed in the image forming device, it is difficult for unbalance between the size of the real image, on which viewpoints are concentrated, that is observed by the eyes and the size of the image to occur.

Alternatively, in the display apparatus assembly according to the embodiment of the present disclosure, which includes the preferred various forms and configurations described above, a configuration may be employed in which the control device included in the display apparatus includes a storage unit, a data group configured by a plurality of image signals (for example, text data) used for displaying an image is stored in the storage unit, each image signal is configured by a plurality of sets of different-language display data having different display languages, one set of the different-language display data is read out from the storage unit among a plurality of sets of different-language display data by the control device, and an image on the basis of the one set of the different-language display data is displayed in the display apparatus. As an example of method of selecting or designating a language as a display language, there is a method in which, for example, a button or a switch is arranged in the control device, and a language is manually designed or selected as the display language. In the display apparatus assembly having such a configuration, since one set of different-language display data is read out from the storage unit among a plurality of sets of different-language display data out of image signals by the control unit, and an image on the basis of the one set the different-language display data is displayed in the image forming device, an image display in the language used by the observer can be performed in an easy manner.

Here, the format of image data configuring an image signal may be appropriately selected depending on a display apparatus or a system that is used, and, for example, the image data may be text data that is formed by a text string or data that is formed as an image. The number of data groups is fundamentally arbitrary, and, the number of sets of data configuring the data group and the number of sets of display data are fundamentally arbitrary. The data structure of the display data, for example, may be text data formed by a text string or image data acquired by forming a text string as an image. The display data having different sizes may be text data that is formed by text strings having different font sizes or may be image data acquired by forming a text string having a different font size as an image. The display language of the display data is fundamentally arbitrary. By performing predetermined signal processing for the display data, an image signal can be acquired.

In addition, the various display apparatus assemblies described above may be appropriately combined.

In the display apparatus assembly according to the embodiment of the present disclosure, a form may be employed in which a light receiving sensor is further included, and the luminance of an image to be displayed in the optical device is controlled based on luminance information of the environment (the ambience in which the display apparatus assembly is placed) that is acquired by the light receiving sensor. To be more specific, as examples of the light receiving sensor, there are a photodiode or a light receiving device used for measuring the exposure that is included in the camera described above or an imaging device.

In an image displaying device (hereinafter, briefly referred to as an "image displaying device according to an embodiment of the present disclosure") that configures a display apparatus assembly according to an embodiment of the present disclosure, which includes the preferred various forms and configurations described above, an optical device may be configured so as to include:

(a) a light guiding plate in which light incident thereto propagates through the inside through total reflection and from which the light is output thereafter;

(b) a first deflection unit that deflects the light incident to the light guiding plate such that the light incident to the light guiding plate is totally reflected inside the light guiding plate; and (c) a second deflection unit that deflects the light propagating through the inside of the light guiding plate through total reflection over a plurality of times for outputting the light propagating through the inside of the light guiding plate through total reflection from the light guiding plate. Here, the term "total reflection" represents the internal total reflection or total reflection inside the light guiding plate. Hereinafter, the "total reflection" represents the same.

Light beams that are output from the center of the image forming device and pass through a nodal point of the optical system that is positioned on the side of the image forming device is referred to as a "center light beam, and a light beam that is vertically incident to the optical device out of the center light beams is referred to as a "center-incident light beam". A point at which the center-incident light beam is incident to the optical device is set as an optical device center point, an axial line that passes though the optical device center point and is parallel to the axial line of the optical device is set as the X axis, and an axial line that passes through the optical device center point and coincides with the normal line of the optical device is set as the Y axis. The horizontal direction in the display apparatus assembly according to the embodiment of the present disclosure is a direction parallel to the X axis and may be referred to as an "X-axis direction". Here, the optical system is arranged between the image forming device and the optical device and allows the light output from the image forming device to be parallel light. Then, the light beam formed to be parallel by the optical system is incident to the optical device, is guided, and is output. In addition, the center point of the first deflection unit is set as the "optical device center point".

In the image displaying device according to the embodiment of the present disclosure, the center light beams may be configured so as to intersect the XY plane at an angle (θ) other than 0°. However, the configuration of the image displaying device is not limited thereto. Accordingly, the limitation on the attachment angle of the image displaying device at the time of installing the image displaying device to an attachment portion of a glass-type frame decreases, whereby a high degree of freedom for design can be acquired. When the XY plane is assumed to coincide with the horizontal plane, the angle θ at which the center light beams intersect the XY plane may be configured as an elevation angle. In other words, the center light beams may be configured to collide with the XY plane from the lower side of the XY plane toward the XY plane. In such a case, it is preferable that the XY plane intersects the vertical surface at an angle other than 0°, and it is more preferable that the XY plane intersects the vertical surface at an angle θ'. Furthermore, although the maximum value of the angle θ' is not limited, it may be 5°. Here, the horizontal plane includes a line of sight (horizontal line of sight of an observer) when an observer views a target (for example, a target located at an infinite distance, for example, the horizon) that is located in the horizontal direction and is a plane in which two pupils of the observer that are horizontally positioned are included. In addition, the vertical plane is a plane that is perpendicular to the horizontal plane. Alternatively, a form may be employed in which the center light beams that are output from the optical device and are incident to the pupils of the observer form a depression angle when an observer views a target (for example, a target located at an infinite distance, for example, the horizon) that is located in the horizontal direction. The depression angle relating to the horizontal plane, for example, may be in the range of 5° to 45°.

Here, it may be configured such that the first deflection unit reflects the light incident to the light guiding plate, and the second deflection unit transmits and reflects light propagating through the inside of the light guiding plate through total reflection over a plurality of times. In this case, it may be configured such that the first deflection unit serves as a reflective mirror, and the second deflection unit serves as a semi-transmissive mirror.

In such a configuration, the first deflection unit, for example, is formed from metal containing an alloy and can be configured by a light reflecting film (one type of mirror) that reflects the light incident to the light guiding plate or a diffraction grating (for example, a hologram diffraction grating film) that diffracts the light incident to the light guiding plate. In addition, the second deflection unit can be configured by a multi-layer laminated structure body in which multiple dielectric lamination films are laminated, a half mirror, a polarizing beam splitter, or a hologram diffraction grating film. The first deflection unit or the second deflection unit is arranged inside of the light guiding plate (built inside of the light guiding plate). In the first deflection unit, parallel light incident to the light guiding plate is reflected or diffracted such that the parallel light incident to the light guiding plate is totally reflected inside the light guiding plate. On the other hand, in the second deflection unit, the parallel light propagating through the inside of the light guiding plate through total reflection is reflected or diffracted over a plurality of times so as to be output from the light guiding plate in the state of parallel light.

Alternatively, it may be configured such that the first deflection unit diffracts the light incident to the light guiding plate, and the second deflection unit diffracts the light propagating through the inside of the light guiding plate through total reflection over a plurality of times. In such a case, the first deflection unit and the second deflection unit may be in the form of being configured by diffraction grating devices, and, furthermore, the diffraction grating devices may be formed by reflective-type diffraction grating devices or transmissive-type diffraction grating devices, or it may be configured such that one diffraction grating device is formed by a reflective-type diffraction grating device, and the other diffraction grating device is formed by a transmissive-type diffraction grating device. As an example of the reflective-type diffraction grating device, there is a reflective-type volume hologram diffraction grating. For the convenience of the description, the first deflection unit that is formed by the reflective-type volume hologram diffraction grating may be referred to as a "first diffraction grating member", and the second deflection unit that is formed by the reflective-type volume hologram diffraction grating may be referred to as a "second diffraction grating member".

According to the image display apparatus assembly according to the embodiment of the present disclosure, an image display of a single color (for example, green) can be performed. However, in the case of performing a color image display, in order to allow the first diffraction grating member or the second diffraction grating member to be in correspondence with the diffraction and the reflection of P types (for example, P=3, and three types of red, green and blue) of light having P different types of wavelength bands (or wavelengths), the first diffraction grating member or the second diffraction grating member may be configured by laminating the diffraction grating layers of P layers formed by the reflective-type volume hologram diffraction gratings. In each diffraction grating layer, interference fringes corresponding to one type of the wavelength band (or the wavelength) are formed. Alternatively, in order to be in correspondence with the diffraction and the reflection of light of P types having different P-type wavelength bands (or wavelengths), interference fringes of P types may be configured to be formed in the first diffraction grating member or the second diffraction grating member that is formed by a diffraction grating layer of one layer. Alternatively, it may be configured such that the angle of view, for example, is divided into three equal portions, and the first diffraction grating member or the second diffraction grating member is formed by laminating a diffraction grating layer corresponding to each angle of view. By employing such a configuration, an increase in the diffraction efficiency, an increase in the diffraction acceptance angle, and the optimization of the diffraction angle at the time of diffracting and reflecting light having each wavelength band (or the wavelength) by using the first diffraction grating member or the second diffraction grating member can be achieved.

As the material that forms the first diffraction grating member and the second diffraction grating member, there is a photopolymer material. The composition material and the basic structure of the first diffraction grating member and the second diffraction grating member that are formed by reflective-type volume hologram diffraction gratings may be the same as those of a general reflective-type volume hologram diffraction grating. The reflective-type volume hologram diffraction grating represents a hologram diffraction grating that diffracts and reflects only the +1st order diffracted light. In the diffraction grating member, interference fringes are formed over the surface thereof from the inside, and a method of forming the related interference fringes may be the same as a general forming method thereof. To be more specific, for example, the interference fringes that are formed by the object light and the reference light may be recorded inside a member that configures the diffraction grating member by irradiating a member (for example, a photopolymer material) configuring the diffraction grating member with the object light in a first predetermined direction on one side, and concurrently irradiating the member configuring the diffraction grating member with reference light in a second predetermined direction on the other side. By appropriately selecting the first predetermined direction, the second predetermined direction, and the wavelengths of the object light and the reference light, a desired pitch of the interference fringes and a desired angle of inclination (inclination angle) of the interference fringes on the surface of the diffraction grating member can be acquired. The angle of inclination of the interference fringes represents an angle that is formed by the surface of the diffraction grating member (or the diffraction grating layer) and the interference fringes. In a case where the first diffraction grating member and the second diffraction grating member are configured from a laminated structure of the diffraction grating layers as P layers that are formed by reflective-type volume hologram diffraction gratings, the laminating of the diffraction grating layers may be performed by using a method in which, after the diffraction grating layers as P layers are individually manufactured, the diffraction grating layers as P layers are laminated (bonded), for example, by using an ultraviolet curing adhesive. Alternatively, the diffraction grating layers as P layers may be manufactured by using a method in which, after a diffraction grating layer as one layer is manufactured using a photopolymer material having adhesiveness, diffraction grating layers are manufactured by sequentially attaching photopolymer materials having adhesiveness thereon.

Alternatively, in the image displaying device according to the embodiment of the present disclosure, a form may be employed in which the optical device is configured by a semi-transmissive mirror to which light output from the image forming device is incident so as to be output toward the pupil of the observer. In addition, a structure may be employed in which the light output from the image forming device propagates through the air and is incident to the semi-transmissive mirror, or a structure may be employed in which the light propagates through the inside of a transparent member (to be more specific, a member that is formed from a material that is the same as the material composing the light guiding plate to be described later) such as a glass plate or a plastic plate and is incident to the semi-transmissive mirror. In addition, the semi-transmissive mirror may be attached to the image forming device through the transparent member, or the semi-transmissive mirror may be attached to the image forming device through a member other than the transparent member.

In the image displaying device according to the embodiment of the present disclosure, which includes the various preferred forms and configurations described above, a form may be employed in which the image forming device has a plurality of pixels arranged in a two-dimensional matrix pattern. For the convenience of the description, the configuration of such an image forming device is referred to as an "image forming device according to the first configuration".

As examples of the image forming device according to the first configuration, for example, there are: an image forming device that is configured by a reflective-type spatial light modulation device and a light source; an image forming device that is configured by a transmissive-type spatial light modulation device and a light source; and an image forming device that is configured by a light emitting device such as an organic EL (Electro Luminescence), an inorganic EL, or a light emitting diode (LED). Of the above-described image forming devices, the light forming device that is configured by a reflective-type spatial light modulation device and a light source is preferably used. As examples of the spatial light modulation device, a light valve, for example, a transmissive-type or a reflective-type liquid crystal display device such as an LCOS (Liquid Crystal On Silicon) and a digital micro mirror device (DMD), and, as an example of the light source, there is a light emitting device. Furthermore, the reflective-type spatial light modulation device may have a configuration that is formed by a liquid crystal display device, and a polarizing beam splitter that reflects a part of the light emitted from the light source and guides the part of the light to the liquid crystal display device, and allows a part of the light reflected by the liquid crystal display device to pass through it so as to be guided to an optical system. As examples of the light emitting device that configures the light source, there are a red light emitting device, a green light emitting device, a blue light emitting device, and a white light emitting device. Alternatively, white light may be acquired by performing color mixing and luminance uniformization of red light, green light, and blue light emitted from the red light emitting device, the green light emitting device, and the blue light emitting device by using a light pipe. As examples of the light emitting device, there are a semiconductor laser device, a solid-state laser, and an LED. The number of the pixels can be determined based on the specification that is demanded for the image displaying device. As examples of specific values of the number of the pixels, there are 320×240, 432×240, 640×480, 1024×768, 1920×1080, and the like.

Alternatively, in the image displaying device according to the embodiment of the present disclosure, which includes the preferred forms and configurations described above, the image forming device may have a form in which a light source and a scanning unit scanning parallel light emitted from the light source are included. For the convenience of the description, the configuration of such an image forming device is referred to as an "image forming device according to the second configuration".

As an example of the light source of the image forming device according to the second configuration, there is a light emitting device. To be more specific, there are a red light emitting device, a green light emitting device, a blue light emitting device, and a white light emitting device. Alternatively, white light may be acquired by performing color mixing and luminance uniformization of red light, green light, and blue light emitted from the red light emitting device, the green light emitting device, and the blue light emitting device by using a light pipe. As examples of the light emitting device, there are a semiconductor laser device, a solid-state laser, and an LED. The number of pixels (virtual pixels) of the image forming device according to the second configuration can be determined based on the specification that is demanded for the image displaying device. As examples of specific values of the number of the pixels, there are 320×240, 432×240, 640×480, 1024×768, 1920×1080, and the like. In addition, in a case where a color image display is performed, and the light source is configured by a red light emitting device, a green light emitting device, and a blue light emitting device, it is preferable that color composition is performed, for example, by using a cross prism. As examples of the scanning unit, MEMS (Micro Electro Mechanical Systems), which have a micro mirror that can be rotated in a two-dimensional direction, and a galvano-mirror that perform horizontal scanning and vertical scanning of the light emitted from the light source can be given.

In the image forming device according to the first configuration or the image forming device according to the second configuration, light that is formed as a plurality of parallel light beams by an optical system (an optical system that forms output light as parallel light beams and may be referred to as a "parallel light output optical system"; more particularly, for example, a collimator optical system or a relay optical system) is incident to the light guiding plate. However, such a demand for the parallel light beams is based on light wave-front information at the time when the light is incident to the light guiding plate is necessarily conserved after the light is output from the light guiding plate through a first deflection unit and a second deflection unit. In addition, in order to generate a plurality of parallel light beams, particularly, for example, a light output portion of the image forming device may be located at a place (position) that is positioned at a focal distance of the parallel light output optical system. The parallel light output optical system has a function for converting the position information of a pixel into angle information in the optical system of the optical device. In the display apparatus assembly according to the embodiment of the present disclosure, as an example of the parallel light output optical system, there is an optical system, which has positive optical power as a whole, configured by one of a convex lens, a concave lens, a free-form surface prism, and a hologram lens or a combination thereof. Between the parallel light output optical system and the light guiding plate, a light shielding member having an opening portion may be arranged so as not to allow undesirable light to be emitted from the parallel light output optical system and be incident to the light guiding plate.

The light guiding plate has two parallel faces (first and second faces) that extend in parallel with the axial line (the X axis) of the light guiding plate. When the face of the light guiding plate to which light is incident is represented as a light guiding plate incidence face, and the face of the light guiding plate from which light is output is represented as a light guiding plate output face, the light guiding plate incidence face and the light guiding plate output face may be configured by the first face, or it may be configured such that the light guiding plate incidence face is configured by the first face, and the light guiding plate output face is configured by the second face. As examples of the material composing the light guiding plate, there are quartz crystal glass, glass containing optical glass such as BK7, and a plastic material (for example, PMMA, a polycarbonate resin, an acrylic resin, an amorphous polypropylene-based resin, or a styrene-based resin containing an AS resin). The shape of the light guiding plate is not limited to a parallel plate and may have a curved shape.

Based on the movement speed of the display apparatus that is measured by the speed measuring device, the convergence angle is changed in the display apparatus assembly according to the first embodiment of the present disclosure, the focal distance of the optical system is changed in the display apparatus assembly according to the second embodiment of the present disclosure, at least one of the size of an image displayed in the optical device, the luminance of the image, the resolution of the image, and the content of the image is changed in the display apparatus assembly according to the third embodiment of the present disclosure, and the operation of the image displaying device is stopped based on the acceleration measured by the acceleration measuring device in the display apparatus assembly according to the fourth embodiment of the present disclosure. Such operations may be controlled in accordance with a control signal supplied from the control device.

In the display apparatus assembly according to the embodiment 1A of the present disclosure, the convergence angle can be changed by controlling the image forming position in the image forming device by controlling an image signal input to the image forming device that configures at least one image displaying device, and more particularly, by moving the image forming position in the horizontal direction (the X-axis direction) in the image forming device.

In the display apparatus assembly according to the embodiment 1B of the present disclosure, the optical axis of the image forming device and the optical axis of the optical system are relatively moved in the horizontal direction (the X-axis direction) by the movement device. To be more specific, as an example, a form may be employed in which, while fixing the positional relationship between the optical axis of the image forming device and the optical axis of the optical system of one image displaying device, the positions of the optical axis of the image forming device and the optical axis of the optical system of the other image displaying device are relatively moved in the horizontal direction (the X-axis direction). Alternatively, as an example, there is a form in which the positions of the optical axes of the image forming devices and the optical axes of the optical system of both the image displaying devices are relatively moved in the horizontal direction (the X-axis direction). In such a form, a change in the incidence angle (an angle formed by the center light beam and the YZ plane, and, hereinafter, referred to as a "YZ plane incidence angle") of parallel light, which is output from the optical system and is incident to the optical device, with respect to the optical device, occurs. In addition, in such a form, a system may be employed in which one of the image forming device and the optical system is placed in a moving guide portion that is configured, for example, by a rack gear unit, and one of the image forming device and the optical system is moved on the moving guide unit by a motor and a pinion gear. Alternatively, a system may be employed in which one of the image forming device and the optical system is placed in the moving guide unit, and one of the image forming device and the optical system is moved on the moving guide unit by using a piezoelectric device or an ultrasonic motor.

In the display apparatus assembly according to the embodiment 1C of the present disclosure, the image forming device and the optical system are rotated by the rotary movement device. To be more specific, while fixing the positional relationship of the optical axes of the image forming devices and the optical axes of the optical systems of two image displaying devices, at least one image displaying device may be rotated around the Z axis as a rotation axis by operating a piezoelectric device, a motor, or an ultrasonic motor. Even in such a form, a change in the YZ plane incidence angle of the parallel light, which is output from the optical system and is incident to the optical device, with respect to the optical device, occurs.

In the display apparatus assembly according to the embodiment 1D of the present disclosure, the liquid lens is operated, and the related liquid lens that configures the optical system may be configured by a known liquid lens that utilizes an electrowetting phenomenon. Through the operation of the liquid lens, while maintaining the relationship between the optical axis of the optical system and the Y axis to be constant, the optical axis of the optical system can be moved in the horizontal direction (the X-axis direction), or the angle of the optical axis of the optical system with respect to the YZ plane can be changed. Even in such a form, a change in the YZ plane incidence angle of the parallel light, which is output from the optical system and is incident to the optical device, with respect to the optical device, occurs.

In the display apparatus assembly according to the embodiment 1E of the present disclosure, the liquid prism is operated, and the related liquid prism that configures a part of the optical system may be configured by a known liquid prism that utilizes an electrowetting phenomenon. Through the operation of the liquid prism, the optical axis of the optical system with respect to the YZ plane can be changed. Even in such a form, a change in the YZ plane incidence angle of the parallel light, which is output from the optical system and is incident to the optical device, with respect to the optical device, occurs.

In the display apparatus assembly according to the embodiment of the present disclosure, a frame may be configured by a front portion that is arranged to the front side of the observer and two temple portions that are attached to both ends of the front portion through hinges so as to be freely rotatable. In addition, to the tip end portion of each temple portion, an ear band portion is attached. The image displaying device is attached to the frame, and more particularly, for example, the image forming device may be attached to the temple portion.

Furthermore, the display apparatus assembly according to the embodiment of the present disclosure may employ a configuration in which a nose pad is attached. In other words, when the entire display apparatus of the display apparatus assembly according to the embodiment of the present disclosure is seen, an assembly of the frame and the nose pad has a structure that is approximately the same as that of ordinary glasses. In addition, a rim portion may be or may not be included. The material composing the frame may be a metal, alloy, or plastic, or a combination thereof and may be the same material as that which composes ordinary glasses. The configuration and the structure of the nose pad may be those that are known.

In addition, a form may be employed as is necessary in which the imaging device is attached to the center portion of the front portion. To be more specific, the imaging device is configured by a solid-state imaging device that is, for example, formed by a CCD or a CMOS sensor and a lens. A wiring extending from the imaging device may be connected to one image displaying device (or the image forming device), for example, through a front portion and, furthermore, may be included in a wiring extending from the image displaying device (or the image forming device).

In the display apparatus of the display apparatus assembly according to the embodiment of the present disclosure, from the viewpoint of design or ease of wearing, it is preferable to employ a form in which wirings (signal lines, power lines, or the like) extending from two image forming devices extend from the tip end portion of the ear bend portion toward the outside so as to be connected to the control device (a control unit or a control circuit) through the inside of the temple portion and the ear bend portion. Furthermore, a form may be employed in which each image forming device includes a headphone portion, and a wiring for the headphone portion from each image forming device extends from the tip end portion of the ear bend portion to the headphone portion through the inside of the temple portion and the ear bend portion. As examples of the headphone portion, there are a headphone portion of an inner-ear type and a headphone portion of a canal type. To be more specific, a form is preferable in which the wiring for the headphone portion from the tip end portion of the ear bend portion wraps around the rear side of the auricle (auditory capsule) and extends to the headphone portion.

Embodiment 1

Figure 2:
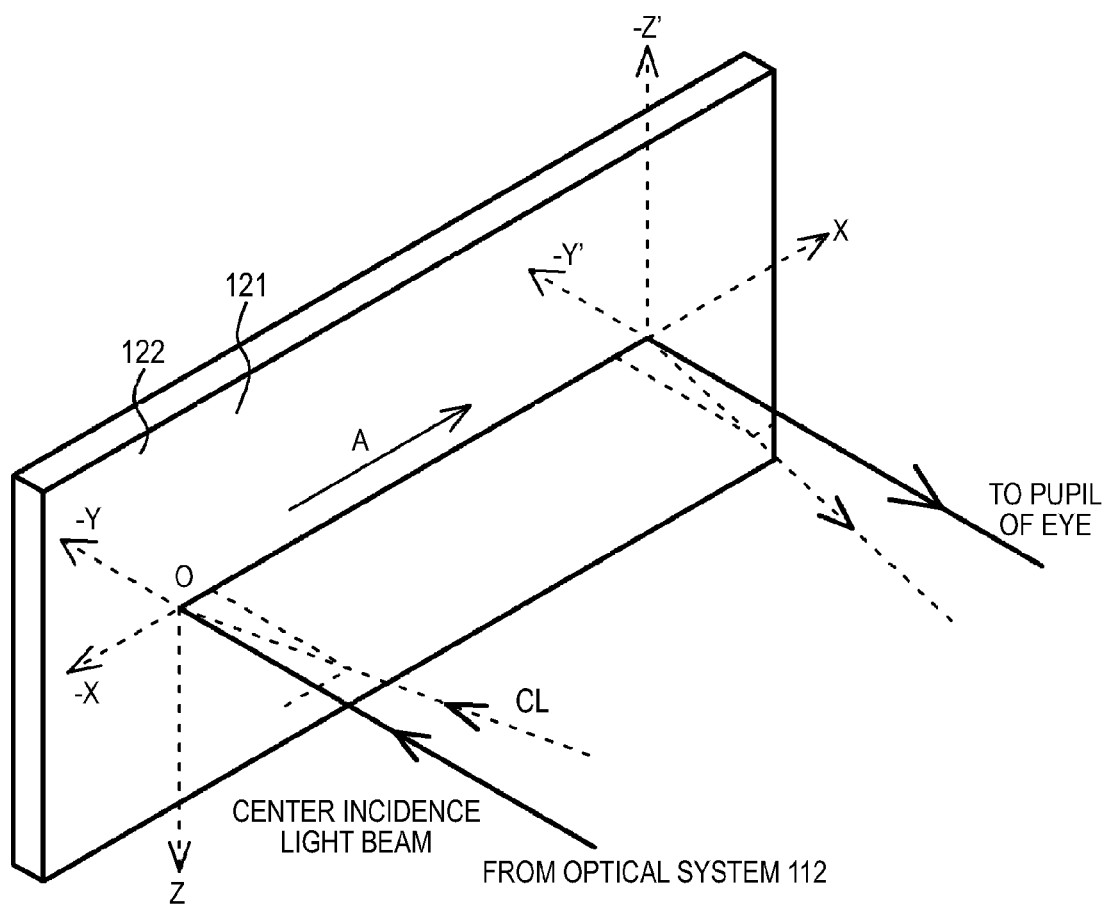
FIG. 2 is a diagram schematically illustrating the propagation of light in a light guiding plate configuring an image displaying device of a display apparatus assembly according to Embodiment 1 or 2.
Figure 3:
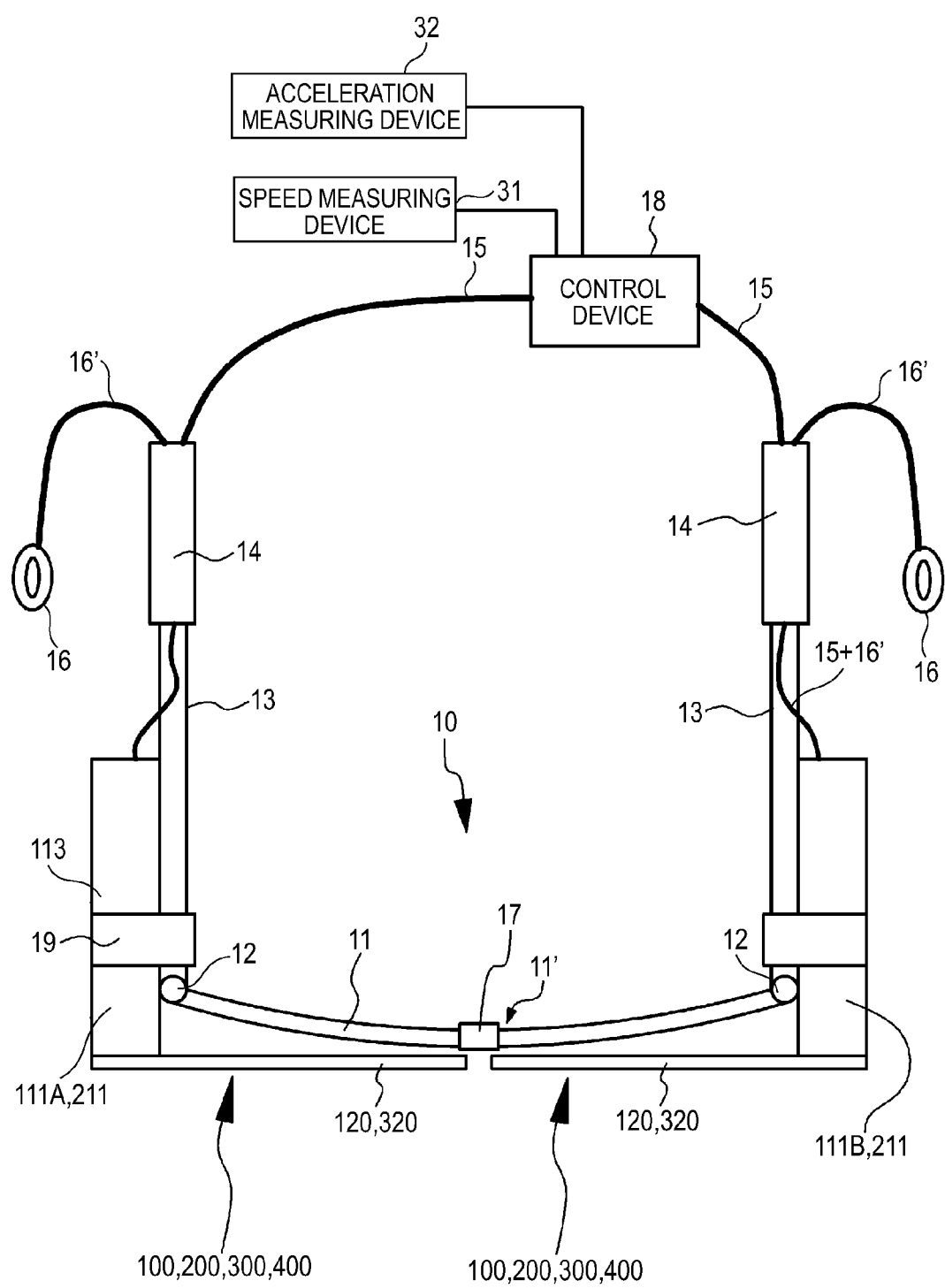
FIG. 3 is a schematic diagram of a display apparatus of a display apparatus assembly according to Embodiment 1, viewed from the upper side thereof.
Figure 4:
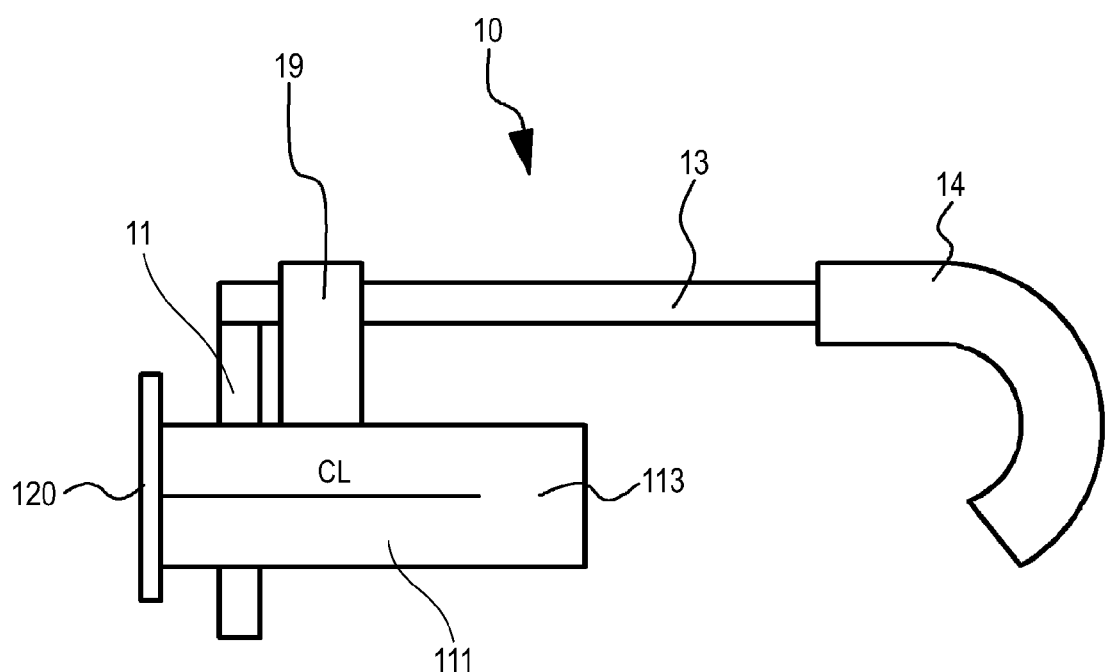
FIG. 4 is a schematic diagram of a display apparatus of a display apparatus assembly according to Embodiment 1, viewed from the side.
Figure 5:
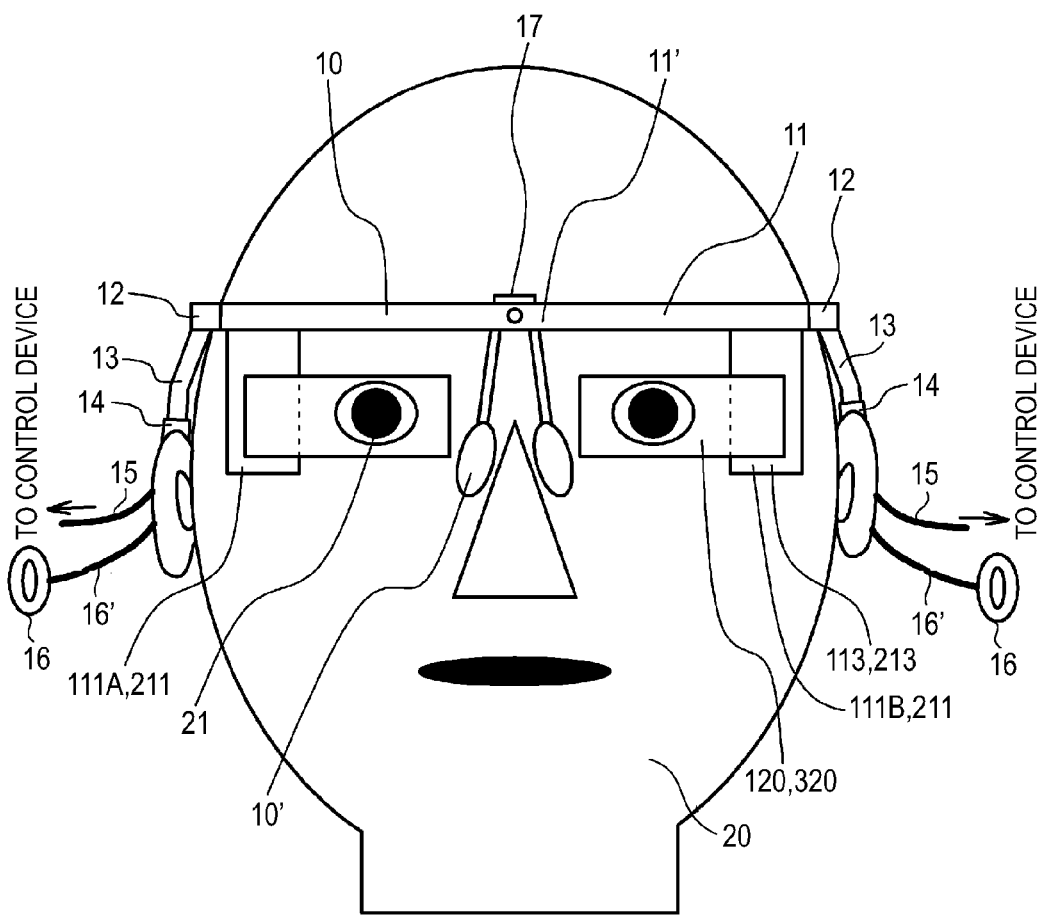
FIG. 5 is a schematic diagram of a display apparatus of a display apparatus assembly according to Embodiment 1, viewed from the front side.
Figure 6:
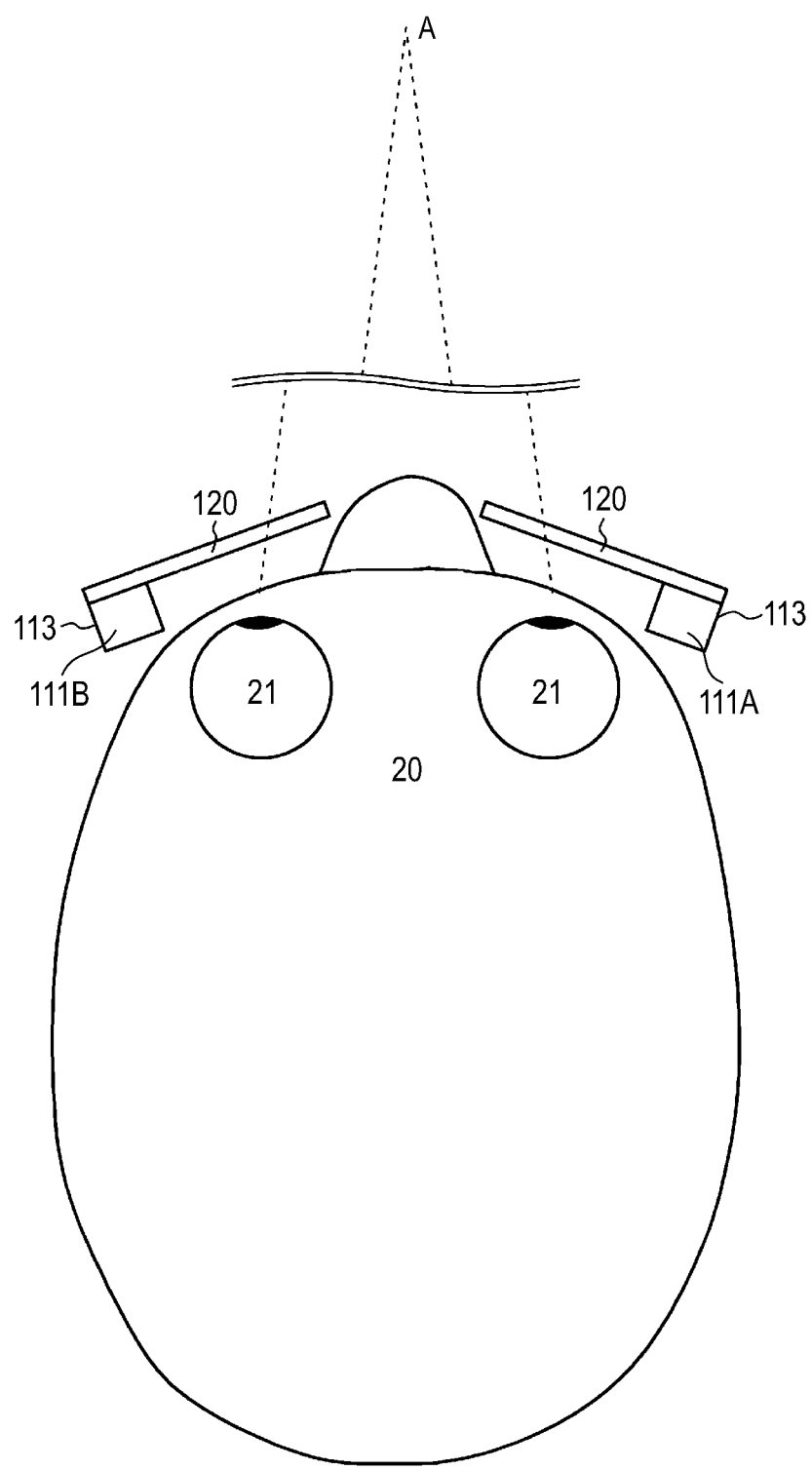
FIG. 6 is a diagram illustrating a state viewed from the upper side in which a display apparatus of a display apparatus assembly according to Embodiment 1 is mounted on a head of an observer (here, only the image displaying device is shown, but a frame is not shown).
Figures 7A, 7B:
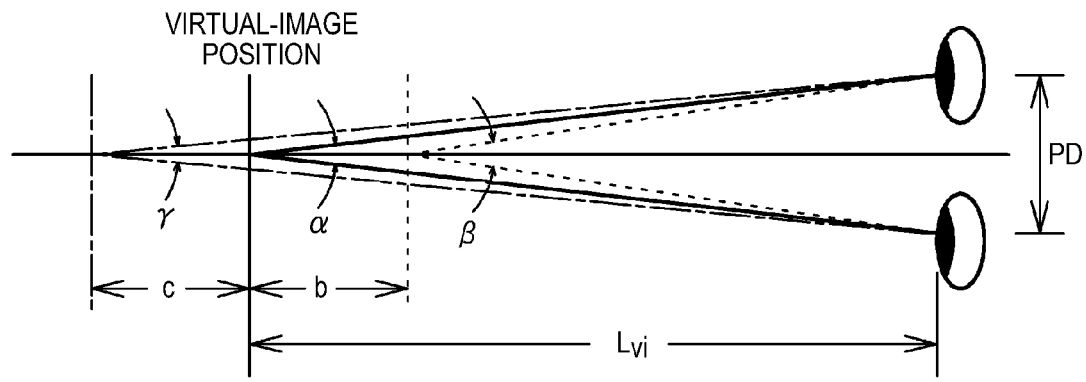
FIG. 7A is a diagram illustrating an example of an image signal according to Embodiment 1.
FIG. 7B is a schematic diagram illustrating the adjustment of a convergence angle.

Embodiment 1 relates to the first embodiment of the present disclosure, and more particularly, to the display apparatus assembly according to the embodiment 1A of the present disclosure. FIG. 1 is a conceptual diagram of an image displaying device of a display apparatus according to Embodiment 1, and the display apparatus according to Embodiment 1 is configured by a head-mounted display (HMD). In addition, FIG. 2 schematically represents the propagation of light in a light guiding plate that configures the image displaying device of the display apparatus according to Embodiment 1, FIG. 3 is a schematic diagram of the display apparatus viewed from the upper side, and FIG. 4 is a schematic diagram thereof viewed from the side. Furthermore, FIG. 5 is a schematic diagram of the display apparatus according to Embodiment 1 viewed from the front side, FIG. 6 is a diagram illustrating a state, in which the display apparatus according to Embodiment 1 is mounted to the head of an observer, viewed from the upper side (here, only the image displaying device is shown, but the frame is not shown), and FIG. 7A illustrates an example of an image signal according to Embodiment 1. In FIG. 2, the center light beam before the movement of the optical axis of the image forming device and the optical axis of the optical system in the horizontal direction (X-axis direction) is denoted by a solid line, and the center light beam after the movement is denoted by a dotted line. A speed measuring device 31 and an acceleration measuring device 32 are shown only in FIG. 3.

The display apparatus assembly according to Embodiment 1 or any one of Embodiments 2 to 16 includes: a display apparatus; and a speed measuring device 31 that measures the movement speed of the display apparatus (hereinafter, may be briefly referred to as a "movement speed).

The display apparatus includes: (A) a glass-type frame 10 mounted to the head of an observer (an operator, a driver, a passenger, or anyone else) 20; and (B) two image displaying devices 100, 200, 300, 400, and 500 for the left and right eyes that are mounted to the frame 10. In other words, the display apparatus is a binocular type including two image displaying devices. Each of the image displaying devices 100, 200, 300, 400, and 500 includes: (A) an image forming device 111 or 211; (B) an optical system (parallel light output optical system) 112 or 254 that forms the light output from the image forming device 111 or 211 to be parallel light; and (C) an optical device (light guiding unit) 120, 320, or 520 to which light output from the optical system 112 or 254 is incident and is guided so as to be output. The image displaying devices 100, 200, 300, 400, and 500 may be fixedly attached to the frame or may be detachably attached to the frame. Here, the optical systems 112 and 254 are arranged between the image forming devices 111 and 211 and the optical devices 120, 320, and 520. The light beams formed as the parallel light by the optical system 112 or 254 is incident to the optical device 120, 320, or 520 and is guided so as to be output. The image forming device 111 or 211 displays a single color (for example, green) image. In addition, the optical devices 120, 320, and 520 are a semi-transmissive type (see-through type). To be more specific, at least a part (more specifically, light guiding plates 121 and 321 and second deflection units 140 and 340 to be described later) of the optical device facing both eyes of an observer 20 is semi-transmissive (see-through).

In addition, in Embodiment 1 or in any one of Embodiments 2 to 16 to be described later, a point at which center incident light beams vertically incident to the optical device 120 or 320 are incident to the optical device 120, 320, or 520, out of light beams (center light beams CL) that are output from the center of the image forming device 111 or 211 and passes through the nodal point of the optical system 112 or 254 that is located on the image forming device side, is set as an optical device center point O, an axial line that passes through the optical device center point O and is parallel to the direction of the axial line of the optical device 120, 320, or 520 is set as the X axis, and an axial line that passes through the optical device center line O and coincides with the normal line of the optical device 120, 320, or 520 is set as the Y axis. In addition, the center point of the first deflection unit 130 or 330 described next is the optical device center point O.

The optical device 120 or 320 according to Embodiment 1 or any one of Embodiments 2 to 15 to be described later includes:

(a) a light guiding plate 121 or 321 in which light incident thereto propagates to the inside through total reflection and then from which the light is output;

(b) a first deflection unit 130 or 330 that deflects the light incident to the light guiding plate 121 or 321 such that the light incident to the light guiding plate 121 or 321 is totally reflected inside the light guiding plate 121 or 321; and (c) a second deflection unit 140 or 340 that deflects the light propagating through the inside of the light guiding plate 121 or 321 through total reflection over a plurality of times for outputting the light propagating through the inside of the light guiding plate 121 or 321 through total reflection from the light guiding plate 121 or 321.

Here, in Embodiment 1, the first deflection unit 130 and the second deflection unit 140 are arranged inside the light guiding plate 121. The first defection unit 130 reflects the light incident to the light guiding plate 121, and the second deflection unit 140 transmits and reflects the light propagating through the inside of the light guiding plate 121 through total reflection a plurality of times. In other words, the first deflection unit 130 serves as a reflecting mirror, and the second deflection unit 140 serves as a semi-transmissive mirror. To be more specific, the first deflection unit 130 disposed inside the light guiding plate 121 is formed from aluminum (Al) and is configured by a light reflecting film (one type of mirror) that reflects the light incident to the light guiding plate 121. On the other hand, the second deflection unit 140 disposed inside the light guiding plate 121 is configured by a multi-layer laminated structure body in which a plurality of dielectric lamination films are laminated. The dielectric lamination film, for example, is configured by a $TiO_2$ film as a high dielectric-constant material and a $SiO_2$ film as a low dielectric-constant material. A multi-layer structure body in which a plurality of dielectric lamination films are laminated is disclosed in JP-T-2005-521099. In the figure, although dielectric lamination films of six layers are shown, the dielectric lamination film is not limited thereto. A thin piece that is formed from the same material as that composing the light guiding plate 121 is interposed between the dielectric lamination film and the dielectric lamination film. In the first deflection unit 130, the parallel light incident to the light guiding plate 121 is reflected (or diffracted) such that the parallel light incident to the light guiding plate 121 is totally reflected inside the light guiding plate 121. On the other hand, in the second deflection unit 140, the parallel light propagating through the inside of the light guiding plate 121 through total reflection is reflected (or diffracted) over a plurality of times and is output from the light guiding plate 121 toward the pupil 21 of the observer 20 in the parallel light state.

Regarding the first deflection unit 130, it may be configured such that an inclination face on which the first deflection unit 130 is to be formed is arranged in the light guiding plate 121 by cutting out a portion 124 of the light guiding plate 121 at which the first deflection unit 130 is arranged, a light reflecting film is vacuum deposited on the inclination face, and then the portion 124 cut by the light guiding plate 121 is bonded to the first deflection unit 130. In addition, regarding the second deflection unit 140, it may be configured such that a multi-layer laminated structure body in which a plurality of dielectric lamination films (for example, it may be deposited by using a vacuum deposition method) are laminated is manufactured by using the same material (for example, glass) as that composing the light guiding plate 121, an inclination face is formed by cutting out a portion 125 of the light guiding plate 121 at which the second deflection unit 140 is arranged, a multi-layer laminated structure body is bonded to the inclination face, and the outer shape is trimmed by performing grinding or the like. Accordingly, an optical device 120 in which the first deflection unit 130 and the second deflection unit 140 are disposed inside the light guiding plate 121 can be acquired.

Here, in Embodiment 1 or any one of Embodiments 2 to 15 to be described later, the light guiding plate 121 or 321 that is formed from an optical glass material or a plastic material has two parallel faces (a first face 122 or 322 and a second face 123 or 323) that extend in parallel with the light propagating direction (the X axis) according to the internal total reflection of the light guiding plate 121 or 321. The first face 122 or 322 and the second face 123 or 323 face each other. Thus, parallel light is incident from the first face 122 or 322 corresponding to a light incidence face, the incident parallel light propagates the inside through total reflection and then is output from the first face 122 or 322 corresponding to a light output face. However, embodiments of the present disclosure re not limited thereto, and thus, it may be configured such that the light incidence face is configured by the second face 123 or 323, and the light output face is configured by the first face 122 or 322.

In Embodiment 1 or Embodiment 11 to be described later, the image forming device 111 is the image forming device according to the first configuration and has a plurality of pixels arranged in a two-dimensional matrix pattern. To be more specific, the image forming device 111 is configured by a reflective-type spatial light modulation device 150 and a light source 153 that is formed by a light emitting diode emitting white light. Each entire image forming device 111 is fitted to the inside of a casing 113 (denoted by dashed-dotted lines in FIG. 1 or 20), and an opening portion (not shown in the figure) is arranged in the casing 113, and light is output from the optical system (the parallel light output optical system or the collimator optical system) 112 through the opening portion. The reflective-type spatial light modulation device 150 is configured by a liquid crystal display device (LCD) 151 that is formed by an LCOS as a light valve and a polarizing beam splitter 152 that reflects a part of the light emitted from a light source 153 so as to be guided to the liquid crystal display device 151 and allows a part of the light reflected by the liquid crystal display device 151 to pass therethrough and be guided to the optical system 112. The liquid crystal display device 151 includes a plurality (for example, 640×480) of pixels (liquid crystal cells) arranged in a two-dimensional matrix pattern. The polarizing beam splitter 152 has a configuration and a structure that are known. The light, which has no polarization, emitted from the light source 153 collides with the polarizing beam splitter 152. The polarizing beam splitter 152 allows a P-polarized component to pass therethrough so as to be output to the outside of the system. On the other hand, an S-polarized component is reflected by the polarizing beam splitter 152 so as to be incident to the liquid crystal display device 151 and is reflected inside the liquid crystal display device 151 so as to be out from the liquid crystal display device 151. Here, while a large amount of the P-polarized component is included in light emitted from a pixel used for displaying "white" out of the light output from the liquid crystal display device 151, a large amount of the S-polarized component is included in light emitted from a pixel used for displaying "black" out of above-described light. Accordingly, the P-polarized component of the light that is output from the liquid crystal display device 151 and collides with the polarizing beam splitter 152 passes through the polarizing beam splitter 152 and is guided to the optical system 112. On the other hand, the S-polarized component is reflected by the polarizing beam splitter 152 and is returned to the light source 153. The optical system 112, for example, is configured by a convex lens and generates parallel light. Accordingly, the image forming device 111 (to be more specific, the liquid crystal display device 151) is arranged at a place (position) that is at a focal distance of the optical system 112.

The frame 10 is formed by: a front portion 11 that is arranged on the front side of an observer 20; two temple portions 13 that are attached to both ends of the front portion 11 through hinges 12 so as to be freely rotatable; and ear band portions (also referred to as temple tips or ear pads) 14 that are attached to the tip end portion of each temple portion 13. In addition, nose pads 10' are attached thereto. In other words, the assembly of the frame 10 and the nose pads 10' has a structure that is approximately the same as ordinary glasses. Furthermore, each casing 113 is attached to the temple portion 13 by using an attachment member 19. The frame 10 is manufactured by using metal or plastic. Here, each casing 113 may be detachably attached to the temple portion 13 by using the attachment member 19. Furthermore, in a case where the observer owns and wears glasses, each casing 113 may be detachably attached to the temple portion of the frame of the glasses owned by the observer by using the attachment member 19.

In addition, wirings (signal lines, power lines, and the like) 15 extending from the image forming devices 111A and 111B extend from the tip end portion of the ear band portion 14 toward the outside through the inside of the temple portion 13 and the ear band portion 14 so as to be connected to the control device (the control circuit or the control unit) 18. Furthermore, each of the image forming devices 111A and 111B has a headphone portion 16, and a wiring 16' for the headphone portion that extends from each of the image forming devices 111A and 111B extends from the tip end portion of the ear band portion 14 to the headphone portion 16 through the inside of the temple portion 13 and the ear band portion 14. To be more specific, the wiring 16' for the headphone portion extends from the tip end portion of the ear band portion 14 so as to wrap around the rear side of the auricle (auditory capsule) and extends to the headphone portion 16. By employing such a configuration, a simple display apparatus can be formed without giving an impression that the headphone portion 16 and the wiring 16' for the headphone portion are arranged in a disorderly manner.

In addition, an imaging device 17 that is configured by a solid-state imaging device formed by a CCD sensor or a CMOS sensor and a lens (these are not shown in the figure) is attached, as necessary, to a center portion 11' of the front portion 11 by using an appropriate attachment member (not shown in the figure). A signal output from the imaging device 17 is transmitted to the image forming device 111A through a wiring (not shown in the figure) extending from the imaging device 17.

As illustrated in FIG. 7A, the image signal, for example, is configured by "SYNC" that is a command starting flag, "MSG_ID" that is a specific ID for each command type, data "LENG" that represents the length of the entire command, data "POS_X" that represents a display starting position of an image in the horizontal direction, data "POS_Y" that represents a start position of an image in the vertical direction, data "DATA" of an image to be displayed, and a command error check "FCS".

As described above, the wirings (the signal lines, the power lines, and the like) 15 are connected to the control device (control circuit) 18. An image signal is read out from a storage unit that is included in the control device 18. Then, the control device 18 performs a process used for displaying an image for the image signal, and the image forming devices 111 and 211 generate images based on the data "DATA". These images finally reach both eyes of the observer 20 wearing the display apparatus through the optical systems 112 and 254 and the optical devices 120, 320, and 520. The control device 18 may be configured by a known circuit. As the content of an image, there is a text, a symbol, a code, a stamp, a mark, a design, a graphic, a map, a hydrographic chart, information of the movement speed or the acceleration of the display apparatus (transportation unit), or various types of information on the transportation unit, and particularly, there is an image content that is appropriate for the use for navigation.

In Embodiment 1, an observer (an operator, a driver, a passenger, or anyone else) wearing the display apparatus assembly is assumed to be boarded on a transportation unit (transportation engine) that is a car. In the display apparatus assembly according to Embodiment 1, the convergence angle is changed based on the movement speed of the display apparatus that is measured by the speed measuring device 31. Here, the speed measuring device 31 is formed by a global positioning system (GPS) and a calculation device that acquires the movement speed based on data supplied from the global positioning system (GPS). Here, the global positioning system (GPS) and the calculation device may be configured by a known global positioning system and a known calculation device.

To be more specific, the position of the transportation unit (or the display apparatus) is repeatedly measured at a constant time interval $\Delta t$ by the GPS. By transmitting this position data to the calculation device, the calculation device acquires a movement distance $\Delta D$ between the constant time interval $\Delta t$. Accordingly, each constant time interval $\Delta t$, the calculation device can acquire a movement speed $v = \Delta D/\Delta t$ therebetween.

Then, movement speed information such as the movement speed v or the average movement speed $v_{ave}$ is transmitted to the control device 18 in a wired or wireless manner, and the convergence angle $\theta_{aoV}$ is changed based on the movement speed information such as the movement speed v or the average movement speed $v_{ave}$ under the control of the control device 18. In other $\theta_{aoV}$ words, according to Embodiment 1, the convergence angle is changed by controlling the image signals input to the image forming devices 111 and 211 that configure at least one (particularly, two for the left and right eyes) of the image displaying devices 100, 200, 300, 400, and 500. To be more specific, a signal (convergence angle control signal) used for shifting the position of the image according to the image signal by +k pixels or −k pixels in the horizontal direction may be read out from the storage unit by the control device 18 based on the movement speed information such as the movement speed v or the average movement speed $v_{ave}$. It may be configured such that the amount of change in the convergence angle $\theta_{aoV}$ or the amount of change in the virtual-image distance corresponding to the shift of the image by one pixel in the horizontal direction is checked in advance, and such relationship is stored in the storage unit of the control device 18. As above, by moving two images acquired by two image displaying devices 100, 200, 300, 400, and 500 for the left and right eyes based on the movement speed information, a virtual image can be arranged at a desired position. In other words, by changing the distance (gap) of two images displayed by the optical devices 120, 320, and 520 that configure the image displaying devices 100, 200, 300, 400, and 500 in the horizontal direction, the convergence angle $\theta_{aoV}$ can be changed depending on the value of the movement speed v or the average movement speed $v_{ave}$.

In the storage unit included in the control device 18, the relationship between the movement speed of the display apparatus and the convergence angle, control of image signals input to the image forming devices for changing the convergence angle, and the like are stored in advance. To be more specific, for example, the relationship of the value of the movement speed V or the average movement speed $v_{ave}$, the convergence angle $\theta_{aoV}$, the virtual-image distance $L_{vi}$, and the values of k and −k described above are stored in the storage unit in advance. In a case where the value of the movement speed v or the average movement speed $v_{ave}$ is great, the virtual-image distance $L_{vi}$ is increased, and the value of the convergence angle $\theta_{aoV}$ is decreased (in other words, the adjustment of the focus and the adjustment of convergence of the eyes of the observer correspond to a case where a target located at a position that is located relatively far is viewed). At this time, in order not to cause the fatigue in the eyes of the observer due to contradiction between the adjustment and the convergence, it is preferable that the virtual-image distance $L_{vi}$ and the convergence angle (the main light beam intersecting angle in the horizontal surface) $\theta_{aoV}$ satisfy the following equation.

$$L_{vi} \times \tan(\theta_{aoV}/2) = PD/2$$

Here, the distance PD (unit: mm) between the left and right pupils, for example, satisfies the relationship of "$56 \leq PD \leq 74$". However, in a case where the value of the convergence angle $\theta_{aoV}$ is zero, the value of the virtual-image distance $L_{vi}$ is infinite. On the other hand, the virtual-image distance $L_{vi}$ and the convergence angle $\theta_{aoV}$ are not independently calculated in accordance with the movement speed of the display apparatus, and, by defining the correspondence relationship of any one thereof, the other is automatically determined.

The change in the convergence angle that is performed in correspondence with the movement speed will be described with reference to FIG. 7B. Here, the convergence angle of an image on the basis of an image signal that is displayed by the image displaying device at the virtual-image distance $L_{vi}$ of is denoted by "$\alpha$". In addition, the convergence angle of an image in a case where the image is located apart from the virtual-image distance $L_{vi}$ by "c" is denoted by "$\gamma$", and the convergence angle of an image in a case where the image is located closer from the virtual-image distance by "b" is denoted by "$\beta$. Here, when PD=61.5 mm and $L_{vi}$=4000 mm, $\alpha$=53 minutes (53').

One pixel of the image forming device 111 or 211 is defined as 3 minutes (3'). Here, in a case where the image forming devices 111 and 211 and the optical systems 112 and 254 are shifted to the inner side by one pixel in the horizontal direction (the X-axis direction), $\beta$=56 minutes (56'), and b=225 mm. On the other hand, in a case where the image forming devices 111 and 211 and the optical systems 112 and 254 are shifted to the outer side by one pixel in the horizontal direction, $\gamma$=50 minutes (50'), and c=228 mm. In addition, in a case where $L_{vi}$=8000 mm, by shifting the image by one pixel, the virtual-image distance can be shifted by about 1 m.

To be more specific, for example, the convergence angle may be set such that the virtual-image distance is equal to or longer than 5 m in a case where the movement speed of the car is, for example, equal to or higher than 30 km/hour. In addition, the convergence angle may be set such that the virtual-image distance is 4 m in a case where the movement speed of the car is, for example, lower than 30 km/hour.

As above, by shifting the display position of an image by desired pixels in the horizontal direction from a predetermined position, the convergence angle can be changed. In other words, by controlling image signals input to the image forming devices 111A and 111B that configure two image displaying devices 100, 200, 300, 400, and 500 for the left and right eyes in accordance with a convergence angle control signal that is based on the movement speed (the movement speed information), the convergence angle can be changed in correspondence with the movement speed. As a result, a distance to the main viewpoint (viewpoint distance) and the virtual-image distance of an image displayed by the image displaying device can be configured to be the same, or to be approximately the same as possibly as can. Accordingly, an observer 20 viewing a real space can view an image, which is naturally displayed by the image displaying device, with being integrated with a real landscape disposed in front of the eyes without modifying or changing the focus much, whereby a display apparatus assembly, of which the visual recognition is improved, particularly appropriate for the use for navigation can be provided.

In addition, a configuration may be employed in which a light receiving sensor is further included, and the luminance of an image to be displayed in the optical device is controlled based on luminance information of the environment (the ambience in which the display apparatus is placed) that is acquired by the light receiving sensor. To be more specific, as examples of the light receiving sensor, there are a photodiode or a light receiving device used for measuring the exposure that is included in the imaging device 17.

Furthermore, a configuration may be employed in which the speed measuring device 31 is formed by a known speed/acceleration sensor and a known calculation device that acquires the movement speed based on data supplied from the speed/acceleration sensor, or a configuration may be employed in which the speed measuring device 31 is formed by a known wheel rotation number detecting device and a known calculation device that acquires the movement speed based on data supplied from the wheel rotation number detecting device.

In the display apparatus assembly according to Embodiment 1, in a case where luminance data or chromaticity data of the image to be displayed is included as the image signal, it can be reliably prevented that it is difficult to visually recognize the image depending on the background. In addition, as an example of the luminance data, there is luminance data corresponding to the luminance of the area of a real space seen through the image displaying device. As an example of the chromaticity data, there is chromaticity data corresponding to the chromaticity of the area of a real space seen through the image displaying device. To be more specific, there are cases in which it is difficult to concurrently observe the real image formed in front of the eyes and the image (virtual image) well when the brightness of colors of the real image formed in front of the eyes that and the brightness or the balance of colors of the image displayed in the optical device is seen through the semi-transmissive type (see-through type) optical device is not within a constant range. However, the brightness and the color of the image to be displayed can be adjusted to the real image formed in front of the eyes, and accordingly, the image can be visually recognized well. In other words, it can be reliably prevented that it is difficult for an observer to visually recognize an image depending on the real image formed in front of the eyes.

Embodiment 2

Embodiment 2 is a modification of Embodiment 1 and relates to a display apparatus assembly according to the embodiment 1B of the present disclosure. In the display apparatus assembly according to Embodiment 2, at least one of image displaying devices (particularly, in Embodiment 2, two image displaying devices 100, 200, 300, 400, and 500 for the left and right eyes depending on the movement speed) further includes a movement device 40 that relatively moves an optical axis of the image forming device 111 (111A and 111B) or 211 and an optical axis of an optical system 112 or 254 in a horizontal direction (X-axis direction), and a convergence angle (a main light beam intersecting angle in the horizontal surface) is changed by relatively moving the optical axis of the image forming device 111 (111A and 111B) or 211 and the optical axis of the optical system 112 and 254 in the horizontal direction (X-axis direction) by using the movement device 40. In addition, the relationship between the movement speed of the display apparatus and the movement amount of the movement device and the like are stored in a storage unit that is included in a control device 18 in advance.

To be more specific, as illustrated in FIGS. 8A, 8B and 2 as conceptual diagrams, the positions of the optical axis of the image forming device 111 or 211 of each of two image displaying devices 100, 200, 300, 400, and 500 and the optical axis of the optical system 112 or 254 thereof may be relatively moved in the horizontal direction (the X-axis direction). In other words, any one (for example, the optical system 112 or 254) of the image forming device 111 or 211 and the optical system 112 or 254 is placed in a movement guiding unit 42 that is configured by a rack gear unit, and any one (for example, the optical system 112 or 254) of the image forming device 111 or 211 and the optical system 112 or 254 is moved on the movement guiding unit 42 by a motor and a pinion gear 41. Alternatively, it may be configured such that any one of the image forming device and the optical system is placed in the movement guiding unit, and any one of the image forming device and the optical system is moved on the movement guiding unit by a piezoelectric device or an ultrasonic motor. To be furthermore specific, the control device 18 changes the convergence angle by operating a motor, a pinion gear 41, and the like based on movement speed information of the display apparatus so as to relatively move the image forming device 111 or 211 and/or the optical system 112 or 254 in the horizontal direction (the X-axis direction). The higher the movement speed is, the less the convergence angle becomes.

In such a configuration, a change in the YZ plane incidence angle of the parallel light that is output from the optical system 112 or 254 and is incident to the optical device 120, 320, or 520 with respect to the optical device 120, 320, and 520 occurs. In other words, a change in the angle of the optical axis of the optical system 112 or 254 with respect to the YZ plane occurs. Here, by moving the image forming device 111 or 211 and the optical system 112 or 254 from the state illustrated in FIG. 8A to the state illustrated in FIG. 8B, the value of the convergence angle increases, and the virtual image distance decreases. In other words, the virtual image approaches the observer. In other words, for example, the image forming device 111 or 211 or the optical system 112 or 254 are relatively moved in the horizontal direction (the X-axis direction) such that a point "A" shown in FIG. 6 is located at a desired position. In addition, in the movement of the image forming device 111 or 211, the entire image forming device 111 or 211 may be moved, or a part (for example, a liquid crystal display device 151, a scanning unit 253, or the like) of the constituent element of the image forming device 111 or 211 may be moved.

As above, by moving two images acquired by two image displaying devices 100, 200, 300, 400, or 500 for the right eye and the left eye based on the movement speed (movement speed information), a virtual image can be arranged at a desired position. In other words, by changing the distance (gap) of two images displayed in the optical devices 120, 320, or 520 configuring the image displaying devices 100, 200, 300, 400, or 500 in the horizontal direction or the YZ plane incidence angle, the convergence angle can be changed in correspondence with the movement speed. Since the convergence angle can be changed by relatively moving the image forming devices 111 and 211 and/or the optical systems 112 and 254 in the horizontal direction (the X-axis direction), a viewpoint distance and the virtual-image distance of an image displayed by the image displaying device can be configured to be the same, or to be approximately the same as possibly as can. Accordingly, an observer 20 can view the image that is naturally displayed by the image displaying device without modifying or changing the focus much.

Embodiment 3

Figure 9A:
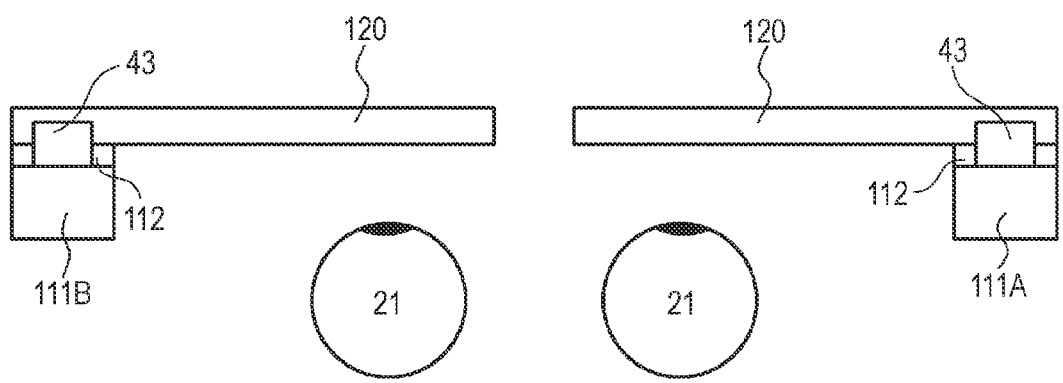
FIGS. 9A and 9B are conceptual diagrams of a display apparatus of a display apparatus assembly according to Embodiment 3.
Figure 9B:
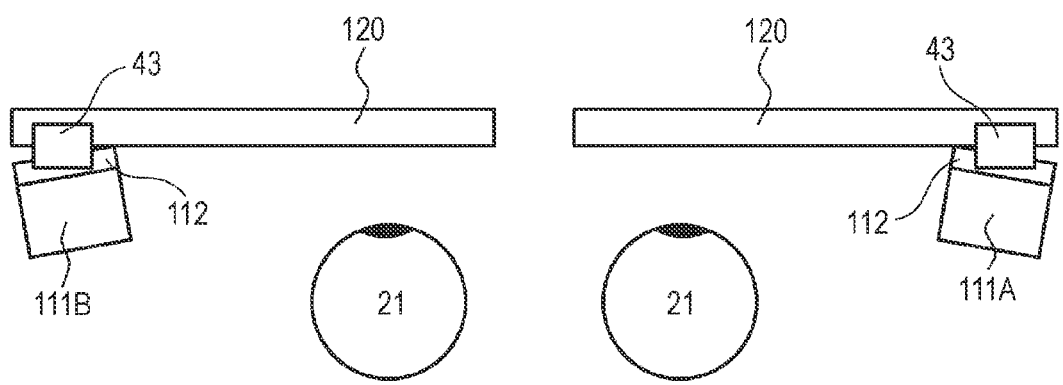

Embodiment 3 is a modification of Embodiment 1 and, to be more specific, relates to a display apparatus assembly according to the embodiment 1C of the present disclosure. FIGS. 9A and 9B are conceptual diagrams of the display apparatus according to Embodiment 3. In the display apparatus according to Embodiment 3, at least one image displaying device (in Embodiment 3, each of two image displaying devices for the left and right eyes) further includes a rotary movement device 43 that rotates the image forming device 111 or 211 and the optical systems 112 or 254. Thus, by rotating the image forming device 111 or 211 and the optical system 112 or 254 by using the rotary movement device 43 depending on the movement speed under the control of a control device 18, the incidence angle (YZ plane incidence angle) of parallel light that is output from the optical system 112 or 254 and is incident to the optical device 120 or 320 with respect to the optical device 120 or 320 is changed, in other words, the angle of the optical axis of the optical system 112 or 254 with respect to the YZ plane is changed, whereby the convergence angle (the main light beam intersecting angle in the horizontal face) is changed. Here, by moving the image forming device 111 or 211 and the optical system 112 or 254 from the state illustrated in FIG. 9A to the state illustrated in FIG. 9B, the value of the convergence angle increases, and the virtual image distance decreases. In other words, the virtual image approaches the observer. In addition, the relationship between the movement speed of the display apparatus and the amount of rotary movement of the rotary movement device is stored in a storage unit that is included in the control device 18 in advance.

Here, the image forming device 111 or 211 and the optical system 112 or 254 are rotated by the rotary movement device 43. To be more specific, while the positional relationship between the optical axis of the image forming device 111 or 211 and the optical axis of the optical system 112 or 254 of each of two image displaying devices is fixed, at least one image displaying device may be rotated by operating a piezoelectric device, a motor, or an ultrasonic motor with the Z axis arranged at an appropriate position used as a rotary axis. In such a form, a change in the YZ plane incidence angle of the parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs. The optical device 120 or 320 may be rotated together in some situations.

Embodiment 4

Embodiment 4 is also a modification of Embodiment 1 and relates to a display apparatus assembly according to the embodiment 1D of the present disclosure. In the display apparatus assembly according to Embodiment 4, an optical system 112 or 254 that configures at least one image displaying device (in Embodiment 4, each of two image displaying devices for the left and right eyes) includes a liquid lens 44. Thus, the convergence angle (the main light beam intersecting angle in the horizontal surface) is changed by operating the liquid lens 44 depending on the movement speed of the display apparatus under the control of the control device 18. In addition, the relationship between the movement speed of the display apparatus and the operation state of the liquid lens is stored in a storage unit that is included in the control device 18 in advance.

The liquid lens 44 that configures the optical system 112 or 254 is configured by a known liquid lens 44 that utilizes an electrowetting phenomenon. By operating the liquid lens 44, the optical axis of the optical system 112 or 254 can be moved in the horizontal direction (the X-axis direction), or the angle of the optical axis of the optical system 112 or 254 with respect to the YZ plane can be changed, while the relationship between the optical axis of the optical system 112 or 254 and the Y axis is maintained to be constant.

Accordingly, a change in the YZ plane incidence angle of the parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs.

Figure 10A:
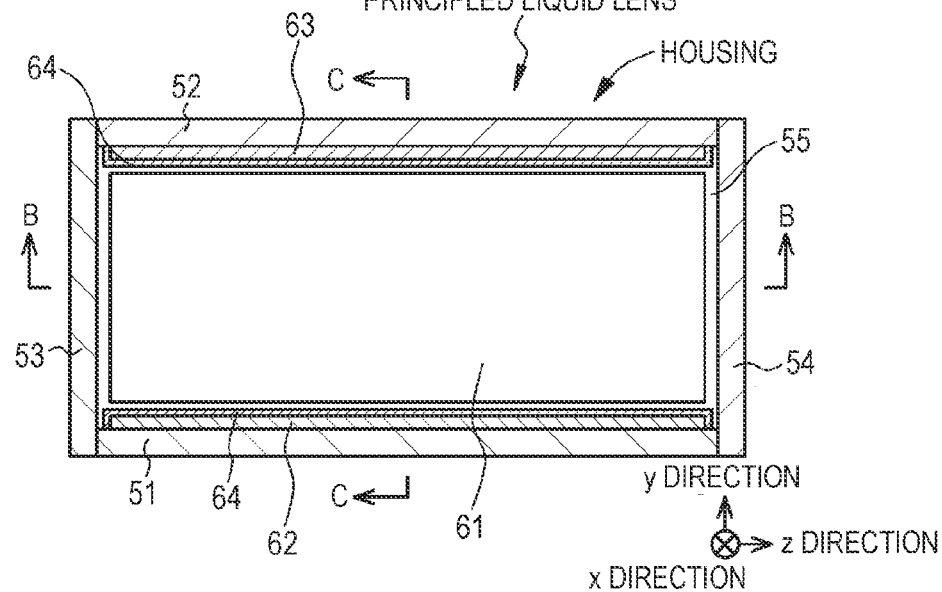
FIG. 10A is a schematic cross-sectional view of a principled liquid lens taken along line A-A shown in FIG. 10B.
Figure 10B:
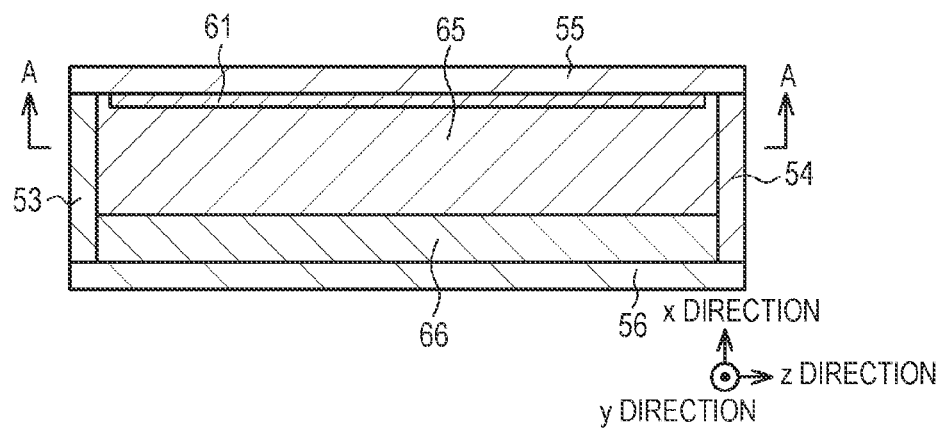
FIG. 10B is a schematic cross-sectional view of the principled liquid lens taken along line B-B shown in FIG. 10A.

The principle of the liquid lens 44 will be described with reference to FIGS. 10A to 10C and FIGS. 11A to 11C. FIG. 10A is a schematic cross-sectional view taken along line A-A shown in FIG. 10B, FIG. 10B is a schematic cross-sectional view (here, a first liquid is not shown in the figure) taken along line B-B shown in FIG. 10A, and FIG. 10C and FIGS. 11A to 11C are schematic cross-sectional views taken along line C-C shown in FIG. 10A. Here, the shape of the liquid lens at the time of being cut along the xy plane is a schematic shape, which is different from the actual shape.

The liquid lens (referred to as a "principled liquid lens" for convenience of the description) representing the principle diagrams illustrated in FIGS. 10A to 10C and FIGS. 11A to 11C includes a housing. This housing is formed by: a first side member 51; a second side member 52 that faces the first side member 51; a third side member 53 that joins one end portion of the first side member 51 and one end portion of the second side member 52; a fourth side member 54 that joins the other end portion of the first side member 51 and the other end portion of the second side member 52; a top panel 55 that is mounted on the top faces of the first side member 51, the second side member 52, the third side member 53, and the fourth side member 54; and a bottom panel 56 that is mounted on the bottom faces of the first side member 51, the second side member 52, the third side member 53, and the fourth side member 54. One lens chamber is configured by this housing. The lens chamber is occupied by a first liquid 65 and a second liquid 66 that compose the liquid lens as a cylinder lens of which the axial line extends in the direction in which the first side member 51 and the second side member 52 extend (the z direction).

In addition, a first electrode 61 is mounted on the inner face of the top panel 55, a second electrode 62 is mounted on the inner face of the first side member 51, and a third electrode 63 is mounted on the inner face of the second side member 52. Here, in the state illustrated in FIGS. 10A to 10C, no voltage is applied to the first electrode 61, the second electrode 62, and the third electrode 63.

Figure 11A:
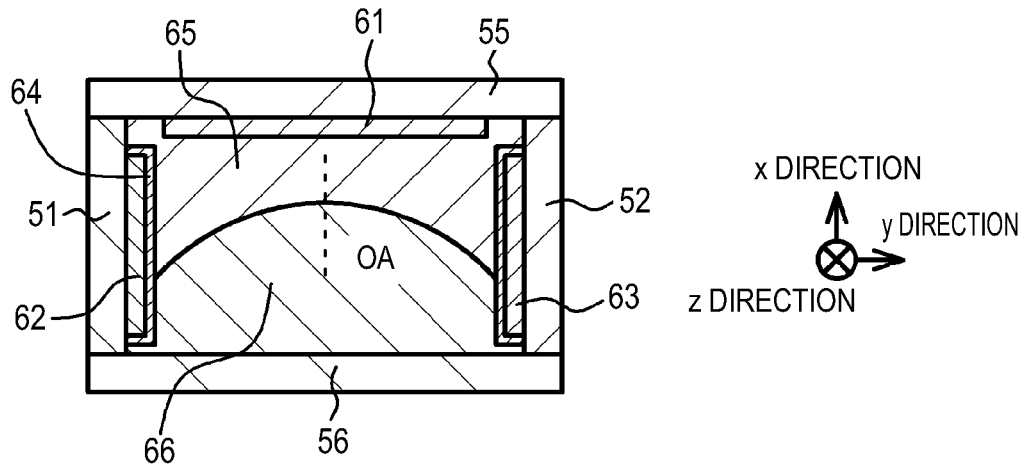
FIGS. 11A to 11C are schematic cross-sectional views of the principled liquid lens taken along line C-C shown in FIG. 10A and is a diagram schematically illustrating the behavior of a liquid lens.
Figure 11B:
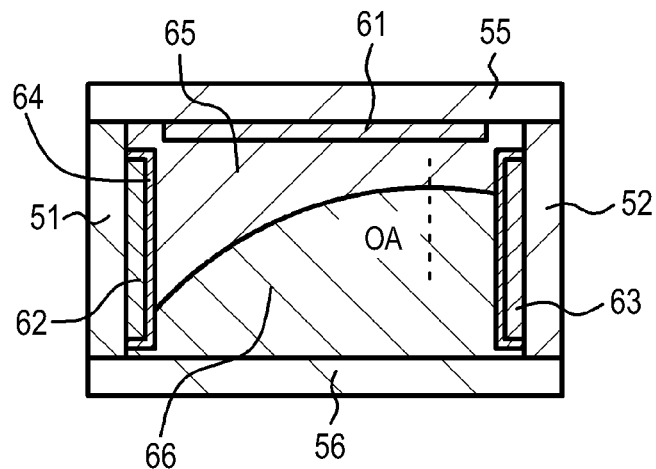
Figure 11C:
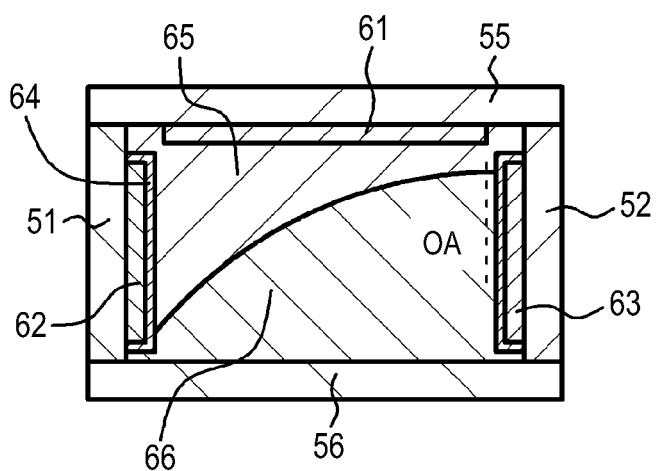

When appropriate voltages are applied to the first electrode 61, the second electrode 62, and the third electrode 63 from this state, the state of the interface between the first liquid 65 and the second liquid 66 changes to the state illustrated in FIG. 11A, 11B, or 11C. Here, the state illustrated in FIG. 11A illustrates a state when the same voltage is applied to the second electrode 62 and the third electrode 63, and the shape of the liquid lens at the time of being cut along the xy plane, which is formed inside the lens chamber, is symmetrical with respect to the optical axis OA. In addition, the state illustrated in FIGS. 11B and 11C illustrates a state when different voltages are applied to the second electrode 62 and the third electrode 63, and the shape of the liquid lens at the time of being cut along the xy plane, which is formed inside the lens chamber, is asymmetric with respect to the optical axis OA. Here, an electric potential difference between the second electrode 62 and the third electrode 63 illustrated in FIG. 11C is greater than the state illustrated in FIG. 11B. As illustrated in FIGS. 11B and 11C, in accordance with the electric potential difference between the second electrode 62 and the third electrode 63, the optical power of the liquid lens can be changed, and the optical axis OA (denoted by a dotted line) of the liquid lens can be moved in the y direction that is orthogonal to the z direction. Alternatively, by arranging a plurality of liquid lenses each illustrated in the principle diagram and appropriately controlling the voltages applied to the second electrode 62 and the third electrode 63 of each of the liquid lenses, the optical axes of the liquid lenses as a whole can be moved, and the inclination of the optical axes of the liquid lenses as a whole can be changed, whereby a Fresnel lens can be configured in the liquid lenses as a whole.

Figure 12:
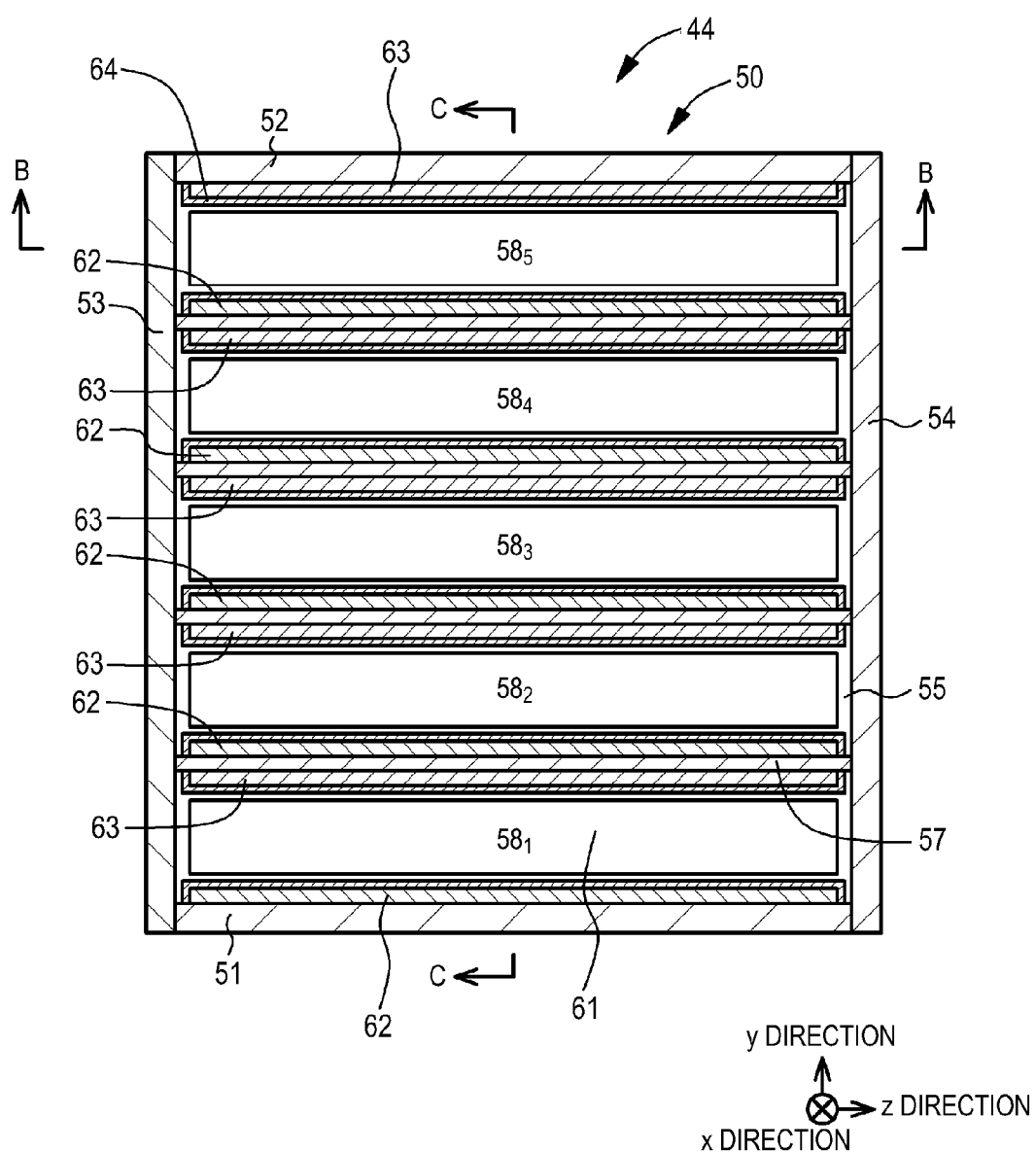
FIG. 12 is a schematic cross-sectional view of a liquid lens according to Embodiment 4 similar to that taken along line A-A shown in FIG. 10B.

Schematic cross-sectional views of a practical liquid lens 44 according to Embodiment 4 are illustrated in FIG. 12, FIGS. 13A to 13C, and FIGS. 14A and 14B. FIG. 12 is a schematic cross-sectional view taken along line A-A shown in FIG. 10B, and FIGS. 13A to 13C and FIGS. 14A and 14B are schematic cross-sectional views taken along line C-C shown in FIG. 12. In addition, the schematic cross-sectional view taken along line B-B shown in FIG. 12 is similar to that illustrated in FIG. 10B.

The liquid lens 44 includes (A) a housing 50 that includes: a first side member 51; a second side member 52 that faces the first side member 51; a third side member 53 that joins one end portion of the first side member 51 and one end portion of the second side member 52; a fourth side member 54 that joins the other end portion of the first side member 51 and the other end portion of the second side member 52; a top panel 55 that is mounted on the top faces of the first side member 51, the second side member 52, the third side member 53, and the fourth side member 54; and a bottom panel 56 that is mounted on the bottom faces of the first side member 51, the second side member 52, the third side member 53, and the fourth side member 54 and (B) (M−1) partition wall members 57 that are arranged in parallel between the first side member 51 and the second side member 52.

In the liquid lens 44 according to Embodiment 4, M (five) lens chambers 58 ($58_1$, $58_2$, $58_3$, $58_4$, and $58_5$) are aligned. Here, each of the lens chambers 58 ($58_1$, $58_2$, $58_3$, $58_4$, and $58_5$) are occupied by a first liquid 65 and a second liquid 66 that compose the liquid lens as a cylinder lens of which the axial line extends in the direction (the z direction) parallel to the direction in which the partition wall member 57 extends.

The first lens chamber $58_1$ is configured by: the first side member 51; the third side member 53; a first partition wall member 57; the fourth side member 54; the top panel 55, and the bottom panel 56. In addition, a first electrode 61 is mounted on the inner face of a part of the top panel 55 configuring the first lens chamber $58_1$, a second electrode 62 is mounted on the inner face of a part of the first side member 51 configuring the first lens chamber $58_1$, and a third electrode 63 is mounted on the inner face of a part of the first partition wall member 57 configuring the first lens chamber $58_1$.

In addition, the (m+1)-th lens chamber $58_{(m+1)}$ is configured by: the m-th (here, m=1, 2, . . . , M−2) partition wall member 57; the third side member 53; the (m+1)-th partition wall member 57; the fourth side member 54; the top panel 55, and the bottom panel 56. In addition, a first electrode 61 is mounted on the inner face of a part of the top panel 55 configuring the (m+1)-th lens chamber $58_{(m+1)}$, a second electrode 62 is mounted on the inner face of a part of the m-th partition wall member 57 configuring the (m+1)-th lens chamber $58_{(m+1)}$, and a third electrode 63 is mounted on the inner face of a part of the (m+1)-th partition wall member 57 configuring the (m+1)-th lens chamber $58_{(m+1)}$.

Furthermore, the M-th lens chamber $58_M$ (=$58_5$) is configured by: the (M−1)-th partition wall member 57; the third side member 53; the second side member 52; the fourth side member 54; the top panel 55, and the bottom panel 56. In addition, a first electrode 61 is mounted on the inner face of a part of the top panel 55 configuring the M-th lens chamber $58_M$ (=$58_5$), a second electrode 62 is mounted on the inner face of a part of the (M−1)-th partition wall member 57 configuring the M-th lens chamber $58_M$ (=$58_5$), and a third electrode 63 is mounted on the inner face of a part of the second side member 52 configuring the M-th lens chamber $58_M$ (=$58_5$).

In addition, in the example illustrated in the figure, although the first electrode 61 is mounted for each lens chamber, one electrode as the first electrode 61 may be mounted on the inner face of the top panel 55.

In the liquid lens 44 according to Embodiment 4, a water-repellency treatment is performed for the surface of each of the first side member 51, the second side member 52, and the partition wall member 57 in which at least the interface between the first liquid 65 and the second liquid 66 is located. In addition, the bottom panel 56 of the partition wall member 57 extends up to the bottom panel 56, and the top face of the partition wall member 57 extends up to the top panel 55. The outer shape of the housing 50 is a rectangle having a long side in the z direction and a short side in the y direction. Light is incident from the bottom panel 56, and the light is output from the top panel 55.

The first liquid 65 and the second liquid 66 are insoluble and unmixed, and the interface between the first liquid 65 and the second liquid 66 configures a lens surface. Here, the first liquid 65 has conductivity, and the second liquid 66 has an insulating property. The first electrode 61 is brought into contact with the first liquid 65, the second electrode 62 is brought into contact with the first liquid 65 and the second liquid 66 through an insulating film 64, and the third electrode 63 is brought into contact with the first liquid 65 and the second liquid 66 through the insulating film 64. In addition, the top panel 55, the bottom panel 56, and the first electrode 61 are composed of materials that are transparent for light that is incident to the liquid lens 44.

To be more specific, the top panel 55, the bottom panel 56, the first side member 51, the second side member 52, the third side member 53, the fourth side member 54, and the partition wall member 57 are manufactured from glass or a resin such as an acrylic resin. In addition, the first liquid 65 having conductivity is formed from a lithium chloride aqueous solution and has a density of 1.06 gram/cm$^3$ and a refractive index of 1.34. On the other hand, the second liquid 66 having an insulating property is formed from silicon oil (TSF437 manufactured by Momentive Performance Materials Japan LLC) and has a density of 1.02 gram/cm$^3$ and a refractive index of 1.49. In addition, the first electrode 61 is formed from ITO, and the second electrode 62 and the third electrode 63 are formed as a metal electrode, for example, made of gold, aluminum, copper, silver, or the like. Furthermore, the insulating film 64 is formed from poly-para-xylene or a metal oxide such as tantalum oxide, or titanium dioxide. In addition, a water-repellency treated layer (not shown in the figure) is formed on the insulating film 64. The water-repellency treated layer is formed from poly-para-xylene or a fluorinated polymer. It is preferable that a hydrophilic treatment is performed for the surface of the first electrode 61, and a water-repellency treatment is performed for the inner face of the third side member 53 or the fourth side member 54.

In Embodiment 4, in order to configure the optical system 112 or 254, two liquid lenses 44 illustrated in FIG. 12 overlap each other. To be more specific, the liquid lenses 44 overlap each other such that the y direction of the liquid lens 44 disposed on the lower side and the y direction of the liquid lens 44 disposed on the upper side are perpendicular to each other, and the z direction of the liquid lens 44 disposed on the lower side and the z direction of the liquid lens 44 disposed on the upper side are perpendicular to each other. Then, for example, two liquid lenses 44 overlapping each other are arranged at the position of the optical system 112 illustrated in FIG. 1 such that the y direction of the liquid lens 44 disposed on the lower side is parallel to the X-axis direction, and the x direction is parallel to the Y-axis direction.

The first electrode 61, the second electrode 62, and the third electrode 63 have a configuration and a structure so as to be connected to an external control circuit through a connection unit not shown in the figure and be applied with desired voltages. When voltages are applied to the first electrode 61, the second electrode 62, and the third electrode 63, a lens surface that is configured by the interface between the first liquid 65 and the second liquid 66 changes from a downward convex state illustrated in FIG. 13A to an upward convex state illustrated in FIG. 13B. The state of the lens surface changes in accordance with the voltages applied to the electrodes 61, 62, and 63 based on a Lippman-Young's equation. In the example illustrated in FIG. 13B, the same voltage is applied to the second electrode 62 and the third electrode 63. Accordingly, the shape of the liquid lens, which is formed inside the lens chamber, at the time of being cut along the xy plane is symmetric with respect to the optical axis of the liquid lens. Such control may be performed for the liquid lens 44 disposed on the upper side out of the two liquid lenses 44 overlapping each other.

Figure 13A:
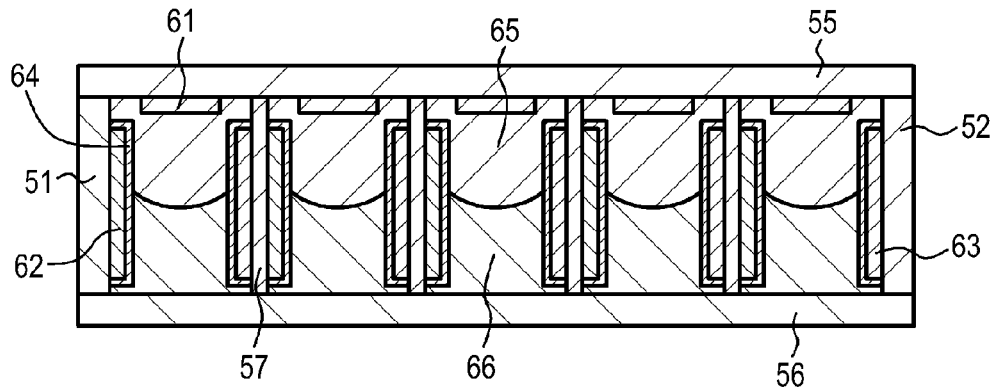
FIGS. 13A to 13C are schematic cross-sectional views of the liquid lens according to Embodiment 4, which is taken along line C-C shown in FIG. 12, and are diagrams schematically illustrating the behavior of the liquid lens.
Figure 13B:
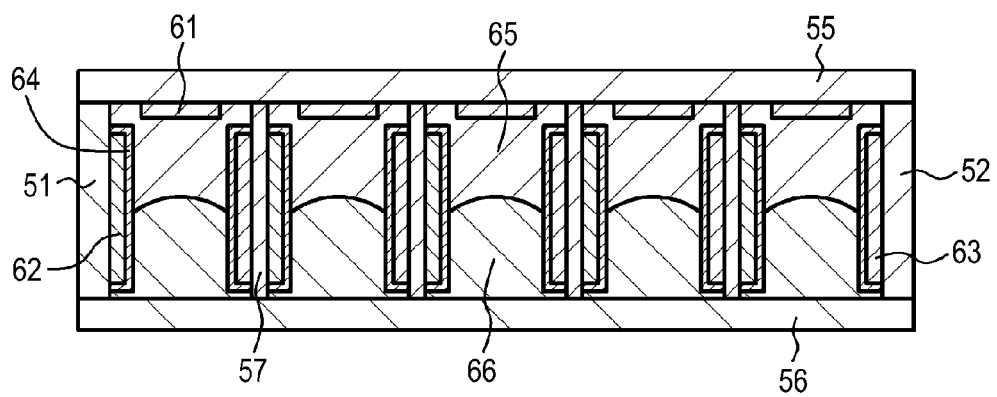
Figure 13C:
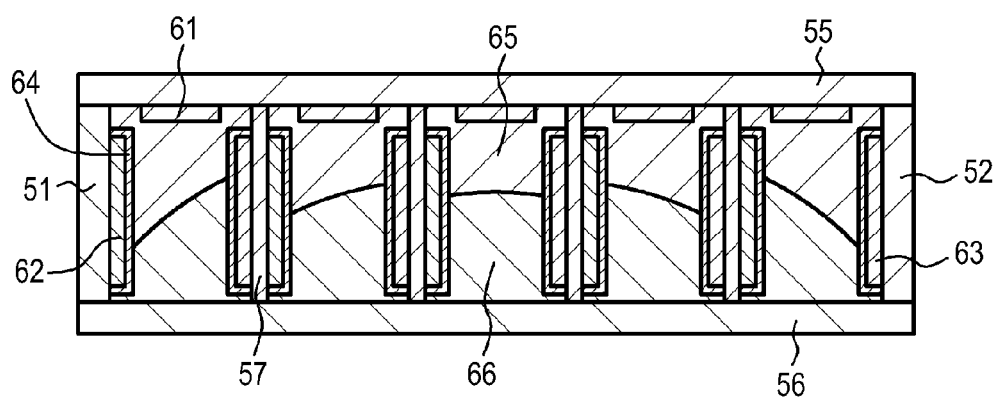
Figure 14A:
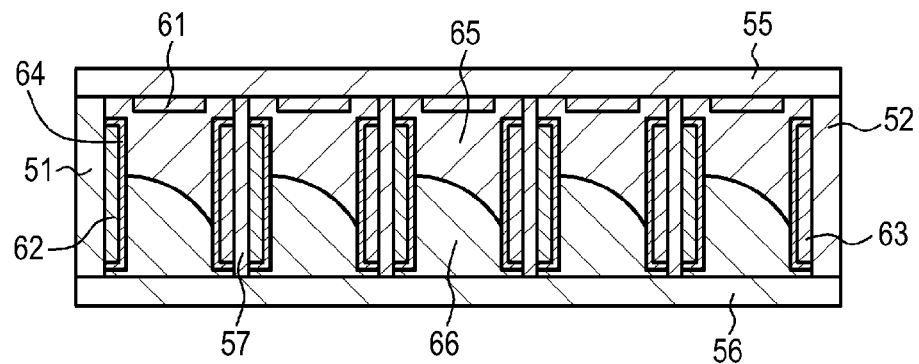
FIGS. 14A and 14B are schematic cross-sectional views of the liquid lens according to Embodiment 4, which is taken along line C-C shown in FIG. 12, and are diagrams schematically illustrating the behavior of the liquid lens.
Figure 14B:
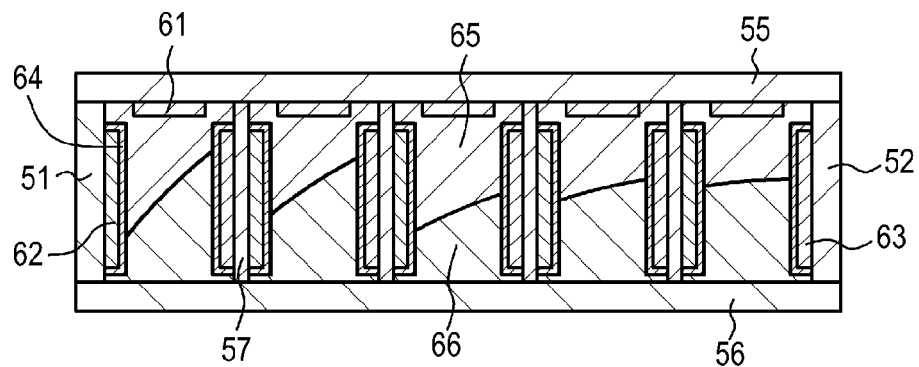

In addition, the states illustrated in FIG. 13C and FIGS. 14A and 14B are states when different voltages are applied to the second electrode 62 and the third electrode 63. In such states, the shape of the liquid lens, which is formed inside the lens chamber, at the time of being cut along the xy plane is asymmetric with respect to the optical axis of the liquid lens. Here, in the state illustrated in FIG. 13C, a Fresnel lens is configured as the liquid lens 44. Such control may be performed for the liquid lens 44 disposed on the upper side out of the two liquid lenses 44 overlapping each other.

In the states illustrated in FIGS. 14A and 14B, the optical axis of the liquid lens is moved in the y direction (the X-axis direction) that is perpendicular to the z direction. By forming the states illustrated in FIG. 14A or 14B, the direction of progress of the light output from the liquid lens 44 can be changed, or the inclination of the optical axis of the liquid lenses 44 as a whole with respect to the x direction can be controlled. In other words, by performing such control for the liquid lens 44 disposed on the lower side out of the two liquid lenses 44 overlapping each other, the optical axis of the liquid lens can be moved in the X-axis direction, or the optical axis of the liquid lens can be inclined with respect to the Y-axis direction. In addition, the optical power of the liquid lens can be changed in accordance with an electric potential difference between the second electrode 62 and the third electrode 63. Here, in the state illustrated in FIG. 14A, the same voltage is applied to each second electrode 62, and the same voltage is applied to each third electrode 63. On the other hand, in the state illustrated in FIG. 14B, different voltages are applied to the second electrode 62 and the third electrode 63, and one kind of Fresnel lens is configured as a whole of the liquid lenses 44. The application of voltages to the second electrode 62 and the third electrode 63 is performed depending on the movement speed under the control of the control device 18.

When the cylinder lens implements the optical power by applying voltages to the first electrode 61, the second electrode 62, and the third electrode 63, the optical power of the cylinder lens in the xz plane (or a plane parallel to the xz plane) is substantially zero, and the optical power of the cylinder lens in the xy plane has a finite value. Here, an "optical axis of the liquid lenses as a whole" is a line joining the centers of curvature of two virtual image optical surfaces of a virtual lens (one lens as a whole of the liquid lenses 44) that is acquired as a whole of the liquid lenses 44 when the liquid lens 44 is cut out along the xy plane.

It may be configured such that the second electrodes 62 are connected to a common wiring, the third electrodes 63 are connected to a common wiring, the same voltage is applied to the second electrode 62, and the same voltage is applied to the third electrodes 63. Alternatively, it may be configured such that the second electrodes 62 are connected to a common wiring, and the third electrodes 63 are connected to individual wirings so as to be individually applied with different voltages, it may be configured such that the third electrodes 63 are connected to a common wiring, the second electrodes 62 are connected to individual wirings so as to be individually applied with difference voltages, or it may be configured such that all the second electrodes 62 and the third electrodes 63 are connected to individual wirings so as to be individually applied with different voltages.

Embodiment 5

Embodiment 5 is a modification of Embodiment 1 and relates to a display apparatus according to the embodiment 1E of the present disclosure. In the display apparatus according to Embodiment 5, an optical system 112 or 254 that configures at least one image displaying device (in Embodiment 5, each of two image displaying devices for the left and right eyes) includes a liquid prism 45. Thus, by operating the liquid prism 45 depending on the movement speed, the convergence angle (the main light beam intersecting angle in the horizontal surface) is changed.

The liquid prism 45 that configures a part of the optical system 112 or 254 is configured by a known liquid prism 45 that utilizes an electrowetting phenomenon. By operating the liquid prism 45, the angle of the optical axis of the optical system 112 or 254 with respect to the YZ plane can be changed. In such a form, a change in the YZ plane incidence angle of parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs.

Figure 10C:
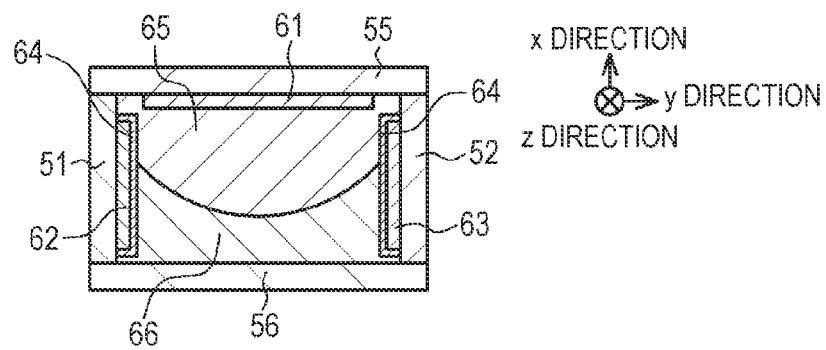
FIG. 10C is a schematic cross-sectional view of the principled liquid lens taken along line C-C shown in FIG. 10A.
Figure 15:
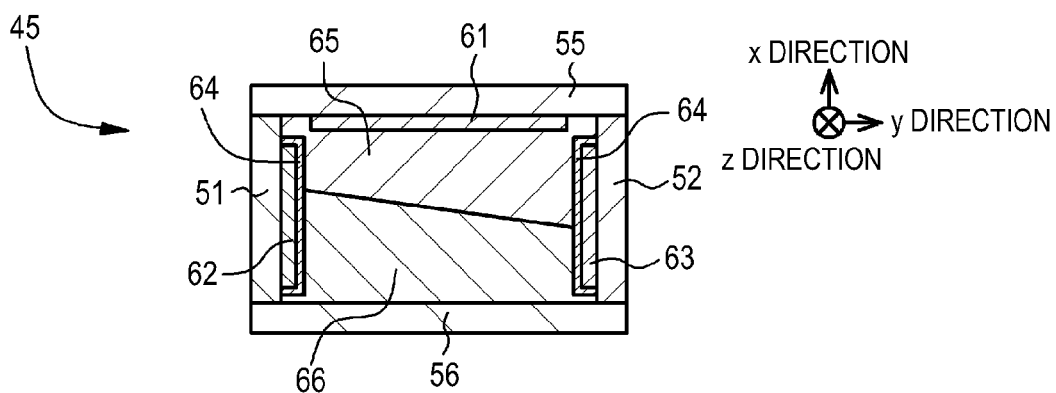
FIG. 15 is a conceptual diagram of a liquid prism according to Embodiment 5.

As illustrated in FIG. 15 as a conceptual diagram, the configuration and the structure of the liquid prism 45 may be the same as those of the principled liquid lens illustrated in FIGS. 10A to 10C, and detailed description thereof is omitted. A difference from the principled liquid lens is that a lens surface is not configured by the interface between the first liquid 65 and the second liquid 66, and a flat inclined surface of a prism is configured, and such a configuration can be acquired by appropriately selecting the first liquid 65 and the second liquid 66. Then, the liquid prism 45 may be arranged, for example, between the optical system 112 and the light guiding plate 121 of the display apparatus illustrated in FIG. 1 such that the y direction is parallel to the X-axis direction, and the x direction is parallel to the Y-axis direction. The application of voltages to the second electrode 62 and the third electrode 63 is performed depending on the movement speed under the control of the control device 18. The relationship between the movement speed of the display apparatus and the operation state of the liquid prism may be stored in the storage unit included in the control device 18 in advance.

Embodiment 6

Embodiment 6 is a modification of the display apparatus assemblies according to Embodiments 1 to 5. In the display apparatus according to Embodiment 6, by controlling image signals input to the image forming devices 111A and 111B configuring at least one image displaying device (in Embodiment 6, each of two image displaying devices 100, 200, 300, 400, and 500 for the left and right eyes), in addition to the adjustment of the convergence angle according to Embodiments 1 to 5, more precise adjustment of the convergence angle is performed depending on the mounting state of the image displaying devices for an observer, or the position of an image displayed in the optical device configuring at least one image displaying device is adjusted. In addition, in Embodiment 6, although both the adjustment of the convergence angle and the adjustment of the position of an image on the basis of the observation position of the observer are performed, only one thereof may be performed.

To be more specific, a test image signal that is stored in the storage unit is read out by the control device 18 based on an instruction of the observer. Then, the control device 18 performs a process for displaying an image for the image signal, and images are generated by the image forming devices 111A and 111B based on the test image signal. These images finally reach both eyes of an observer 20 to whom the display apparatus is mounted through the optical system 112 or 254 and the optical device 120, 320, or 520.

Then, the image displayed in the optical device 120, 320, or 520 is moved horizontally and vertically and is rotated through the control device 18, and more particularly, by using a switch (not shown in the figure) arranged in the control device 18 such that the images displayed in the image displaying devices 100, 200, 300, 400, or 500 for the left and right eyes coincide (overlap each other) at a desired position. In other words, for example, the image displayed in the optical device 120, 320, or 520 is moved horizontally and vertically and is rotated such that a point "A" shown in FIG. 6 is located at a desired position. As above, by operating the switch arranged in the control device 18, the image signal is controlled (corrected). In other words, a display position correcting signal is generated within the control device 18, and the display position correcting signal is added to the image signal.

A state in which the images displayed by the image displaying devices 100, 200, 300, 400, and 500 for the left and right eyes are horizontally misaligned from desired positions is schematically illustrated in FIG. 16A, a state in which the above-described images are vertically misaligned is schematically illustrated in FIG. 16B, and a state in which the above-described images area misaligned in a rotated state is schematically illustrated in FIG. 16C. Here, images disposed on the right side in FIGS. 16A, 16B, and 16C represent images that are displayed by the image displaying devices 100, 200, 300, 400, and 500 for the right eye, and images disposed on the left side in FIGS. 16A, 16B, and 16C represent images that are displayed by the image displaying devices 100, 200, 300, 400, and 500 for the left eye. In addition, dotted lines represented on the right side in FIGS. 16A, 16B, and 16C represent the overlapping of the images displayed by the image displaying device 100, 200, 300, 400, or 500 for the left eye.

Here, for the movement of an image in the horizontal direction, a signal used for shifting the position of the image, which is based on an image signal, by +i pixels or −i pixels in the horizontal direction may be generated by the control device 18 as a display position correcting signal. Alternatively, a signal that is used for shifting the timing of a horizontal synchronization signal by +i pixels or −i pixels may be generated by the control device 18. In addition, for the movement of an image in the vertical direction, a signal that is used for shifting the position of an image, which is based on an image signal, by +j pixels or −j pixels in the vertical direction may be generated by the control device 18 as a display position correcting signal, or a signal that is used for shifting the timing of a vertical synchronization signal by +j pixels or −j pixels may be generated by the control device 18. In other words, it can be achieved by delaying or advancing the memory reading position of an image timing-wise or by shifting the timing of the vertical synchronization signal or the horizontal synchronization signal. Furthermore, for rotating the movement of an image, a signal that is used for rotating an image may be generated by the control device 18 as a display position correcting signal by using a known method.

Then, the display position correcting signal at a time when the images displayed by the image displaying devices 100, 200, 300, 400, and 500 for the left and right eyes coincide with each other (overlap each other) is stored in the control device 18. Such an operation can be performed, for example, by using a button (not shown in the figure) arranged in the control device 18. Such an operation may be performed once, for example, when an observer wears the image displaying devices. In addition, in such an operation, one kind of test pattern, as illustrated in FIGS. 16A to 16C, acquired by combining a line extending in the horizontal direction, a line extending in the vertical direction, and a line extending in an inclined direction may be used. As above, by controlling the position of the image displayed in the optical device 120, 320, or 520 that configures at least one image displaying device 100, 200, 300, 400, or 500, the mutual positions of two images displayed in two image displaying devices 100, 200, 300, 400, and 500 can be adjusted. In other words, both a more precise adjustment of the convergence angle and the adjustment of the position of an image can be performed.

The display position correcting signal, as described above, is stored in the control device (a control circuit or a control unit) 18. Then, a process for displaying an image is performed for the image signal by the control device 18. In other words, a display position correcting signal is added to the image signal (particularly, data "POS_X" and "POS_Y") by the control device 18. Accordingly, by controlling the image signals input to the image forming devices 111A and 111B that configure at least one image displaying device (in Embodiment 6, two image displaying devices 100, 200, 300, 400, and 500 for the left and right eyes), in other words, by adjusting a distance (gap) between two images acquired by two image displaying devices 100, 200, 300, 400, and 500 for the left and right eyes, more precise adjustment of the convergence angle can be performed.

Embodiment 7

Embodiment 7 is a modification of Embodiment 1 as well. In Embodiment 7, an observer (an operator, a driver, a passenger, or anyone else) wearing the display apparatus assembly is assumed to be boarded on a transportation unit (transportation engine) that is a bicycle. A speed measuring device is formed by a known wheel rotation number detecting device and a known calculation device that acquires the movement speed based on data supplied from the rotation number detecting device.

To be more specific, a Cadence (the number of rotations of a crank of a bicycle) detecting unit is included in the bicycle. The number of rotations of the crank of the bicycle by the Cadence detecting unit is transmitted to the calculation device in a wired or wireless manner. In the calculation device, the current movement speed of the bicycle is calculated based on crank rotation number data that is acquired by the Cadence detecting unit based on set gear data at a constant time interval $\Delta t$. Then, this movement speed (movement speed information) is transmitted to the control device 18 in a wired or wireless manner, and accordingly, similarly to Embodiments 1 to 6, the convergence angle is changed.

Generally, since the line of sight of a bicycle rider is located at a place that is apart by 5 m or more from the bicycle during the riding, by setting the convergence angle such that the virtual-image distance is equal to or more than 5 m, a place that is farther than the place is approximately within the focal depth of the eyes of the rider. Accordingly, the convergence angle may be set such that the virtual-image distance is equal to or more than 5 m in a case where the movement speed of the bicycle, for example, is equal to or higher than 10 km/hour. On the other hand, the convergence angle may be set such that the virtual-image distance is 4 m when the movement speed of the bicycle, for example, is lower than 10 km/hour.

Embodiment 8

Embodiment 8 is a display apparatus assembly according to the second embodiment of the present disclosure, and more particularly, to a display apparatus assembly according to the embodiment 2A of the present disclosure. The display apparatus assembly according to Embodiment 8 or Embodiment 9 to be described later is a display apparatus assembly that includes a display apparatus and a speed measuring device 31 that measures the movement speed of the display apparatus. The display apparatus includes (A) a glass-type frame 10 that is worn by the head of an observer (an operator, a driver, a passenger, or the like) 20 and (B) an image displaying device that is mounted to the frame 10. Here, in Embodiment 8 or Embodiment 9 to be described later, it is assumed that two image displaying devices 100, 200, 300, 400, and 500 for the left and right eyes are included. In other words, the display apparatus is a binocular type including two image displaying devices. Each of the image displaying devices 100, 200, 300, 400, and 500 includes:

(A) image forming devices 111 and 211;

(B) optical systems (parallel light output optical systems) 112 and 254 that form the light output from the image forming devices 111 and 211 to be parallel light; and (C) optical devices (light guiding units) 120, 320, and 520 to which light output from the optical systems 112 and 254 is incident and in which the light is guided so as to be output. The configuration and structure of the display apparatus assembly according to Embodiment 8 or Embodiment 9 to be described later may be substantially similar to those of the display apparatus assembly described in Embodiment 1, and thus detailed description thereof is omitted.

Figure 17:
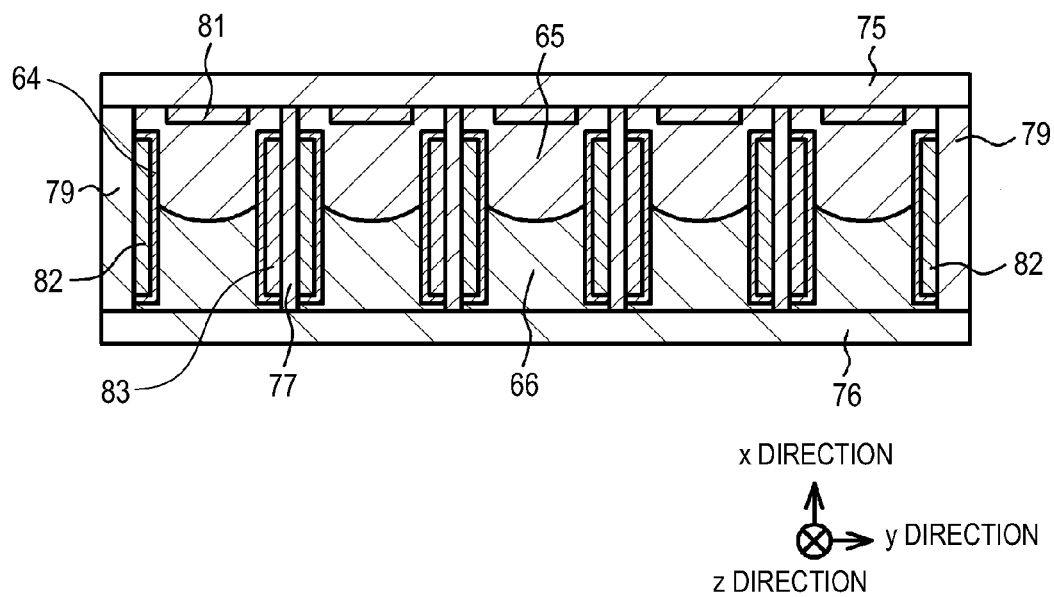
FIG. 17 is a schematic cross-sectional view of a Fresnel-screen type liquid lens that is used for allowing the focal distance of an optical system of a display apparatus assembly according to Embodiment 8 to be changeable.
Figure 18:
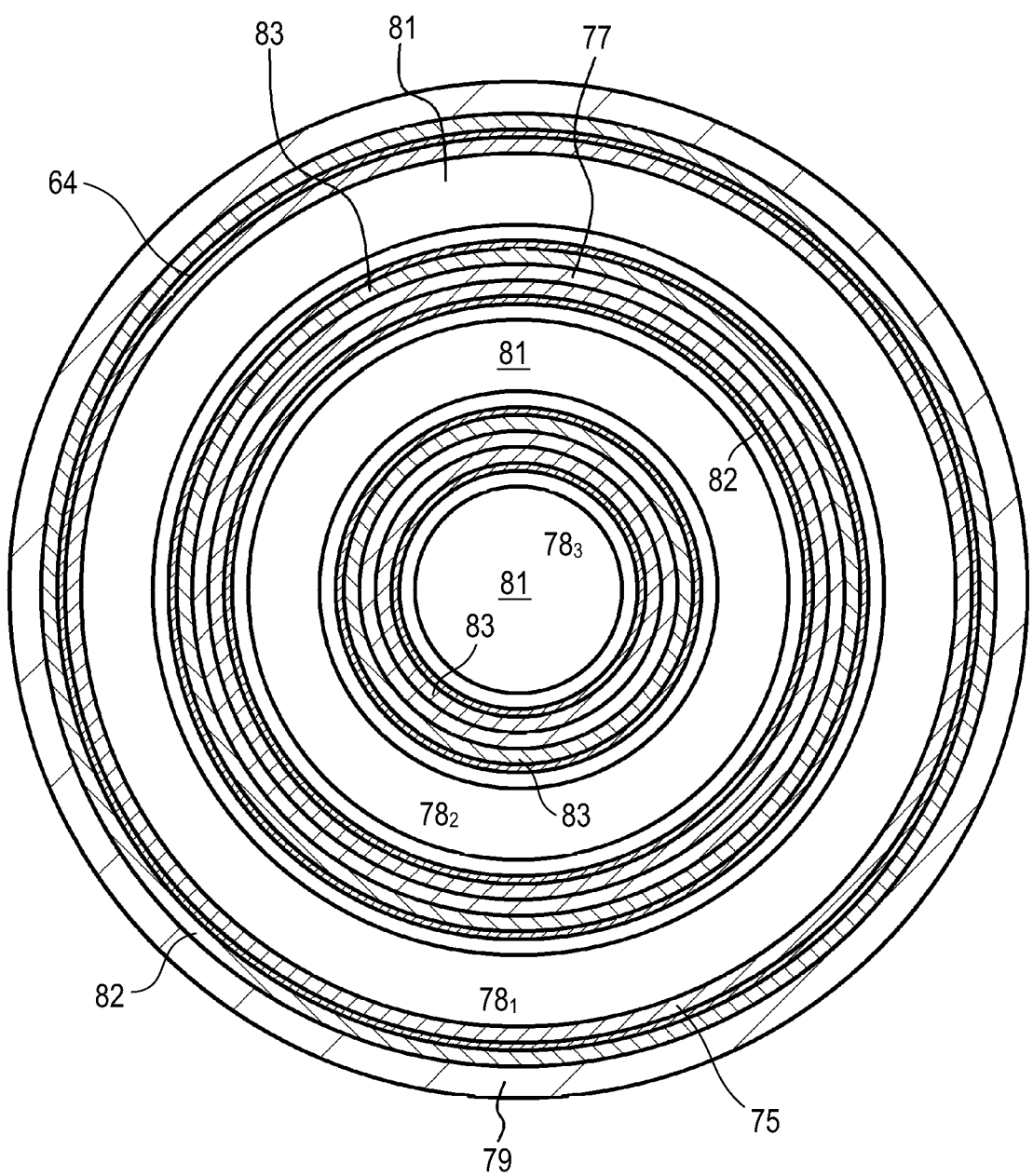
FIG. 18 is a schematic plan view of a Fresnel-screen type liquid lens that is used for allowing the focal distance of an optical system of a display apparatus assembly according to Embodiment 8 to be changeable.

In the display apparatus assembly according to Embodiment 8, based on the movement speed of the display apparatus that is measured by the speed measuring device 31, the focal distance of the optical system 112 or 254 is changed, and the virtual-image distance $L_{vi}$ of an image that is displayed by the image displaying device 100, 200, 300, 400, or 500 is changed. To be more specific, the higher the movement speed is, the longer the focal distance of the optical system 112 or 254 becomes, whereby the virtual-image distance $L_{vi}$ of the image displayed by the image displaying device 100, 200, 300, 400, or 500 increases. Here, the optical system 112 or 254 that configures the image displaying device 100, 200, 300, 400, or 500 includes a liquid lens, and the focal distance of the optical system 112 or 254 is changed by operating the liquid lens. A schematic cross-sectional view of such a liquid lens is illustrated in FIG. 17, and a plan view thereof is illustrated in FIG. 18. The liquid lens is configured from a Fresnel lens, and ring-shape lens chambers are concentrically arranged.

In other words, the liquid lens includes (A) a housing that includes: a so-called endless outer wall member 79 that does not have an end portion; a top panel 75 that is mounted on the top face of the outer wall member 79; and a bottom panel 76 that is mounted on the bottom face of the outer wall member 79 and (B) (N−1) partition wall members 77 that do not have an end portion and are concentrically arranged in the outer wall member 79. Here, the outer shape of the housing is a circle. In addition, a center lens chamber that is surrounded by (N−1) ring-shaped lens chambers and the (N−1)-th partition wall member 77 is included. In the example illustrated in the figure, N=3. Each lens chamber 78 ($78_1$, $78_2$, or $78_3$) is occupied by the first liquid 65 and the second liquid 66 that configure the liquid lens.

The first lens chamber (ring-shaped lens chamber) $78_1$ is configured by the outer wall member 79, the first partition wall member 77, the top panel 75, and the bottom panel 76. In addition, the first electrode 81 is disposed on the inner face of a part of the top panel 75 that configures the first lens chamber $78_1$, the second electrode 82 is disposed on the inner face of a part of the outer wall member 79 that configures the first lens chamber $78_1$, and the third electrode 83 is disposed on the inner face of a part of the first partition wall member 77 that configures the first lens chamber $78_1$.

The (n+1)-th lens chamber (ring-shape lens chamber) $78_{(n+1)}$ is configured by the n-th (here, n=1, 2, . . . N−2) partition wall member 77, the (n+1)-th partition wall member 77, the top panel 75, and the bottom panel 76. In addition, the first electrode 81 is disposed on the inner face of a part of the top panel 75 that configures the (n+1)-th lens chamber $78_{(n+1)}$, the second electrode 82 is disposed on the inner face of a part of n-th partition wall member 77 that configures the (n+1)-th lens chamber $78_{(n+1)}$, and the third electrode 83 is disposed on the inner face of a part of (n+1)-th partition wall member 77 that configures the (n+1)-th lens chamber $78_{(n+1)}$.

The first electrode 81 is disposed on the inner face of a part of the top panel 75 that configures the center lens chamber $78_3$ corresponding to the N-th lens chamber $78_N$, and the third electrode 83 is disposed on the inner face of a part of the (N−1)-th partition wall member 77 that configures the center lens chamber $78_3$.

In the example illustrated in the figure, the first electrode 81 is disposed for each lens chamber. However, one electrode as the first electrode 81 may be disposed on the inner face of the top panel 75.

In this liquid lens, similarly to Embodiment 4, a water-repellency treatment is performed for the surface of each of the outer wall member 79 and the partition wall member 77 in which at least the interface between the first liquid 65 and the second liquid 66 is located. Light is incident from the bottom panel 76, and the light is output from the top panel 75. In each lens chamber 78₁, 78₂, or 78₃, by configuring the voltages applied to the second electrode 82 and the third electrode 83 to be different from each other, the optical power of the liquid lens is changed. Alternatively, in each lens chamber 78₁, 78₂, or 78₃, by configuring the voltages applied to the second electrode 82 and the third electrode 83 to be different, a Fresnel lens is configured by the liquid lenses as a whole.

By controlling voltages applied to the second electrode 82 and the third electrode 83 based on the movement speed of the display apparatus that is measured by the speed measuring device 31 by using the control device 18, the focal distance of the liquid lens is changed, and the virtual-image distance of the image displayed by the image displaying device 100, 200, 300, 400, or 500 is changed. In addition, the relationship between the movement speed of the display apparatus and the virtual-image distance may be stored in a storage unit that is included in the control device 18 in advance.

In addition, the optical systems 112 and 254 configured by the liquid lenses of the display apparatus assembly according to Embodiment 8 can be applied to the optical systems 112 and 254 of the display apparatus assembly described in Embodiments 1 to 7.

According to the display apparatus assembly of Embodiment 8, by automatically changing the virtual-image distance in accordance with the movement speed of the display apparatus, the viewpoint distance and the virtual-image distance of an image displayed by the image displaying device can coincide with each other as much as possible, whereby a display apparatus assembly, of which the visual recognition is improved, particularly appropriate for the use for navigation can be provided.

Embodiment 9

Embodiment 9 relates to a display apparatus assembly according to the third embodiment of the present disclosure. According to the display apparatus assembly of Embodiment 9, based on the movement speed of the display apparatus that is measured by the speed measuring device 31, at least one (15 combinations) of the size of the image displayed in the optical device (light guiding unit) 120, 320, or 520, the luminance of the image, the resolution of the image, and the content of the image is changed.

To be more specific, based on the movement speed of the display apparatus that is measured by the speed measuring device 31, under the control of the control device 18, the value of the luminance of the image may be decreased (in other words, the image is darkened) as the movement speed of the display apparatus increases, and the value of the luminance of the image may be increased (in other words, the image is brightened) as the movement speed of the display apparatus decreases, by using a known method. In addition, in a case where the resolution of the image is changed, to be more specific, the value of the resolution of the image may be decreased (in other words, the is roughly formed) as the movement speed of the display apparatus increases, and the value of the resolution of the image may be increased (in other words, the image is delicately formed) as the movement speed of the display apparatus decreases, by using a known method. Furthermore, in a case where the content of the image is changed, to be more specific, by using a known method, as the movement speed of the display apparatus increases, the content of the image (the amount of information) may be decreased or simplified, the display area of the image in the optical device may be narrowed so as to decrease the display size of the image in the optical device or roughly display the image in the optical device, and as the movement speed of the display apparatus decreases, the content of the image (the amount of information) may be increased, the display area of the image in the optical device may be broadened, the display size of the image in the optical device may be increased, or the image may be delicately displayed in the optical device. Here, the relationship between the movement speed of the display apparatus and the size of the image, the relationship between the movement speed of the display apparatus and the luminance of the image, the relationship between the movement speed of the display apparatus and the resolution of the image, and the relationship between the movement speed of the display apparatus and the content of the image may be stored in a storage unit that is included in the control device 18 in advance. The image data stored in the storage unit of the control device 18 may be processed depending on the movement speed by the control device 18, or it may be configured such that a plurality of sets of image data are stored in the storage unit of the control device 18, and the control device 18 reads out appropriate image data from the plurality of sets of image data depending on the movement speed.

In addition, the display apparatus assembly according to Embodiment 9 may be applied to the display apparatus assemblies described in Embodiments 1 to 8.

According to the display apparatus assembly of Embodiment 9, since at least one of the size of an image displayed in the optical device, the luminance of the image, the resolution of the image, and the content of the image is changed in accordance with the movement speed of the display apparatus, the size of the image, the luminance of the image, the resolution of the image, or the content of the image that is appropriate for the movement speed of the display apparatus can be appropriately selected, and accordingly, a display apparatus assembly that is particularly appropriate for the use for navigation can be provided.

Embodiment 10

Embodiment 10 is a display apparatus assembly according to the fourth embodiment of the present disclosure. The display apparatus assembly according to Embodiment 10 is a display apparatus assembly that includes a display apparatus and an acceleration measuring device 32 that measures the acceleration during the movement of the display apparatus. The display apparatus includes (A) a glass-type frame 10 that is worn by the head of an observer (an operator, a driver, a passenger, or the like) 20 and (B) an image displaying device that is mounted to the frame 10. Here, in Embodiment 10, it is assumed that two image displaying devices 100, 200, 300, 400, and 500 for the left and right eyes are included. In other words, the display apparatus is a binocular type having two image displaying devices. Each of the image displaying devices 100, 200, 300, 400, and 500 includes:

(A) image forming devices 111 and 211;

(B) optical systems (parallel light output optical systems) 112 and 254 that form the light output from the image forming devices 111 and 211 to be parallel light; and (C) optical devices (light guiding units) 120, 320, and 520 to which light output from the optical systems 112 and 254 is incident and in which the light is guided so as to be output. The configuration and structure of the display apparatus assembly according to Embodiment 10 may be configured substantially similar to those of the display apparatus assembly described in Embodiment 1, and thus detailed description thereof is omitted.

According to the display apparatus assembly of Embodiment 10, when the absolute value of the acceleration during the movement of the display apparatus that is measured by the acceleration measuring device 32 is equal to or greater than a predetermined value, the operations of the image displaying devices 100, 200, 300, 400, and 500 are stopped. The predetermined value of the acceleration may be stored in a storage unit that is included in the control device 18 in advance. Here, in Embodiment 10, for example, the predetermined value $\alpha_0$ may be 5 m/sec$^2$. When the absolute value of the acceleration is equal to or greater than the predetermined value, the operations of the image displaying devices 100, 200, 300, 400, and 500 are stopped, so that the image disappears from the optical device. Accordingly, the observer can visually recognize only the real image formed in front of the eyes, and therefore, the actual situation can be checked with the naked eyes reliably and easily. In order to start the operations of the image displaying devices 100, 200, 300, 400, and 500, for example, the observer may press a start button.

The acceleration measuring device is formed by a known global positioning system and a known calculation device that acquires acceleration based on data supplied from the global positioning system. Alternatively, the acceleration measuring device may be formed by a known acceleration sensor and a known calculation device that acquires acceleration based on data supplied form the acceleration sensor. Furthermore, the acceleration measuring device may be formed by a known wheel rotation number detecting device and a known calculation device that acquires acceleration based on data supplied from the wheel rotation number detecting device.

According to the display apparatus assembly of Embodiment 10, since the operations of the image displaying devices are stopped when the absolute value of the acceleration during the movement of the display apparatus is equal to or greater than the predetermined value, an image is not displayed in the optical device, and the actual situation can be instantly checked with the naked eyes, thereby a display apparatus assembly that is particularly appropriate for the use for navigation can be provided.

In addition, the display apparatus assembly according to Embodiment 10 may be applied to the display apparatus assemblies described in Embodiments 1 to 9. For example, in a case where the display apparatus assembly according to Embodiment 10 is combined with the display apparatus assembly described in Embodiment 9, the operations of the image displaying devices 100, 200, 300, 400, and 500 are stopped when the absolute value of the current acceleration is greater than the predetermined value $\alpha_0$. On the other hand, when the absolute value of the current acceleration is less than the predetermined value $\alpha_0$, the current movement speed is subsequently measured. Then, when the movement speed is equal to or greater than a predetermined movement speed, the range of the display screen of the optical device 120, 320, or 520 is narrowed, the resolution or the luminance thereof is lowered, or only an arrow representing the orientation of the progress and the current movement speed are displayed. In addition, when the movement speed is not zero although it is lower than the predetermined movement speed, the range of the display image in the optical device 120, 320, or 520 is broadened, the resolution or the luminance is increased, or the display is switched to a display in which the amount of information of the remaining distance up to a destination or neighbor building information (a park, a police station, a convenient store, and the like) is much. Furthermore, when the movement speed is zero (in other words, the observer is stopped), a neighbor map is displayed over the entire screen in the full resolution with the maximum luminance.

Embodiment 11

Embodiment 11 is a modification of the image displaying devices according to Embodiments 1 to 10. As the conceptual diagrams of image displaying devices 200 and 400 of the display apparatus according to Embodiment 11 or Embodiment 13 to be described later are illustrated in FIGS. 19 and 21, an image forming device 211 is configured by the image forming device according to the second configuration. In other words, the image forming device 211 includes a light source 251 and a scanning unit 253 that scans parallel light emitted from the light source 251. To be more specific, the image forming device 211 includes: a light source 251; a collimator optical system 252 that that forms light emitted from the light source 251 to be parallel light; and a scanning unit 253 that scans the parallel light output from the collimator optical system 252; and an optical system (relay optical system) 254 that relays and outputs the parallel light scanned by the scanning unit 253. In addition, the entire image forming device 211 can be fitted to the inside of a casing 213 (denoted by dashed-dotted lines in FIGS. 19 and 21), an opening portion (not shown in the figure) is arranged in the casing 213, and light is output from the relay optical system 254 through the opening portion. In addition, each casing 213 is attached to a temple portion 13 in a detachable state or a fixed state by using an attachment member 19.

The light source 251 is configured by a light emitting device that emits white light. The light emitted from the light source 251 is incident to the collimator optical system 252 having a positive optical power as a whole and is output as parallel light. Then, the parallel light is reflected by a total-reflection mirror 256, a micro mirror is configured to be rotatable in a two-dimensional direction, and horizontal scanning and vertical scanning are performed by the scanning unit 253 that is formed by MEMS that can two-dimensionally scan the incident parallel light for forming one kind of two-dimensional image, and virtual pixels (the number of the pixels, for example, may be the same as that in Embodiment 1) are generated. Then, light emitted from the virtual pixels passes through the relay optical system (parallel light output optical system) 254 that is configured by a known relay optical system, and the light beams formed as the parallel light are incident to the optical device 120.

The optical device 120 to which the light beams formed as the parallel light by the relay optical system 254 are incident and in which the incident light beams are guided so as to be output therefrom has the same configuration and structure as those described in Embodiment 1, and thus detailed description thereof is omitted. In addition, since the display apparatus according to Embodiment 11 has the same configuration and structure as those of the display apparatuses according to Embodiments 1 to 10 except for the differences described above, detailed description thereof is omitted.

Embodiment 12

Figures 20A, 20B:
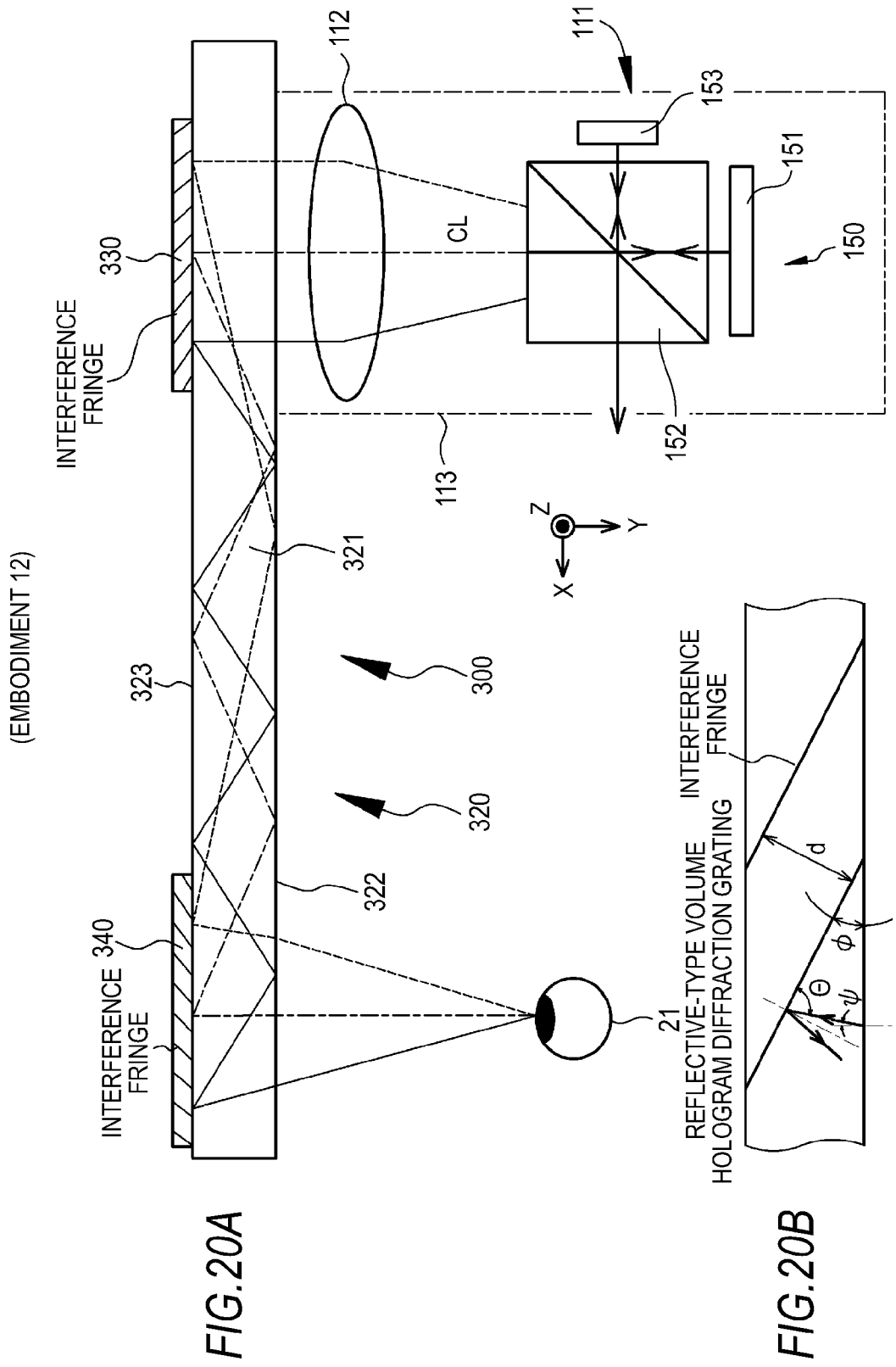
FIGS. 20A and 20B are conceptual diagram of an image displaying device of a display apparatus assembly according to Embodiment 12.

Embodiment 12 is a modification of the image displaying devices according to Embodiments 1 to 10. The conceptual diagram of an image displaying device 300 of a display apparatus according to Embodiment 12 is illustrated in FIG. 20A. In addition, a schematic cross-sectional view in which a part of a reflective-type volume hologram diffraction grating is enlarged is illustrated in FIG. 20B. According to Embodiment 12, similarly to Embodiment 1, an image forming device 111 is configured by an image forming device according to the first configuration. The basic configuration and structure of an optical device 320 are the same as those of the optical device 120 according to Embodiment 1, except for the configurations and the structures of first and second deflection units.

According to Embodiment 12, the first deflection unit and the second deflection unit are arranged on the surface (particularly, a second face 323 of a light guiding plate 321) of a light guiding plate 321. The first deflection unit diffracts light incident to the light guiding plate 321, and the second deflection unit diffracts light propagating through the inside of the light guiding plate 321 through total reflection over a plurality of times. Here, the first deflection unit and the second deflection unit are formed by diffraction grating devices, particularly, reflective-type diffraction grating devices, and more particularly, reflective-type volume hologram diffraction gratings. In the description presented below, the first deflection unit that is formed by a reflective-type volume hologram deflation grating is referred to as a "first diffraction grating member 330" for convenience of the description, and the second deflection unit that is formed from a reflective-type volume hologram diffraction grating is referred to as a "second diffraction grating member 340" for convenience of the description.

In Embodiment 12 or Embodiment 13 to be described later, the first diffraction grating member 330 and the second diffraction grating member 340 are configured so as to be formed by laminating diffraction grating layers each formed as one layer. In addition, in each diffraction grating layer that is formed from a photopolymer material, interference fringes according to one type of wavelength band (or wavelength) is formed, and the diffraction grating layer is manufactured by using a general method. The pitch of the interference fringes formed in the diffraction grating layer (diffraction optical device) is constant, and the interference fringes have a linear shape and are parallel to the Z-axis. In addition, the axial lines of the first diffraction grating member 330 and the second diffraction grating member 340 are parallel to the X axis, and the normal lines thereof are parallel to the Y axis.

A schematic partial cross-sectional view in which the reflective-type volume hologram diffraction grating is enlarged is illustrated in FIG. 20B. In the reflective-type volume hologram diffraction grating, interference fringes having an inclination angle φ are formed. Here, the inclination angle φ represents an angle that is formed by the surface of the reflective-type volume hologram diffraction grating and the interference fringes. The interference fringes are formed from the inside of the reflective-type volume hologram diffraction grating to the surface thereof. The interference fringes satisfy a Bragg condition. Here, the Bragg condition is a condition that satisfies the following Equation (A). In Equation (A), m represents a positive integer, λ represents a wavelength, d represents the pitch of the grating face (a gap of virtual planes including the interference fringes in the direction of the normal line), and Θ represents a complementary angle of an angle at which light is incident to the interference fringes. In addition, the relationship among the complementary angle Θ, the inclination angle φ, and the incidence angle ψ in a case where light penetrates into the diffraction grating member with an incidence angle ψ is as in Equation (B).

$$m \cdot \lambda = 2 \cdot d \cdot \sin(\Theta) \tag{A}$$

$$\Theta = 90° - (\phi + \psi) \tag{B}$$

The first diffraction grating member 330, as described above, is arranged on (bonded to) the second face 323 of the light guiding plate 321 and diffracts and reflects parallel light incident to the light guiding plate 321 such that the parallel light incident to the light guiding plate 321 from the first face 322 is totally reflected inside the light guiding plate 321. In addition, the second diffraction grating member 340, as descried above, is arranged on (bonded to) the second face 323 of the light guiding plate 321 and diffracts and reflects the parallel light propagating through the inside of the light guiding plate 321 through total reflection a plurality of times so as to be output from the first face 322 of the light guiding plate 321 as parallel light.

Then, the parallel light propagates through the inside of the light guiding plate 321 through total reflection and then is output therefrom. At this time, since the light guiding plate 321 is thin, and the optical path for propagating the inside of the light guiding plate 321 is long, the number of times of total reflection until the reach of the parallel light up to the second diffraction grating member 340 differs in accordance with the angle of view. Described in more detail, of the parallel light incident to the light guiding plate 321, the number of times of reflection of parallel light incident to the light guiding plate 321 with an angle in the direction approaching the second diffraction grating member 340 is less than that of parallel light incident to the light guiding plate 321 with an angle in the direction departing away from the second diffraction grating member 340. The reason for this is that an angle that is formed by the parallel light that is diffracted and reflected by the first diffraction grating member 330 and is incident to the light guiding plate 321 with angle in the direction approaching the second diffraction grating member 340 and the normal line of the light guiding plate 321 at the time when the light propagating through the inside of the light guiding plate 321 collides with the inner face of the light guiding plate 321 is less than an angle that is formed by the parallel light incident to the light guiding plate 321 with an angle in the opposite direction and the normal line. In addition, the shape of the interference fringes formed inside the second diffraction grating member 340 and the shape of the interference fringes formed inside the first diffraction grating member 330 are symmetrical with respect to a virtual surface that is perpendicular to the axial line of the light guiding plate 321.

A light guiding plate 321 according to Embodiment 13 to be described later basically has the same configuration and structure as those of the light guiding plate 321 described above. The display apparatus according to Embodiment 12 has the same configuration and structure as those of the display apparatuses according to Embodiments 1 to 11 except for the differences described above, and thus detailed description thereof is omitted.

Embodiment 13

Embodiment 13 is a modification of the image displaying device according to Embodiments 12. A conceptual diagram of an image displaying device of a display apparatus according to Embodiment 13 is illustrated in FIG. 21. A light source 251, a collimator optical system 252, a scanning unit 253, a parallel light output optical system (an optical system or a relay optical system 254), and the like of the image displaying device 400 according to Embodiment 13 have the same configurations and structures (the image forming device according to the second configuration) as those of Embodiment 11. In addition, an optical device 320 according to Embodiment 13 has the same configuration and structure as those of the optical device 320 according to Embodiment 12. The display apparatus according to Embodiment 13 substantially has the same configuration and structure as those of the display apparatus according to Embodiment 1 or 11 except for the differences described above, and thus detailed description thereof is omitted.

Embodiment 14

Figure 22A:
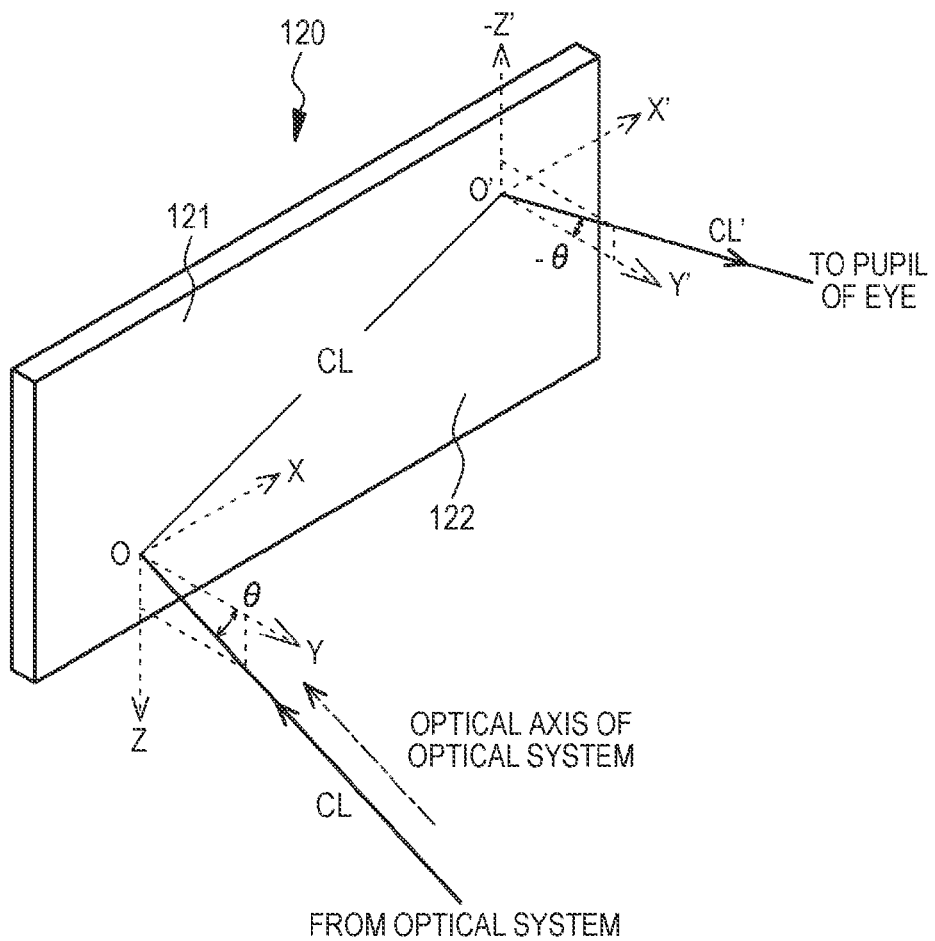
Figure 22B:
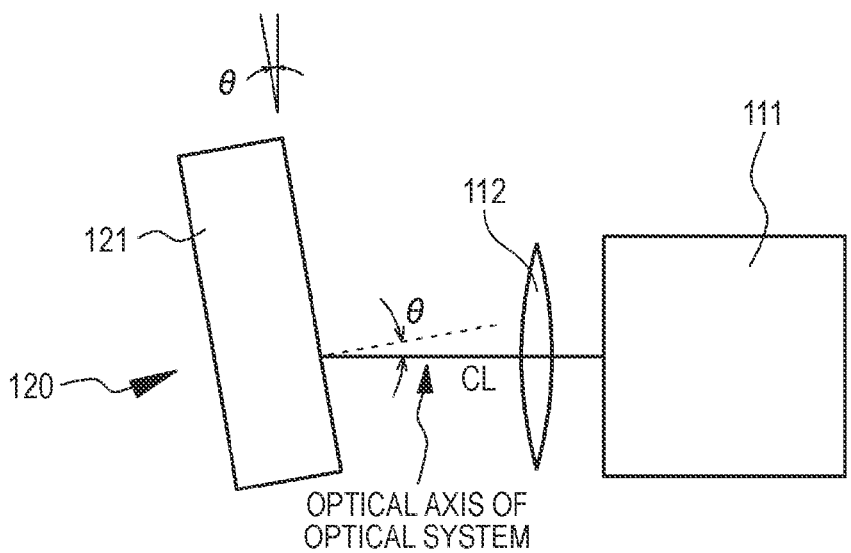
Figure 23:
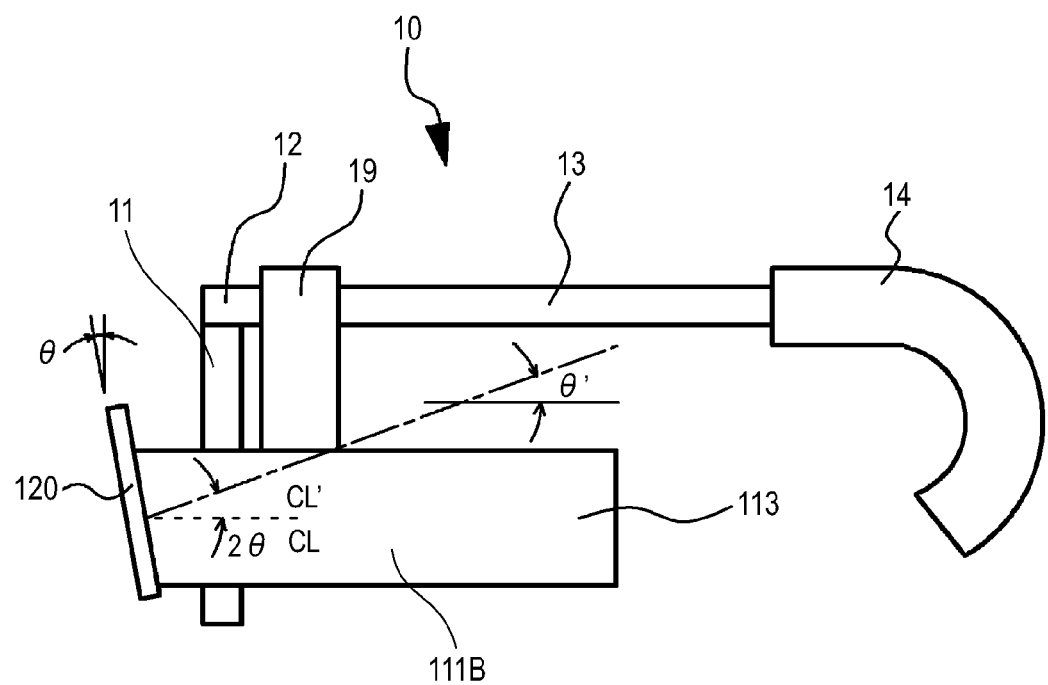
FIG. 23 is a schematic diagram of the display apparatus assembly according to Embodiment 14, viewed from the side.

Embodiment 14 is a modification of the image displaying devices according to Embodiments 1 to 13. Conceptual diagrams illustrating the arrangement state of a light guiding plate and the like that configure an image displaying device of a display apparatus according to Embodiment 14 are illustrated in FIGS. 22A and 22B. In addition, a schematic diagram of the display apparatus according to Embodiment 14, viewed from the side is illustrated in FIG. 23.

In Embodiments 1 to 13, as illustrated in FIG. 2, in the image displaying device 100 or 300, the center light beam CL that is output from the center of the image forming device 111 or 211 and passes through the nodal point of the optical system 112 or 254 located on the image forming device side is designed so as to collide with the light guiding plate 121 or 321 within the XY plane. In other words, the center light beam CL is designed so as to be incident to the light guiding plate 121 or 321 with an incidence angle (XY plane incidence angle) of 0° within the XY plane. In such a case, the center of a displayed image coincides in the direction of the perpendicular line of the first face 122 or 322 of the light guiding plate 121 or 321.

In other words, in such an image displaying device that is represented by the image displaying device 100, as illustrated in FIG. 2, the center light beam CL output from the center of the image forming device 111 located on the optical axis of the collimator optical system 112 is converted into approximately parallel light by the collimator optical system 112 and then is incident to the first face (incidence face) 122 of the light guiding plate 121 within the XY plane. Then, the converted parallel light propagates in the propagation direction A while being totally reflected between the first face 122 and the second face 123 by the first deflection unit 130. Subsequently, the center light beam CL is reflected and diffracted by the second deflection unit 140 and is output from the first face 122 of the light guiding plate 121 within the XY plane so as to reach the pupils 21 of the observer 20.

Figure 27:
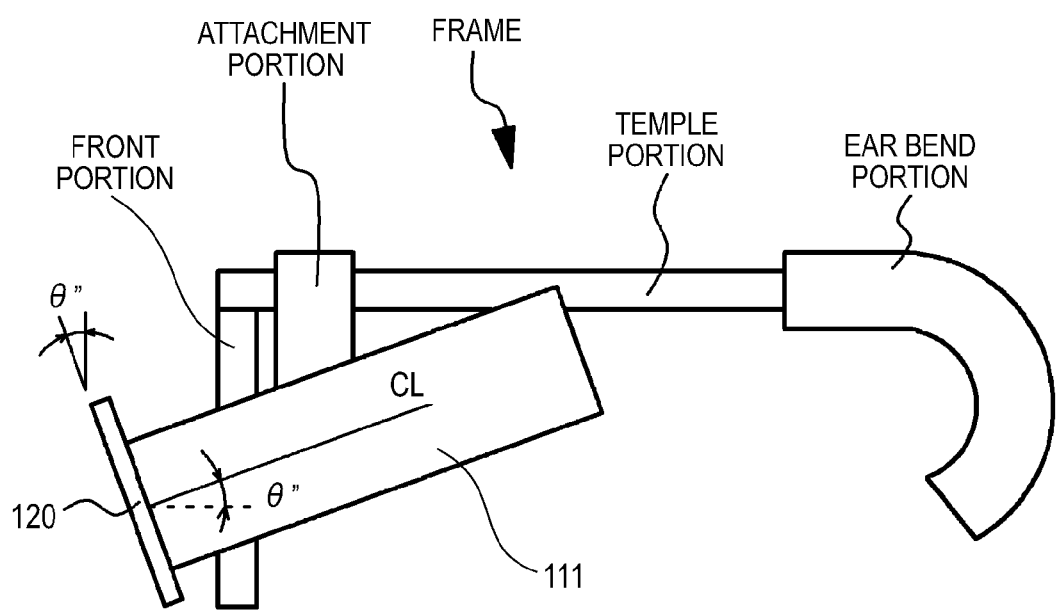
FIG. 27 is a schematic diagram of one type of a head-mounted display according to Embodiment 1, viewed from the side.

In a see-through type display apparatus, in order not for the optical device 120, 320, or 520 to interfere the observer 20 viewing an observation target located in the horizontal direction, it is preferable to arrange the optical device 120, 320, or 520 so as to be shifted to the lower side of the line of sight of the observer in the horizontal direction (the horizontal-direction line of sight of the observer). In such a case, the entire image displaying device 100 or 300 are arranged to the lower side of the horizontal-direction line of sight of the observer. In such a configuration, as illustrated in FIG. 27, it is necessary to incline the entire image displaying device 100 by an angle θ". Accordingly, there is a case where the angle θ" by which the image displaying device 100 can be inclined is limited, or the degree of freedom in design decreases based on the relationship with the attachment portion (temple portion) of the glass-type frame that is used for being mounted on the head of the observer. Accordingly, it is more preferable to form an image displaying device that does not interfere the horizontal-direction line of sight of the observer, can be arranged with a high degree of freedom, and has a high degree of freedom in design.

In Embodiment 14, a configuration is employed in which the center light beam CL intersects the XY plane at an angle (θ) other than 0°. In addition, the center light beam CL is configured so as to be included within the YZ plane. Furthermore, in Embodiment 14 or Embodiment 15 to be described later, the optical axis of the optical system 112 or 254 is included within the YZ plane and intersects the XY plane at an angle other than 0°, and more particularly, at an angle θ (see FIGS. 22A and 22B). In addition, in Embodiment 14 or Embodiment 15 to be described later, assuming that the XY plane coincides with a horizontal surface, the angle θ at which the center light beam CL intersects the XY plane is an elevation angle. In other words, the center light beam CL collides with the XY plane from the lower side of the XY plane toward the XY plane. The XY plane intersects the vertical surface at an angle other than 0°, and more particularly, at an angle θ.

Figure 24A:
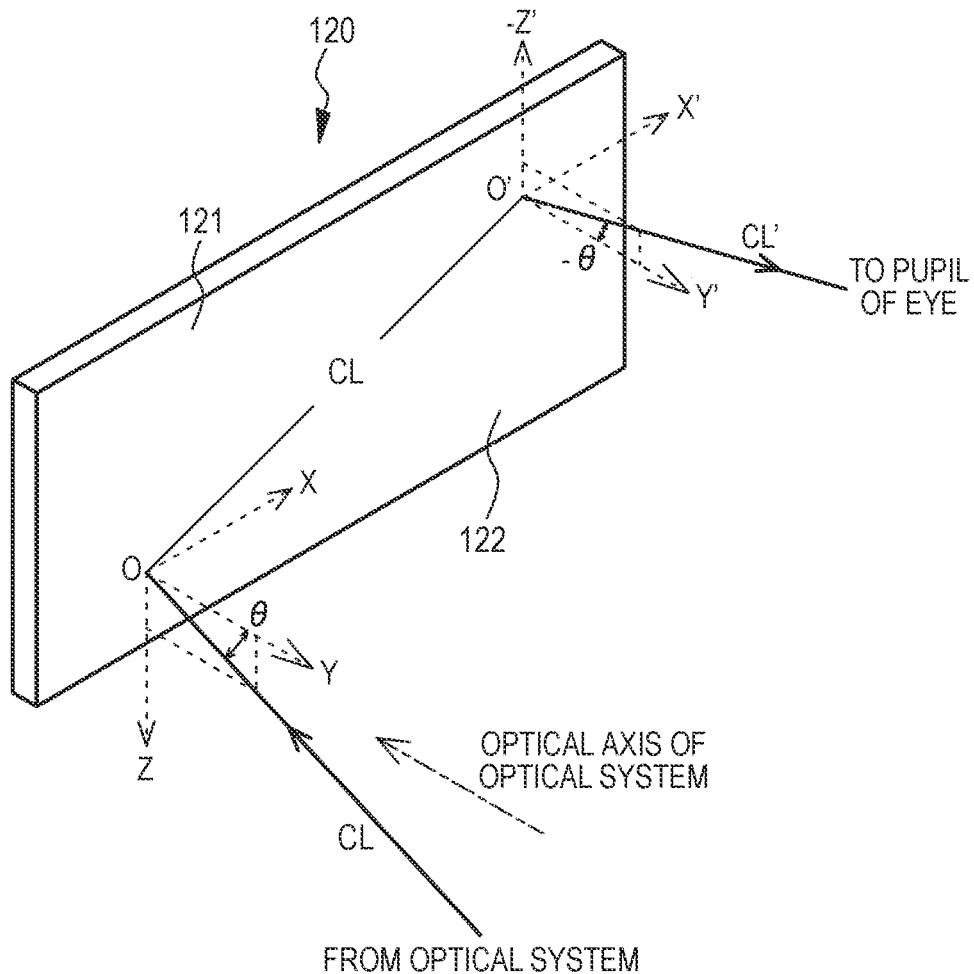

In Embodiment 14, the angle θ=5°. To be more specific, in such a configuration, the center light beam CL (denoted by a dotted line in FIG. 23) is included in the horizontal surface. The optical device 120, 320, or 520 is inclined by the angle θ with respect to the vertical surface. In other words, the optical device 120, 320, or 520 is inclined by an angle (90−θ)° with respect to the horizontal surface. In addition, the center light beam CL' (denoted by a dashed-dotted line in FIG. 23) output from the optical device 120, 320, or 520 is inclined by an angle 2θ with respect to the horizontal surface. In other words, when an observer 20 views a target located at an infinite distance in the horizontal direction, the center light beam CL' that is output from the optical device 120, 320, or 520 and is incident to the pupil of the observer 20 forms a depression angle θ' (=2θ) (see FIG. 23). The angle formed by the center light beam CL' and the normal line of the optical device 120, 320, or 520 is θ. In FIG. 22A or FIG. 24A to be described later, a point of the optical device 120, 320, or 520 from which the center light beam CL' is output is denoted by "O'", and axial lines that pass through the point O' and are parallel to the X axis, the Y axis, and the Z axis are denoted by the X' axis, the Y' axis, and the Z' axis.

In the image displaying device according to Embodiment 14, the center light beam CL intersects the XY plane at an angle (θ) other than 0°. Here, the center light beam CL' that is output from the optical device and is incident to the pupil of the observer 20 forms a depression angle θ', and θ'=2θ. On the other hand, in the example illustrated in FIG. 27, in order to obtain the same depression angle, it is necessary to incline the entire image displaying device by an angle θ". Here, the relationship between θ" and θ is θ"=2θ, and accordingly, it is necessary to incline the optical device by 2θ with respect to the vertical surface in the example illustrated in FIG. 27. On the other hand, according to Embodiment 14, the optical device may be inclined by θ with respect to the vertical surface, and the image forming device may be maintained to be horizontally arranged. Accordingly, there is less limitation on the angle of attachment of the image displaying device at the time of attaching the image displaying device to the attachment portion of the glass-type frame, and a high degree of freedom in the design can be acquired. In addition, since the inclination of the optical device with respect to the vertical surface is less than that of the example illustrated in FIG. 27, it is difficult for a phenomenon to occur in which external light is reflected by the optical device and is incident to the pupil of the observer 20. Therefore, an image having a higher quality can be displayed.

The display apparatus according to Embodiment 14 has the same configuration and structure as those of the display apparatuses according to Embodiments 1 to 13 except for the differences described above, and thus detailed description thereof is omitted.

Embodiment 15

Figure 24B:
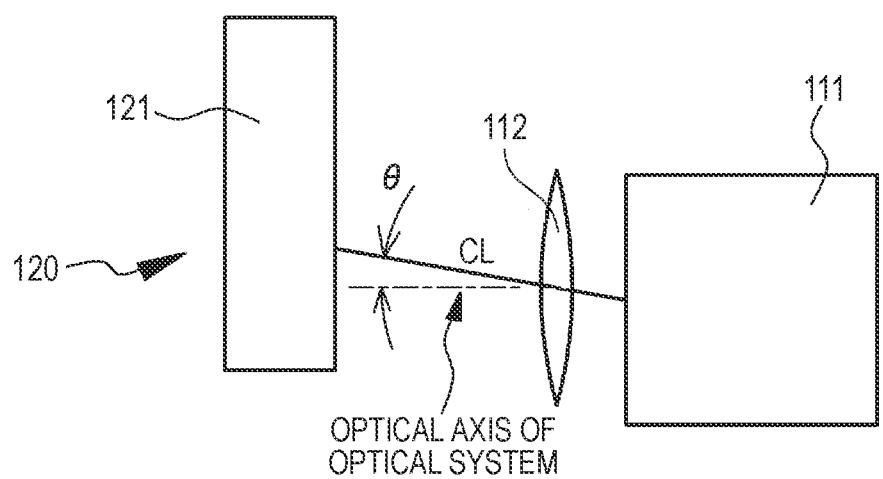

Embodiment 15 is a modification of the image displaying device according to Embodiment 14. Conceptual diagrams illustrating the arrangement state of a light guiding plate and the like that configure an image displaying device according to Embodiment 15 are illustrated in FIGS. 24A and 24B. Here, according to Embodiment 15, the optical axis of an optical system (a parallel light output optical system or a collimator optical system) 112 is parallel to the YZ plane, is parallel to the XY plane, and passes through a position deviated from the center of an image forming device 111. By employing such a configuration, the center light beam CL is included in the YZ plan and intersects the XY plane at an elevation angle θ. A display apparatus according to Embodiment 15 has the same configuration and structure as those of the display apparatuses according to Embodiments 1 to 14 except for the differences described above, and thus detailed description thereof is omitted.

Embodiment 16

Figure 25:
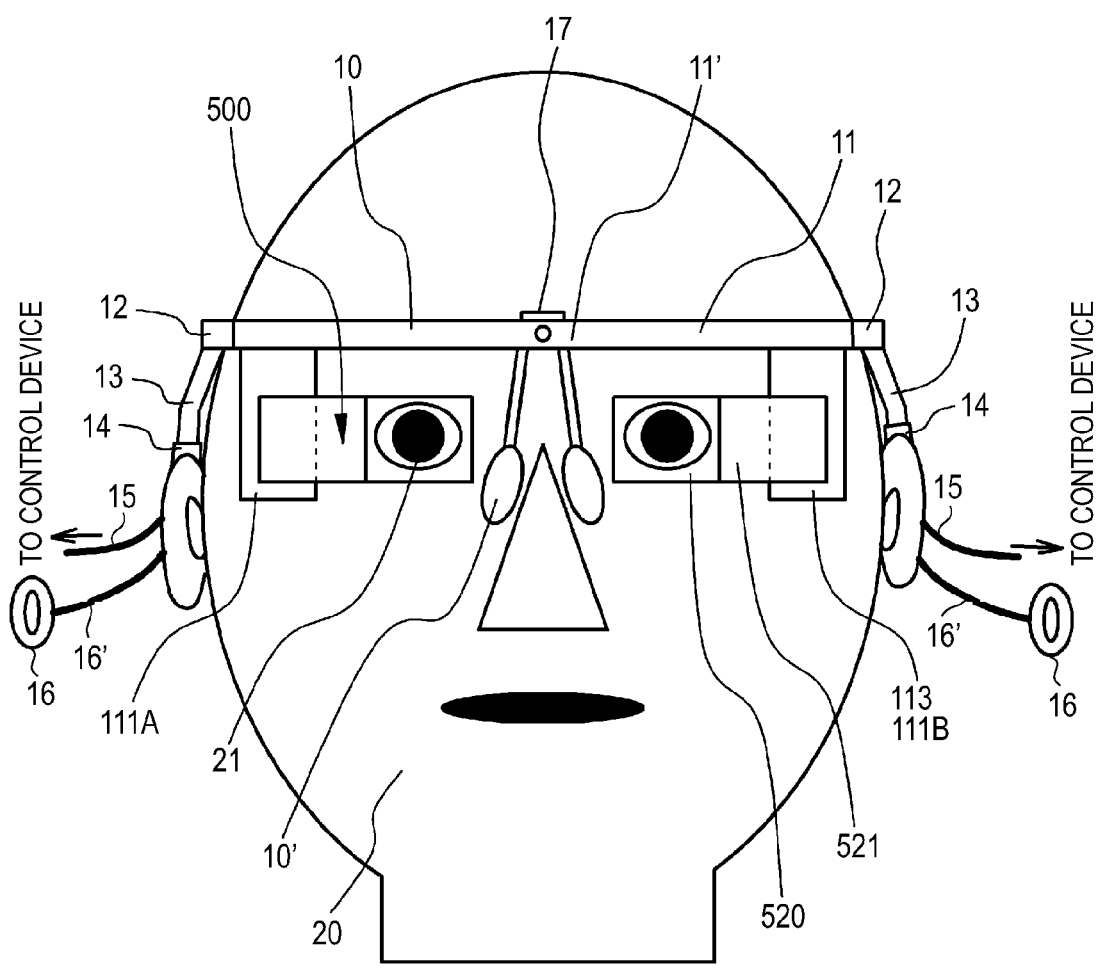
FIG. 25 is a schematic diagram of a display apparatus of a display apparatus assembly according to Embodiment 16, viewed from the front side.
Figure 26:
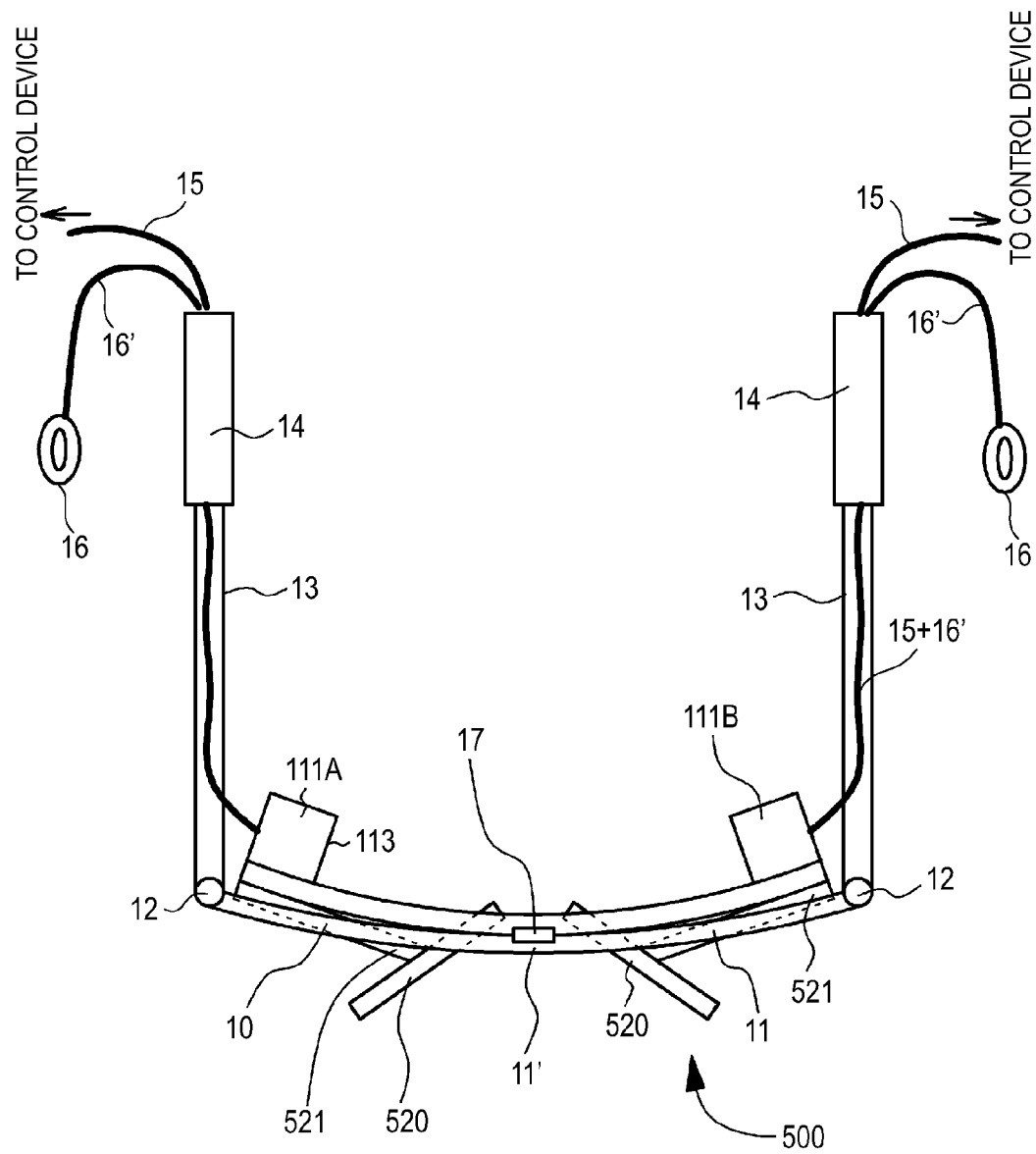
FIG. 26 is a schematic diagram of a display apparatus of a display apparatus assembly according to Embodiment 16, viewed from the upper side.

Embodiment 16 is a modification of the image displaying devices according to Embodiments 1 to 10. A schematic diagram of a display apparatus according to Embodiment 16, viewed from the front side is illustrated in FIG. 25, and a schematic diagram thereof viewed from the upper side is illustrated in FIG. 26.

In Embodiment 16, an optical device 520 is configured by a semi-transmissive mirror to which light output from the image forming devices 111A and 111B is incident and from which the light is output toward the pupils 21 of the observer 20. In addition, in Embodiment 16, although a structure is employed in which the light output from the image forming devices 111A and 111B propagates through the inside of a transparent member 521 such as a glass plate or a plastic plate and is incident to an optical device 520 (semi-transmissive mirror), a structure may be employed in which the light propagates through the air and is incident to the optical device 520. In addition, the image forming device may be configured as the image forming device 211 described in Embodiment 11.

Each of the image forming devices 111A and 111B is attached to a front portion 11, for example, by using a screw. In addition, a member 521 is attached to each of the image forming devices 111A and 111B, and the optical device 520 (semi-transmissive mirror) is mounted in the member 521. The display apparatus according to Embodiment 16 substantially has the same configuration and structure as those of the display apparatuses according to Embodiments 1 to 15 except for the differences described above, and thus detailed description thereof is omitted.

Embodiment 17

Embodiment 17 is a modification of the display apparatus assemblies according to Embodiments 1 to 9 and Embodiments 11 to 16. In the display apparatus assembly according to Embodiment 17, a plurality of data groups are stored in a storage unit that is included in the control device 18. Here, the data group is configured by a plurality of sets of different-size display data having different sizes. To be more specific, the display data, for example, having a different display size is configured by image data in which text strings having different font sizes are formed as an image. In Embodiment 17, one set of different-size display data is read out from the storage unit among a plurality of sets of different-size display data based on the movement speed under the control of the control device 18, and an image on the basis of the one set of the different-size display data is displayed in the image forming device. As above, in the display apparatus assembly of Embodiment 17, since one set of different-size display data is read out from the storage unit among a plurality of sets of different-size display data based on the movement speed, and an image on the basis of the one set of the different-size display data is displayed in the image forming device, it is difficult for an unbalance between the size of the real image (observation target) that is viewed with the naked eyes and the size of the image to occur.

Embodiment 18

Embodiment 18 is a modification of the display apparatus assemblies according to Embodiments 1 to 16. In the display apparatus according to Embodiment 18, a data group configured by a plurality of sets of text data is stored in a storage unit that is included in the control device 18. Here, the text data is configured by a plurality of sets of different-language display data of different languages. As examples of the languages, there are Chinese, Korean, English, and the like. To be more specific, in Embodiment 18, as different display data of different languages, there is image data in which text strings of different languages are formed as an image. Here, a switching button or a switch may be arranged in the control device 18 so as to manually select a display language. The control device 18 reads out one set of different-language display data from the storage unit among a plurality of sets of different-language display data out of text data, and an image on the basis of the one set of the different-language display data is displayed in the image forming device. As above, in the display apparatus assembly of Embodiment 18, an image can be easily displayed in a language that is used by an observer.

In addition, the display apparatus according to Embodiment 18 and the display apparatus according to Embodiment 17 may be combined together. In other words, it may be configured such that each set of different-size display data is configured by a plurality of sets of different-language display data of different display languages, and the control device 18 selects one set of different-size display data from among a plurality of sets of different-size display data based on the movement speed and reads out one set of different-language display data from the storage unit among the plurality of sets of different-language display data, and an image on the basis of the one set of the different-language display data is displayed in the image forming device.

As above, although the preferred embodiments of the present disclosure have been described, the present disclosure is not limited thereto. The configurations and the structures of the display apparatus assemblies, the display apparatus, and the image displaying device described in the embodiments are examples and may be appropriately changed. In addition, the configurations and the structures of the movement device, the rotary movement device, the liquid lens, and the liquid prism are examples and may be appropriately changed. In some cases, the display apparatus assemblies according to the second to fourth embodiments may be a signal eye type in which one image displaying device is included. In addition, for example, a surface relief-type hologram (see U.S. Patent No. 20040062505 A1) may be arranged on the light guiding plate. In the optical device 320 according to Embodiment 12 or 13, the diffraction grating device may be configured by a transmissive-type diffraction grating device, or it may be configured such that one of the first diffraction unit and the second diffraction unit is configured by a reflective-type diffraction grating device, and the other thereof is configured by a transmissive-type diffraction grating device. Alternatively, the diffraction grating device may be configured by a reflective-type blazed diffraction grating device. The display apparatus assembly according to the embodiment of the present disclosure can be used as a stereoscopic display device.

The present disclosure contains subject matter related to that disclosed in Japanese Priority Patent Application JP 2010-178627 filed in the Japan Patent Office on Aug. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus assembly comprising:
    a display apparatus;
    a controller; and
    a speed measuring device that measures a speed of the display apparatus,
    wherein,
        the display apparatus includes an eye glasses-type frame that is mountable on a head of an observer and two image displaying devices mounted in the frame, the image displaying devices generating a virtual image for left and right eyes of the observer, respectively,
        each of the image displaying devices includes (a) a virtual image forming device (b) an optical system that propagates light output from the corresponding virtual image forming device as parallel light, and (c) an optical device comprising an observer-transparent light guiding plate to which the parallel light output from the optical system is incident on a first surface of the light guiding plate and in which the light is guided so as to be output from the first surface of the light guiding plate to the respective eye of the observer while enabling the observer to view the real space image, the light guiding plate being in a line of vision of the respective eye, the observer being able to see a real space image through the light guide plate, the real space image being a real-world image or scene,
        the virtual image and the real space image are able to be viewed simultaneously via the light guiding plates, and
        the controller is configured to change a convergence angle of the virtual image displayed by the display apparatus by relatively moving an optical axis of each image forming device and an optical axis of the corresponding optical system in a horizontal direction based on the speed of the display apparatus as measured by the speed measuring device.

2. The display apparatus assembly according to claim 1, wherein the convergence angle is changed by controlling image signals input to the image forming devices that configure at least one of the image displaying devices.

3. The display apparatus assembly according to claim 1, wherein:
    at least one of the image displaying devices further includes a movement device that relatively moves an optical axis of the corresponding image forming device and an optical axis of the corresponding optical system in the horizontal direction, and
    the convergence angle is changed via the movement device.

4. The display apparatus assembly according to claim 1, wherein:
    at least one of the image displaying devices further includes a rotary movement device that rotates the corresponding image forming device and the corresponding optical system, and
    the convergence angle is changed by rotating the image forming device and the optical system by using the rotary movement device so as to change an incidence angle of the parallel light that is output from the optical system and is incident to the optical device with respect to the optical device.

5. The display apparatus assembly according to claim 1, wherein:
    the optical system of at least one of the image displaying devices includes a liquid lens, and
    the convergence angle is changed by operating the liquid lens.

6. The display apparatus assembly according to claim 1, wherein:
    the optical system of at least one of the image displaying devices includes a liquid prism, and
    the convergence angle is changed by operating the liquid prism.

7. The display apparatus assembly according to claim 1, wherein the speed measuring device comprises a global positioning system and a calculation device that determines the speed based on data supplied thereto by the global positioning system.

8. The display apparatus assembly according to claim 1, wherein the speed measuring device comprises a speed/acceleration sensor and a calculation device that determines the-speed based on data supplied thereto by the speed/acceleration sensor.

9. The display apparatus assembly according to claim 1, wherein the speed measuring device comprises a wheel rotation detecting device and a calculation device that determines the speed based on data supplied thereto by the wheel rotation number detecting device.

10. The display apparatus assembly according to claim 1, wherein the optical device is a semi-transmissive type.

11. A display apparatus assembly comprising:
    a display apparatus;
    a controller; and
    a speed measuring device that measures a speed of the display apparatus,
    wherein,
        the display apparatus includes an eye glasses-type frame that is mountable on a head of an observer and an image displaying device that is mounted in the eye glasses-type frame, the image displaying device generating a virtual image for an eye of the observer,
        the image displaying device includes (a) a virtual image forming device (b) an optical system that propagates light output from the image forming device as parallel light, and (c) an optical device comprising an observer-transparent light guiding plate to which the parallel light output from the optical system is incident on a first surface of the light guiding plate and in which the light is guided so as to be output from the first surface of the light guiding plate to the eye of the observer while enabling the observer to view the real space image, the light guiding plate being in a line of vision of the eye, the observer being able to see a real space image through the light guide plate, the real space image being a real-world image or scene, the virtual image and the real space image are able to be viewed simultaneously via the light guiding plate, and the controller is configured to change a virtual-image distance of the virtual image displayed by the image displaying device by changing a focal distance of the optical system based on the speed of the display apparatus as measured by the speed measuring device.

12. The display apparatus assembly according to claim 11, wherein:

the optical system of the image displaying device includes a liquid lens, and the focal distance of the optical system is changed by operating the liquid lens.

13. A display apparatus assembly comprising:
a display apparatus;
a controller; and
a speed measuring device that measures a speed of the display apparatus,
wherein, the display apparatus includes an eye glasses-type frame that is mountable on a head of an observer and an image displaying device that is mounted in the eye glasses-type frame, the image displaying device generating a virtual image for an eye of the observer, the image displaying device includes (a) a virtual image forming device, (b) an optical system that propagates light output from the image forming device as parallel light, and (c) an optical device comprising an observer-transparent light guiding plate to which the parallel light output from the optical system is incident on a first surface of the light guiding plate and in which the light is guided so as to be output from the first surface of the light guiding plate to an eye of the observer while enabling the observer to view the real space image, the light guiding plate being in a line of vision of the eye, the observer being able to see a real space image through the light guide plate, the real space image being a real-world image or scene, the virtual image and the real space image are able to be viewed simultaneously via the light guiding plate, and the controller is configured to a luminance of the virtual image or a resolution of the virtual image based on the speed of the display apparatus as measured by the speed measuring device.

14. A display apparatus assembly comprising:
a display apparatus;
a controller; and
a acceleration measuring device that measures acceleration of the display apparatus during a movement of the display apparatus, wherein, the display apparatus includes an eye glasses-type frame that is mountable on a head of an observer and an image displaying device that is mounted in the frame, the image displaying device generating a virtual image for an eye of the observer, the image displaying device includes (a) a virtual image forming device, (b) an optical system that propagates light output from the image forming device as parallel light, and (c) an optical device comprising an observer-transparent light guiding plate to which the parallel light output from the optical system is incident on a first surface of the light guiding plate and in which the light is guided so as to be output from the first surface of the light guiding plate to the eye of the observer while enabling the observer to view a real space image through the light guiding plate, the light guiding plate being in a line of vision of the eye, the real space image being a real-world image or scene, the virtual image and the real space image are able to be viewed simultaneously via the light guiding plate, and the controller stops an operation of the image displaying device when an absolute value of the acceleration of the display apparatus during the movement of the display apparatus as measured by the acceleration measuring device is equal to or greater than a predetermined value.

15. The display apparatus assembly according to claim 14, wherein the acceleration measuring device comprises a global positioning system and a calculation device that determines the acceleration based on data supplied thereto by the global positioning system.

16. The display apparatus assembly according to claim 14, wherein the acceleration measuring device comprises an acceleration sensor and a calculation device that determines the acceleration based on data supplied thereto by the acceleration sensor.

17. The display apparatus assembly according to claim 14, wherein the-acceleration measuring device comprises a wheel rotation detecting device and a calculation device that determines the acceleration of the display apparatus based on data supplied thereto by the wheel rotation number detecting device.

18. A head-mounted display comprising:
a frame with a head-mounted display that is mountable on a head of an observer;
a display apparatus that generates a virtual image incident on a first surface of an observer-transparent light guiding plate to be guided and output from the first surface of the light guiding plate to an eye of an observer while enabling the observer to view a real space image through the light guiding plate, the real space image being a real-world image or scene, the light guiding plate being in a line of vision of the eye;
a controller; and
a speed measuring device that measures a speed of the display apparatus,
wherein, the controller changes a convergence angle of the virtual image displayed by the display apparatus by relatively moving an optical axis of the image forming device and an optical axis of the corresponding optical system in a horizontal direction to minimize focal point differences between a real space image and the virtual image based on the speed of the display apparatus as measured by the speed measuring device, and the virtual image and the real space image are able to be viewed simultaneously via the light guiding plate.

19. A head-mounted display comprising:

a frame with a head-mounted display that is mountable on a head of an observer;

a display apparatus that projects a virtual image incident on a first surface of an observer-transparent light guiding plate to be guided and output from the first surface of the light guiding plate to the eye of an observer while enabling the observer to view a real space image through the light guiding plate, the real space image being a real-world image or scene, the light guiding plate being in a line of vision of the eye;

a controller; and a speed measuring device that measures a speed of the display apparatus, wherein, the controller is configured to change a focal distance of the display apparatus to minimize focal point differences between a real space image and the virtual image based on the speed of the display apparatus as measured by the speed measuring device, and the virtual image and the real space image are able to be viewed simultaneously via the light guiding plate.

20. A head-mounted display comprising:

a frame with a head-mounted display that is mountable on a head of an observer;

a display apparatus that projects a virtual image incident on a first surface of an observer-transparent light guiding plate to be guided and output from the first surface of the light guiding plate to an eye of an observer while enabling the observer to view a real space image through the light guiding plate, the real space image being a real-world image or scene, the light guiding plate being in a line of vision of the eye;

a controller; and a speed measuring device that measures a speed of the display apparatus, wherein, the controller is configured to change a luminance of the virtual image or a resolution of the virtual image based on the speed of the display apparatus as measured by the speed measuring device, and the virtual image and real space image are able to be viewed simultaneously via the light guiding plate.

* * * * *